(12) United States Patent
Hoehle et al.

(10) Patent No.: US 9,071,092 B2
(45) Date of Patent: Jun. 30, 2015

(54) CURRENT DIVERTER RING

(71) Applicant: Inpro/Seal LLC, Rock Island, IL (US)

(72) Inventors: Neil F. Hoehle, Solon, IA (US); Dwight A. Vicars, Rock Island, FL (US); Robert A. Tejano, Aledo, IL (US); David C. Orlowski, Punta Gorda, FL (US)

(73) Assignee: INPRO/SEAL, LLC, Rock Island, IL (US)

( * ) Notice: Subject to any disclaimer, the term of this patent is extended or adjusted under 35 U.S.C. 154(b) by 0 days.

(21) Appl. No.: 13/920,376

(22) Filed: Jun. 18, 2013

(65) Prior Publication Data

US 2014/0183998 A1 Jul. 3, 2014

Related U.S. Application Data

(63) Continuation-in-part of application No. 13/710,231, filed on Dec. 10, 2012, now Pat. No. 8,664,812, and a continuation-in-part of application No. 13/089,017, filed on Apr. 18, 2011, now Pat. No. 8,604,653, which (Continued)

(51) Int. Cl.
*H02K 11/00* (2006.01)
*H01R 39/00* (2006.01)
(Continued)

(52) U.S. Cl.
CPC .............. *H02K 5/136* (2013.01); *H01R 39/12* (2013.01); *H01R 39/64* (2013.01); *H02K 5/1732* (2013.01); *H02K 11/0089* (2013.01)

(58) Field of Classification Search
None
See application file for complete search history.

(56) References Cited

U.S. PATENT DOCUMENTS 2,269,614 A * 1/1942 Von Soden .................... 310/228
3,286,069 A 11/1966 Bugg
(Continued)

FOREIGN PATENT DOCUMENTS

EP 0291295 A2 11/1988
EP 1967774 A 9/2008
(Continued)

OTHER PUBLICATIONS

International Search Report and Written Opinion PCT/US2012/034139, dated Nov. 9, 2012.
(Continued)

*Primary Examiner* — Tran Nguyen
(74) *Attorney, Agent, or Firm* — Hamilton IP Law, PC; Jay R. Hamilton; Charles A. Damschen

(57) ABSTRACT

The current diverter rings (CDRs), captured CDRs, bearing isolators, and explosion-proof CDRs serve to dissipate an electrical charge from a rotating piece of equipment to ground, such as from a motor shaft to a motor housing. One embodiment of the explosion-proof CDR includes a stator that may be mounted to the equipment housing and a rotor that may be mounted to a shaft. The rotor may rotate with the shaft may be encompassed by stator and a cap, which cap may be secured directly to the stator or the housing. A conductive assembly may be positioned in a radial channel formed in the stator such that the conductive assembly contacts the shaft to conduct electricity from the shaft to the housing. Another embodiment of an explosion-proof CDR does not require a rotor. The explosion-proof CDR may be configured to define a flame path to achieve various explosion-proof certifications.

20 Claims, 48 Drawing Sheets

Related U.S. Application Data is a continuation-in-part of application No. 12/757,040, filed on Apr. 9, 2010, now abandoned, and a continuation-in-part of application No. 12/401,331, filed on Mar. 10, 2009, now abandoned, which is a continuation of application No. 11/378,208, filed on Mar. 17, 2006, now Pat. No. 7,521,827.

(60) Provisional application No. 61/568,265, filed on Dec. 8, 2011, provisional application No. 61/167,928, filed on Apr. 9, 2009, provisional application No. 61/218,912, filed on Jun. 19, 2009, provisional application No. 60/693,548, filed on Jun. 25, 2005, provisional application No. 61/661,084, filed on Jun. 18, 2012, provisional application No. 61/780,403, filed on Mar. 13, 2013.

(51) Int. Cl.
  *H02K 5/136* (2006.01)
  *H01R 39/12* (2006.01)
  *H01R 39/64* (2006.01)
  *H02K 5/173* (2006.01)

(56) References Cited

U.S. PATENT DOCUMENTS

| | | | |
|---|---|---|---|
| 3,785,049 A | 1/1974 | Tatsumi et al. | |
| 3,997,224 A * | 12/1976 | Ogawa et al. | 439/15 |
| 4,189,702 A | 2/1980 | Maloy | |
| 4,246,508 A | 1/1981 | Zimmer | |
| 4,347,456 A | 8/1982 | Chabrerie | |
| 4,403,164 A | 9/1983 | Preece | |
| 4,483,574 A | 11/1984 | Chabrerie et al. | |
| 4,515,417 A | 5/1985 | Shiraishi | |
| 4,575,102 A | 3/1986 | Raj et al. | |
| 4,654,619 A | 3/1987 | Guichard | |
| 4,685,021 A | 8/1987 | Kortschinski et al. | |
| 4,801,270 A | 1/1989 | Scarlata | |
| 4,823,039 A | 4/1989 | Lynch | |
| 4,850,881 A | 7/1989 | Lagier et al. | |
| 4,855,631 A | 8/1989 | Sato et al. | |
| 4,894,785 A | 1/1990 | Fernandes | |
| 5,010,441 A | 4/1991 | Fox et al. | |
| 5,661,356 A * | 8/1997 | Fisher et al. | 310/219 |
| 5,799,905 A | 9/1998 | Rokita | |
| 5,812,908 A | 9/1998 | Larocca et al. | |
| 5,912,516 A | 6/1999 | Atkinson et al. | |
| 5,967,524 A | 10/1999 | Fedorovich | |
| 5,988,996 A | 11/1999 | Brookbank et al. | |
| 6,145,843 A | 11/2000 | Hwang | |
| 6,386,546 B1 | 5/2002 | Fedorovich | |
| 6,390,477 B1 | 5/2002 | Drago et al. | |
| 6,419,233 B2 | 7/2002 | Orlowski | |
| 6,518,530 B2 | 2/2003 | Heins et al. | |
| 6,608,410 B2 | 8/2003 | Sato et al. | |
| 6,670,733 B2 | 12/2003 | Melfi | |
| 6,788,518 B1 | 9/2004 | Hasse et al. | |
| 6,913,265 B2 | 7/2005 | Datta | |
| 6,955,473 B2 | 10/2005 | Reddehase et al. | |
| 6,972,052 B2 | 12/2005 | Krumma et al. | |
| 6,984,906 B1 | 1/2006 | Martiny, Jr. | |
| 7,071,589 B2 | 7/2006 | Bramel et al. | |
| 7,136,271 B2 | 11/2006 | Oh et al. | |
| 7,193,836 B2 | 3/2007 | Oh et al. | |
| 7,396,017 B2 | 7/2008 | Orlowski et al. | |
| 8,169,766 B2 * | 5/2012 | Oh et al. | 361/221 |
| 8,189,317 B2 * | 5/2012 | Oh et al. | 361/221 |
| 8,604,653 B2 * | 12/2013 | Orlowski et al. | 310/68 R |
| 8,614,611 B2 | 12/2013 | Weeks | |
| 8,664,812 B2 * | 3/2014 | Vicars et al. | 310/68 R |
| 2001/0017495 A1 | 8/2001 | Sato et al. | |
| 2001/0040099 A1 | 11/2001 | Pedersen et al. | |
| 2002/0121821 A1 | 9/2002 | Ritter | |
| 2002/0136161 A1 | 9/2002 | Cleereman et al. | |
| 2003/0057783 A1 | 3/2003 | Melfi | |
| 2003/0086630 A1 | 5/2003 | Bramel et al. | |
| 2003/0235354 A1 | 12/2003 | Orlowski et al. | |
| 2004/0233592 A1 | 11/2004 | Oh et al. | |
| 2006/0007609 A1 | 1/2006 | Oh et al. | |
| 2007/0159017 A1 | 7/2007 | Martin et al. | |
| 2007/0241514 A1 | 10/2007 | Orlowski et al. | |
| 2010/0127585 A1 * | 5/2010 | Fee et al. | 310/71 |
| 2010/0176673 A1 | 7/2010 | Wright et al. | |
| 2014/0132126 A1 * | 5/2014 | Vicars et al. | 310/68 R |
| 2014/0191630 A1 * | 7/2014 | Orlowski et al. | 310/68 R |

FOREIGN PATENT DOCUMENTS

| | | |
|---|---|---|
| JP | 2004040926 A | 2/2004 |
| KR | 1019970004226 A | 1/1997 |
| WO | 9805890 A | 2/1998 |

OTHER PUBLICATIONS

International Preliminary Report on Patentability for PCT/US2012/068824, dated Jun. 19, 2014.
International Search Report and Written Opinion for PCT/US12/68824, dated Mar. 18, 2013.
ISR received by Applicant in related PCT application having serial No. PCT/US2013/046301; dated Jun. 18, 2013; submitted in its entirety.

* cited by examiner

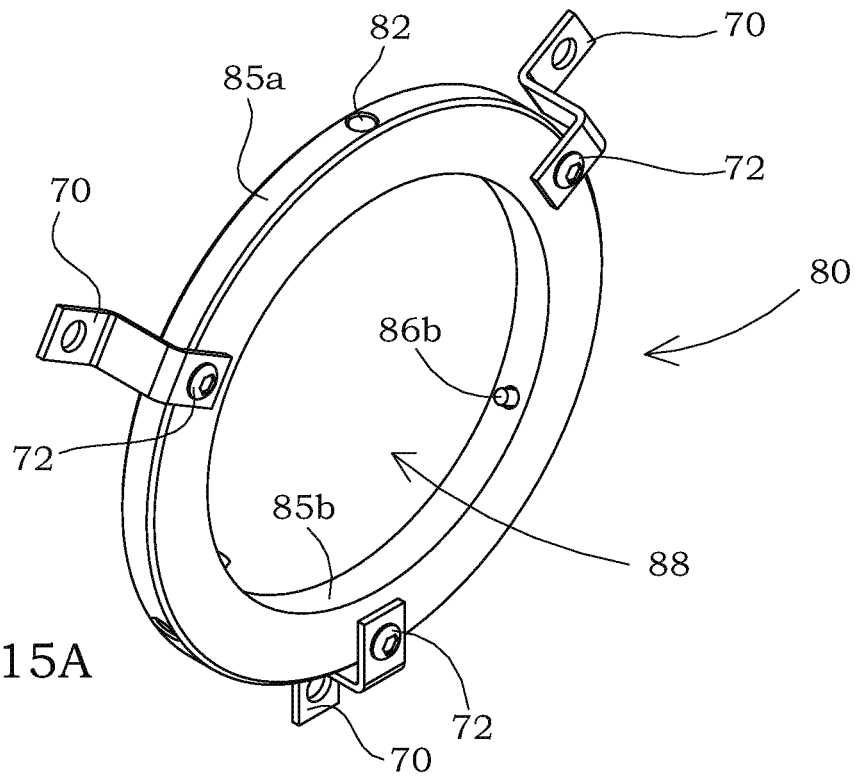
FIG. 15A
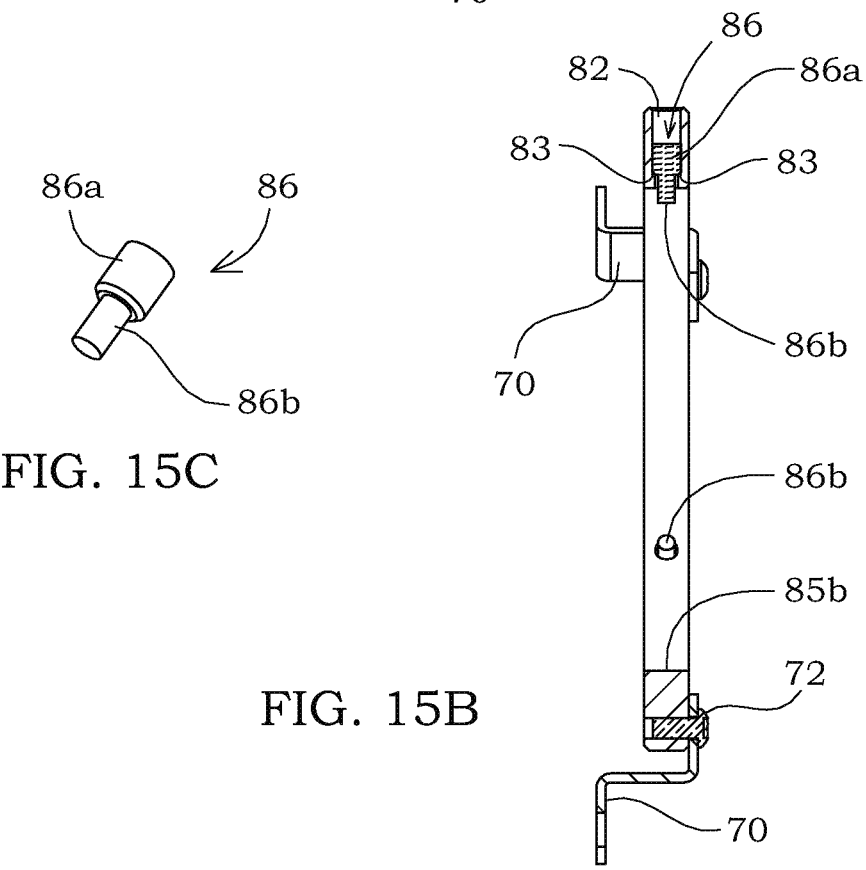
FIG. 15C
FIG. 15B

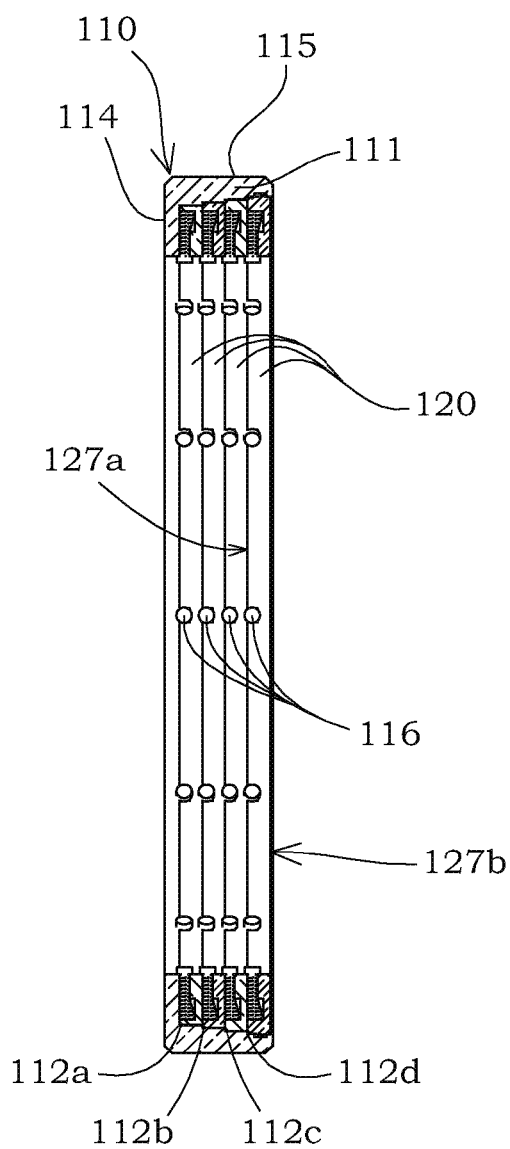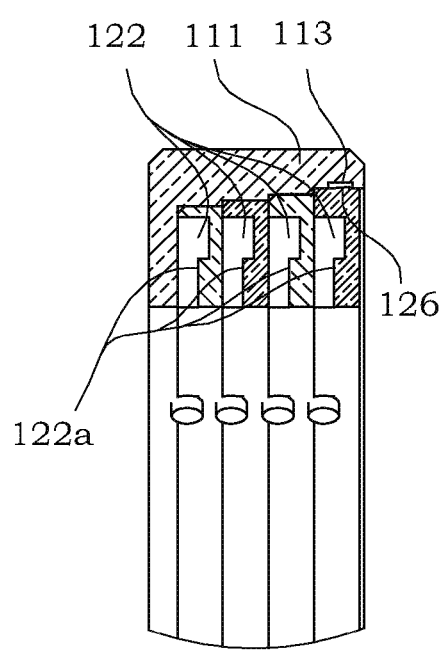
FIG. 16D
FIG. 16C

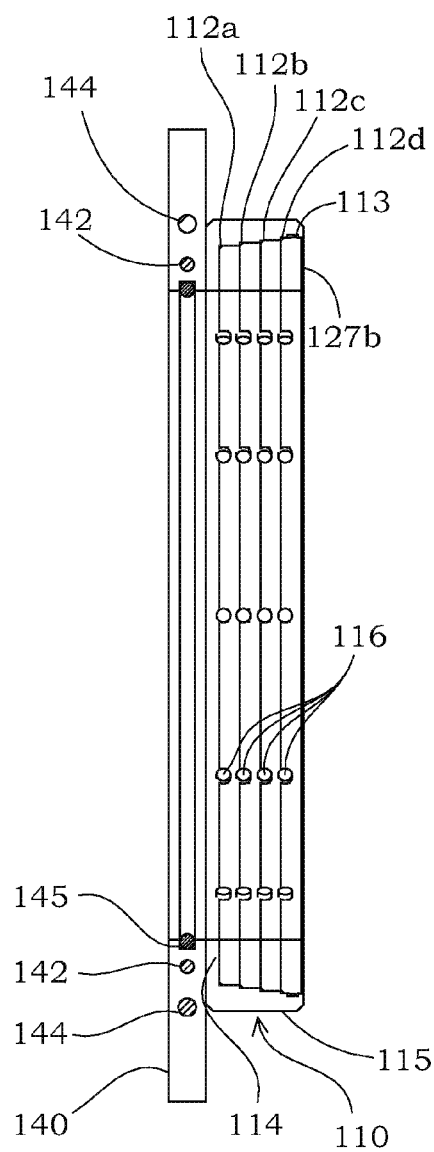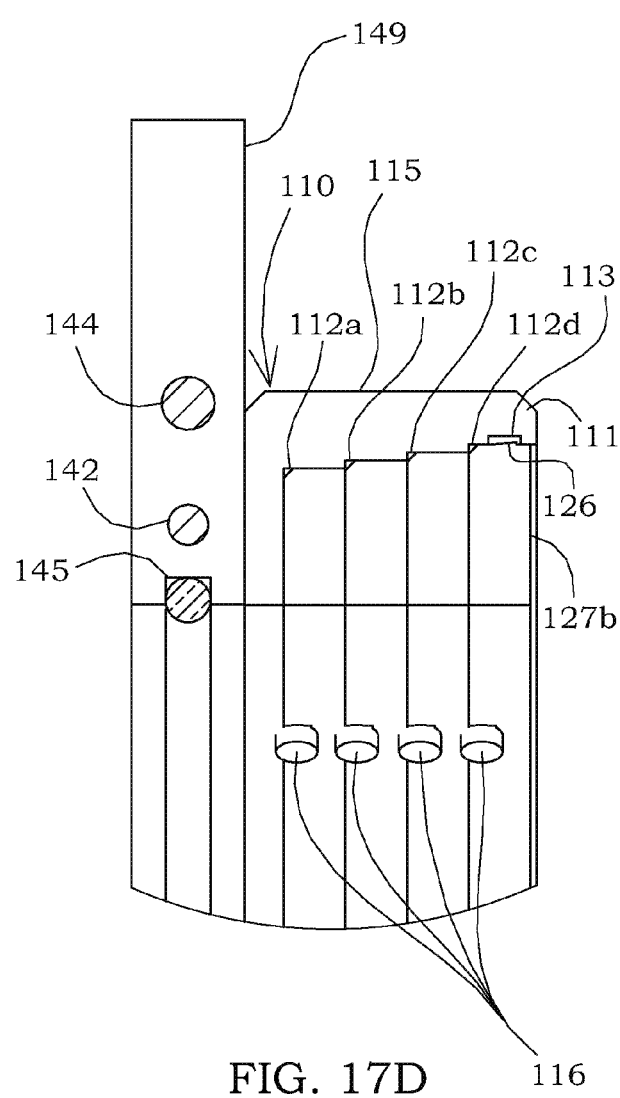
FIG. 17C
FIG. 17D

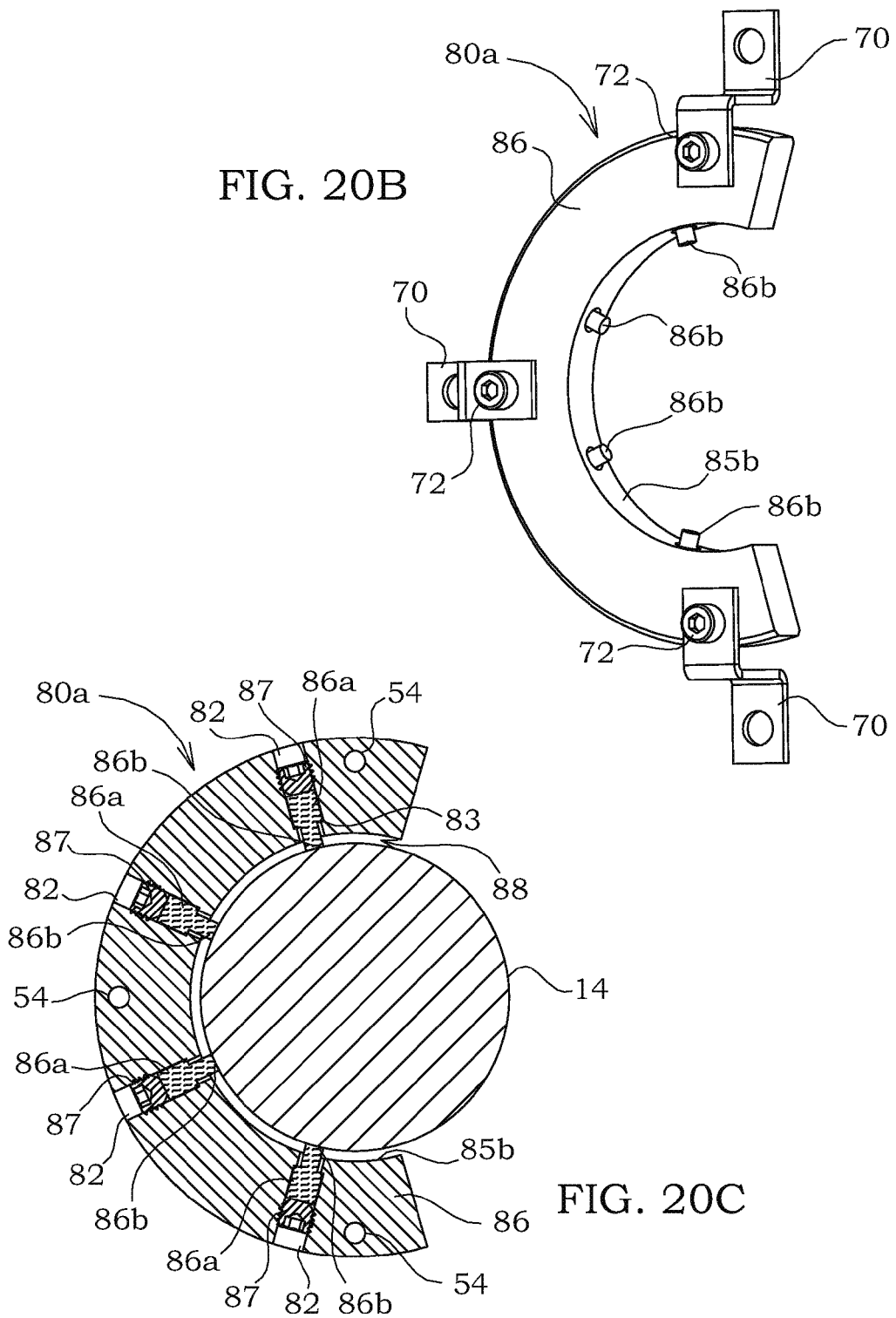

II-C To develop sensor and transmitter with software to interface with Network Node

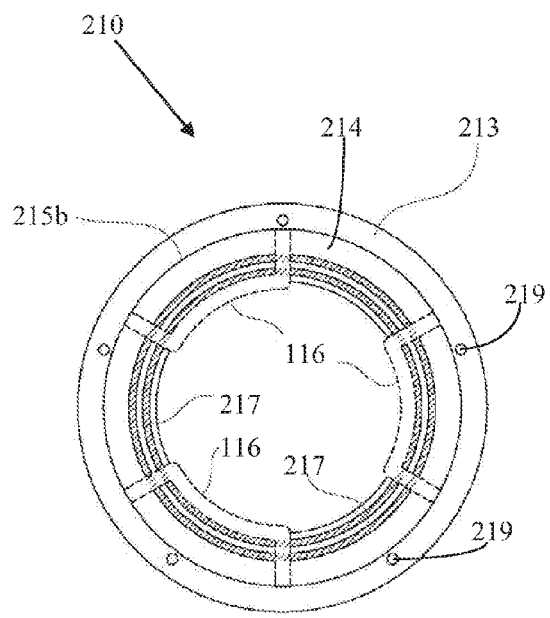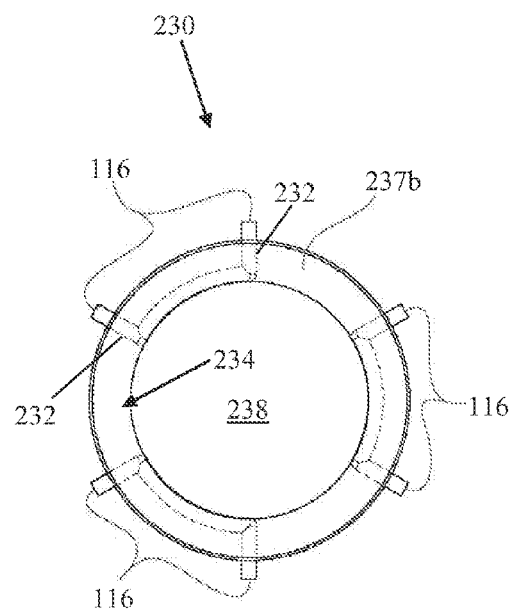
FIG. 23D
FIG. 23E

SECTION J-J

CURRENT DIVERTER RING

CROSS-REFERENCE TO RELATED APPLICATIONS

The present application claims priority from provisional U.S. Pat. App. Nos. 61/661,084 filed on Jun. 18, 2012 and 61/780,403 filed on Mar. 13, 2013, all of which are incorporated by reference herein in their entireties.

STATEMENT REGARDING FEDERALLY SPONSORED RESEARCH OR DEVELOPMENT

No federal funds were used to develop or create the invention disclosed and described in the patent application.

FIELD OF THE INVENTION

The present invention relates to an electrical charge dissipating device, and more particularly to a current diverter Ring™ for directing electrostatic charge to ground, which electrostatic charge is created through the use of rotating equipment.

AUTHORIZATION PURSUANT TO 37 C.F.R. §1.171 (d)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever. CDR and Current Diverter Ring are the exclusive trademarks of Assignee, Inpro/Seal LLC.

BACKGROUND OF THE INVENTION

Adequate maintenance of rotating equipment, particularly electric motors, is difficult to obtain because of extreme equipment duty cycles, the lessening of service factors, design, and the lack of spare rotating equipment in most processing plants. This is especially true of electric motors, machine tool spindles, wet end paper machine rolls, aluminum rolling mills, steam quench pumps, and other equipment utilizing extreme contamination affecting lubrication.

Various forms of shaft sealing devices have been utilized to try to protect the integrity of the bearing environment. These devices include rubber lip seals, clearance labyrinth seals, and attraction magnetic seals. Lip seals or other contacting shaft seals often quickly wear to a state of failure and are also known to permit excessive amounts of moisture and other contaminants to immigrate into the oil reservoir of the operating equipment even before failure has exposed the interface between the rotor and the stator to the contaminants or lubricants at the radial extremity of the seal. The problems of bearing failure and damage as applied to electrical motors using variable frequency drives (VFDs) is compounded because of the very nature of the control of electricity connected to VFD controlled motors. Often the use of VFDs causes VFDs regulate the speed of a motor by converting sinusoidal line alternating current (AC) voltage to direct current (DC) voltage, then back to a pulse width modulated (PWM) AC voltage of variable frequency. The switching frequency of these pulses ranges from 1 kHz up to 20 kHz and is referred to as the "carrier frequency." The ratio of change in voltage to the change in time ($\Delta V/\Delta T$) creates what has been described as a parasitic capacitance between the motor stator and the rotor, which induces a voltage on the rotor shaft. If the voltage induced on the shaft, which is referred to as "common mode voltage" or "shaft voltage," builds up to a sufficient level, it can discharge to ground through the bearings. Current that finds its way to ground through the motor bearings in this manner is often referred to as "bearing current."

There are many causes of bearing current including voltage pulse overshoot in the VFD, non-symmetry of the motor's magnetic circuit, supply imbalances, and transient conditions, among other causes. Any of these conditions may occur independently or simultaneously to create bearing currents from the motor shaft.

Shaft voltage accumulates on the rotor until it exceeds the dielectric capacity of the motor bearing lubricant, at which point the voltage discharges in a short pulse to ground through the bearing. After discharge, voltage again accumulates on the shaft and the cycle repeats itself. This random and frequent discharging has an electric discharge machining (EDM) effect, which causes pitting of the bearing's rolling elements and raceways. Initially, these discharges create a "frosted" or "sandblasted" effect on surfaces. Over time, this deterioration causes a groove pattern in the bearing race called "fluting," which is an indication that the bearing has sustained severe damage. Eventually, the deterioration will lead to complete bearing failure.

The prior art teaches numerous methods of mitigating the damage shaft voltages cause, including using a shielded cable, grounding the shaft, insulated bearings, and installation of a Faraday shield. For example, U.S. Pat. No. 7,193,836 discloses devices for controlling shaft current, which devices are designed to induce ionization in the presence of an electrical field.

Most external applications add to costs, complexity, and exposure to external environmental factors. Insulated bearings provide an internal solution by eliminating the path to ground through the bearing for current to flow. However, installing insulated bearings does not eliminate the shaft voltage, which will continue to find the lowest impedance path to ground. Thus, insulated bearings are not effective if the impedance path is through the driven load. Therefore, the prior art does not teach an internal, low-wearing method or apparatus to efficaciously ground shaft voltage and avoid electric discharge machining of bearings leading to premature bearing failure.

SUMMARY OF THE INVENTION

It is an objective of the current diverter ring to disclose and claim an apparatus for rotating equipment that conducts and transmits and directs accumulated bearing current to ground. It is another objective of the bearing isolator as disclosed and claimed herein to facilitate placement of a current diverter ring within the stator of the bearing isolator. Conductive segments may be positioned within the current diverter ring. These conductive segments may be constructed of metallic or non-metallic solids, machined or molded. Although any type of material compatible with operating conditions and metallurgy may be selected, bronze, gold, carbon, or aluminum are believed to be preferred materials because of increased conductivity, strength, corrosion and wear resistance.

It has been found that a bearing isolator having a rotor and stator manufactured from bronze has improved electrical charge dissipation qualities. The preferred bronze metallurgy is that meeting specification 932 (also referred to as 932000 or "bearing bronze"). This bronze is preferred for bearings and bearing isolators because it has excellent load capacity and antifriction qualities. This bearing bronze alloy also has good machining characteristics and resists many chemicals. It is believed that the specified bronze offers increased shaft voltage collection properties comparable to the ubiquitous lightning rod due to the relatively low electrical resistivity (85.9 ohms-cmil/ft@68 F or 14.29 microhm-cm@20 C) and high electrical conductivity (12% IACS @68 F or 0.07 MegaSiemens/cm@20 C) of the material selected.

It is another object of the current diverter ring and bearing isolator to improve the electrical charge dissipation characteristics from those displayed by shaft brushes typically mounted external of the motor housing. Previous tests of a combination bearing isolator with a concentric current diverter ring fixedly mounted within the bearing isolator have shown substantial reduction in shaft voltage and attendant electrostatic discharge machining Direct seating between the current diverter ring and the bearing isolator improves the conduction to ground over a simple housing in combination with a conduction member as taught by the prior art. Those practiced in the arts will understand that this improvement requires the electric motor base to be grounded, as is the norm.

It is therefore an objective of the current diverter ring and bearing isolator to disclose and claim an electric motor for rotating equipment having a bearing isolator that retains lubricants, prevents contamination, and conducts and transmits bearing current to ground.

It is another objective of the current diverter ring and bearing isolator to provide a bearing isolator for rotating equipment that retains lubricants, prevents contamination and conducts electrostatic discharge (shaft voltage) to improve bearing operating life.

It is another objective of the current diverter ring to provide an effective apparatus to direct electrical charges from a shaft to a motor housing and prevent the electrical charge from passing to ground through the bearing(s).

Other objects, advantages and embodiments of the current diverter ring and bearing isolator will become apparent upon the reading the following detailed description and upon reference to drawings.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

FIG. 15A is a perspective view of a third embodiment of the CDR.

FIG. 15B is an axial cross section view of the third embodiment of the CDR.

FIG. 15C is a perspective view of one embodiment of a conductive assembly that may be used with certain embodiments of the CDR.

FIG. 16C is an axial cross section view of the fourth embodiment of the CDR.

FIG. 16D is a detailed cross section view of the fourth embodiment of the current diverter ring.

FIG. 17C is an axial cross section view of the fifth embodiment of the CDR.

FIG. 17D is a detailed cross section view of the fifth embodiment of the CDR.

FIG. 20B is an axial cross section view of the embodiment of an arc CDR shown in FIG. 20A.

FIG. 20C is an axial-face view of the embodiment of an arc CDR shown in FIGS. 20A & 20B.

FIG. 23D is a front view of the embodiment of a captured CDR shown in FIGS. 23A-23C with the cap removed for clarity.

FIG. 23E is a front view of one embodiment of a rotor that may be used with the embodiment of the captured CDR shown in FIGS. 23A-23D.

DETAILED DESCRIPTION

Element Listing

Figure 1:
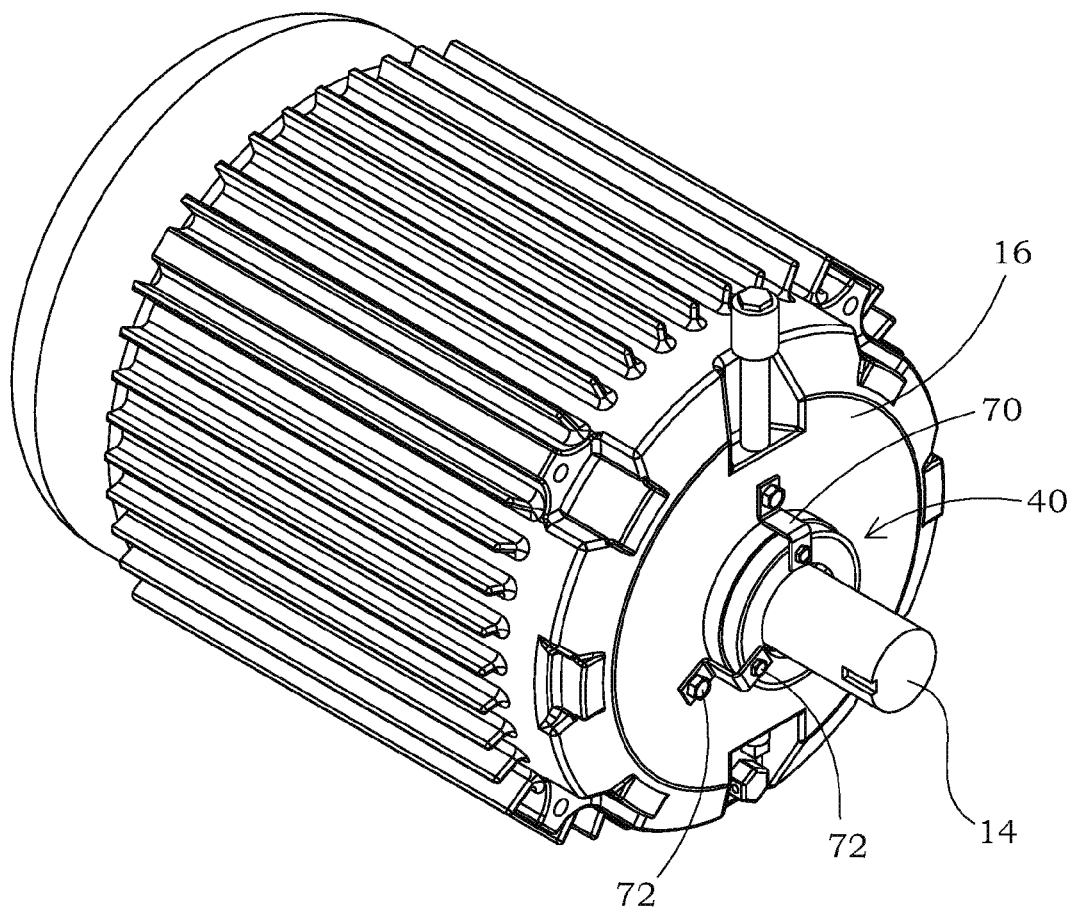
FIG. 1 is a perspective view of one embodiment of an electric motor with which the current diverter ring may be employed.

| Description | Element No. |
| --- | --- |
| Bearing isolator | 10 |
| Bearing | 12 |
| Shaft | 14 |
| Equipment housing | 16 |
| Sealing member | 17 |
| O-ring | 18 |
| Stator | 20 |
| Stator main body | 22 |
| Stator radial exterior surface | 23 |
| Receptor groove | 24 |
| Stator axial projection | 26 |
| Stator radial projection | 28 |
| Stator axial groove | 29 |
| Rotor | 30 |
| Rotor main body | 32 |
| Rotor axial exterior surface | 33 |
| First axial interface gap | 34a |
| First radial interface gap | 34b |
| Rotor axial projection | 36 |
| Rotor radial projection | 38 |
| Rotor axial groove | 39 |
| Current diverter ring ™ (CDR ®) | 40 |
| CDR body | 41 |
| Annular channel | 42 |
| First wall | 43 |
| Second wall | 44 |
| CDR radial exterior surface | 45 |
| Conductive segment | 46 |
| CDR main aperture | 48 |
| Inner body | 50 |
| Radial channel | 52 |
| Catch | 52a |
| Mounting aperture | 54 |
| Ridge (locking) | 56 |
| Inner body main aperture | 58 |
| Outer body | 60 |
| Base | 62 |
| Annular groove | 64 |
| First annular shoulder | 65a |
| Second annular shoulder | 65b |
| Radial projection | 66 |
| Outer body main aperture | 68 |
| Strap | 70 |
| Fastener | 72 |
| Radial CDR | 80 |
| Arc CDR | 80a |
| Arc cut out | 81 |
| Radial channel | 82 |
| Radial channel shelf | 83 |
| Radial exterior surface | 85a |
| Radial interior surface | 85b |
| Conductive assembly | 86 |
| Binder | 86a |
| Contact portion | 86b |
| Plug | 87 |
| Main aperture | 88 |
| Multi-ring CDR | 100 |
| Retainer | 110 |
| Retainer base | 111 |
| First annular groove | 112a |
| Second annular groove | 112b |
| Third annular groove | 112c |
| Fourth annular groove | 112d |
| Snap groove | 113 |
| Retainer wall | 114 |
| Retainer radial exterior surface | 115 |
| Conductive segment | 116 |
| Retainer main aperture | 118 |
| Ring | 120 |

| Description | Element No. |
|---|---|
| Radial channel | 122 |
| Catch | 122a |
| Ring radial exterior surface | 125 |
| Ridge | 126 |
| Interior axial surface | 127a |
| Exterior axial surface | 127b |
| Ring main aperture | 128 |
| Split ring segment | 130 |
| Aperture | 132 |
| Backing ring | 140 |
| Alignment pin | 141 |
| Alignment pin receptor | 142 |
| Fastener bore | 143 |
| Fastener receptor | 144 |
| O-ring channel | 145 |
| Aperture | 146 |
| Backing ring fastener | 148 |
| Adaptable CDR | 160 |
| Slot | 161 |
| Radial channel | 162 |
| Radial channel shelf | 163 |
| Recess | 164 |
| Radial exterior surface | 165a |
| Radial interior surface | 165b |
| Cut out | 166 |
| Main aperture | 168 |
| CDR | 200' |
| Power source | 210' |
| Indicator | 212' |
| Switch | 213' |
| Indicator conductive assembly | 214' |
| Indicator binder | 214a' |
| Indicator contact portion | 214b' |
| Secondary conductive assembly | 216' |
| Secondary binder | 216a' |
| Secondary contact portion | 216b' |
| Captured CDR | 200 |
| Explosion-proof CDR | 202 |
| Sleeve | 204 |
| Sleeve groove | 204a |
| Fastener | 205 |
| Fastener receiver | 206 |
| Shaft | 207 |
| O-ring | 209 |
| Main body | 210 |
| Mounting flange | 211 |
| Base | 212 |
| Cap interface surface | 213 |
| Main body wall | 214 |
| Radial exterior surface | 215a |
| Radial interior surface | 215b |
| Skate groove | 216 |
| Skate | 217 |
| Main body main aperture | 218 |
| Receiver | 219 |
| Rotor body | 220 |
| Flange | 221 |
| Base | 222 |
| Retention chamber | 223 |
| Drive ring groove | 224 |
| Lock channel | 226 |
| Rotor body main aperture | 228 |
| Rotor ring | 230 |
| Radial channel | 232 |
| Catch | 232a |
| Rotor ring flange | 233 |
| Segment groove | 234 |
| Ring radial exterior surface | 235 |
| Ridge | 236 |
| Interior axial surface | 237a |
| Exterior axial surface | 237b |
| Rotor ring main aperture | 238 |
| Drive ring | 239 |
| Cap | 240 |
| Skate groove | 246 |
| Cap interior axial surface | 247a |
| Cap exterior axial surface | 247b |
| Cap main aperture | 248 |
| Aperture | 249 |
| Stator | 250 |
| Stator radial exterior surface | 251a |
| Stator radial interior surface | 251b |
| Radial bore | 252 |
| Stator groove | 253 |
| Axial projection | 254 |
| Radial projection | 255 |
| Interface channel | 256 |
| Plug | 257 |
| Fastener channel | 258 |
| Conductive assembly | 259 |
| Rotor | 260 |
| Rotor radial exterior surface | 261a |
| Rotor radial interior surface | 261b |
| Rotor groove | 263 |
| Rotor axial projection | 264 |
| Rotor radial projection | 265 |
| O-ring channel | 266 |
| Cap | 270 |
| Cap axial interior surface | 271a |
| Cap axial exterior surface | 271b |
| Cap flange | 272 |
| Cap groove | 273 |
| Cap axial projection | 274 |
| Cap radial projection | 275 |
| Cap body | 276 |
| Body radial bore | 276a |
| Cap fastener channel | 278 |

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance. Additionally, the terms CDR 40, radial CDR 80, multi-ring CDR 100, and adaptable CDR 160 may be used interchangeably when referring to generalities of configuration with a bearing isolator 10, methods and/or materials of construction, and/or other general features unless explicitly stated otherwise.

One embodiment of an equipment housing 16 with which the CDR® 40 may be used is shown in FIG. 1. The CDR 40 may be press-fit into an aperture in the equipment housing 16, or it may be secured to the exterior of the equipment housing 16 using straps 70 and fasteners 72 as described in detail below and as shown in FIG. 1. The CDR 40 may also be secured to an equipment housing 12 via other structures and/or methods, such as chemical adhesion, welding, rivets, or any other structure and/or method suitable for the particular application. The CDR 40 may also be configured to be engaged with a bearing isolator 10, or integrally formed with a bearing isolator 10, as described in detail below.

Figure 2:
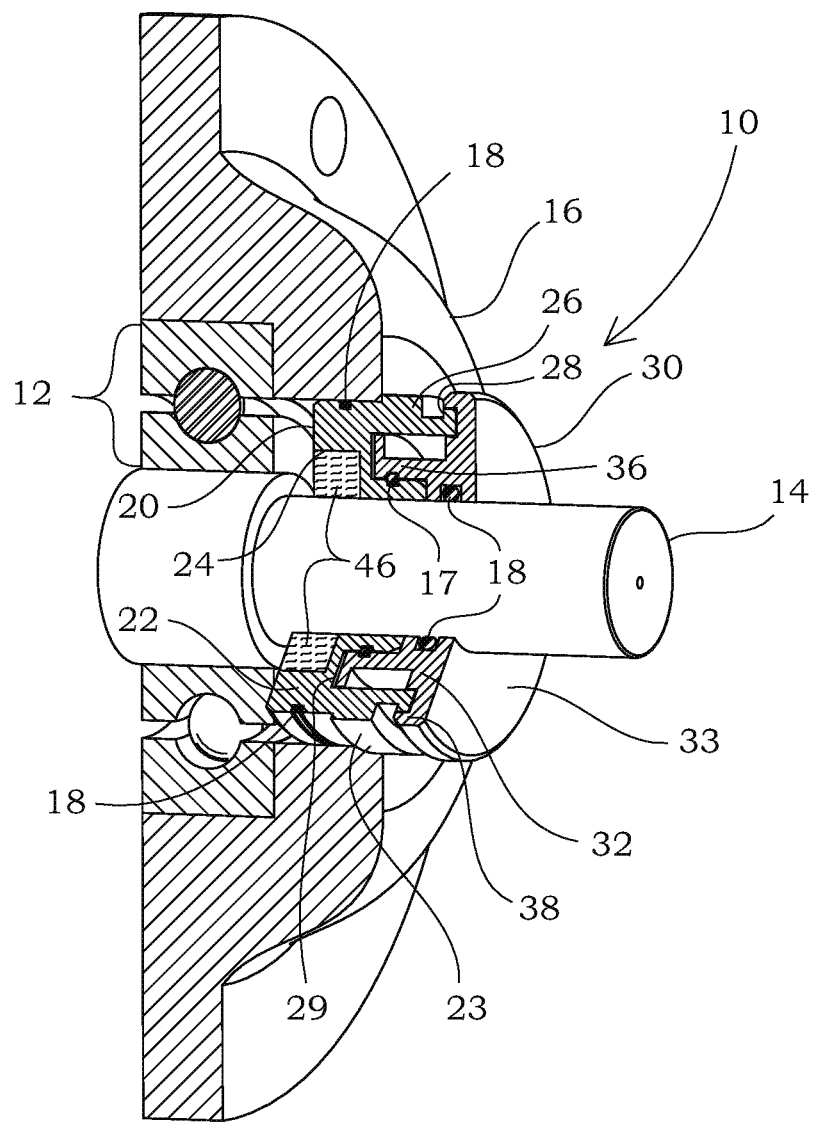
FIG. 2 is a perspective cross-sectional view of a bearing isolator wherein a portion of the stator is fashioned as a current diverter ring.

FIG. 2 illustrates a perspective view of one embodiment of a bearing isolator 10 configured to discharge electrical impulses from the shaft 14 through the equipment housing 16. The bearing isolator 10 as shown in FIG. 2 may be mounted to a rotatable shaft 10 on either one or both sides of the equipment housing 16. The bearing isolator 10 may be flange-mounted, press-fit (as shown in FIG. 2), or attached to the equipment housing 16 using any other method and/or structure suitable for the particular application, as was described above for the CDR 40. In some embodiments, set screws (not shown) or other structures and/or methods may be used to mount either the stator 20 to the equipment housing 16 or the rotor 30 to the shaft 14. In another embodiment not pictured herein, the shaft 14 is stationary and the equipment housing 16 or other structure to which the bearing isolator 10 is mounted may rotate.

First Embodiment of a Single-Piece CDR and Bearing Isolator

In another embodiment, the CDR 40 and/or bearing isolator 10 may be mounted such that either the CDR 40 and/or bearing isolator 10 are allowed to float in one or more directions. For example, in one embodiment a portion of the bearing isolator 10 is positioned in an enclosure. The enclosure is fashioned as two opposing plates with main apertures therein, through which main apertures the shaft passes 14. The interior of the enclosure is fashioned such that the bearing isolator 10 and/or CDR 40 is positioned within a truncated circle (i.e., pill-shaped) recess on the interior of the enclosure. The contact points between the bearing isolator 10 and/or CDR 40 and the enclosure may be formed with a low friction substance, such as Teflon®, affixed thereto.

Figure 3:
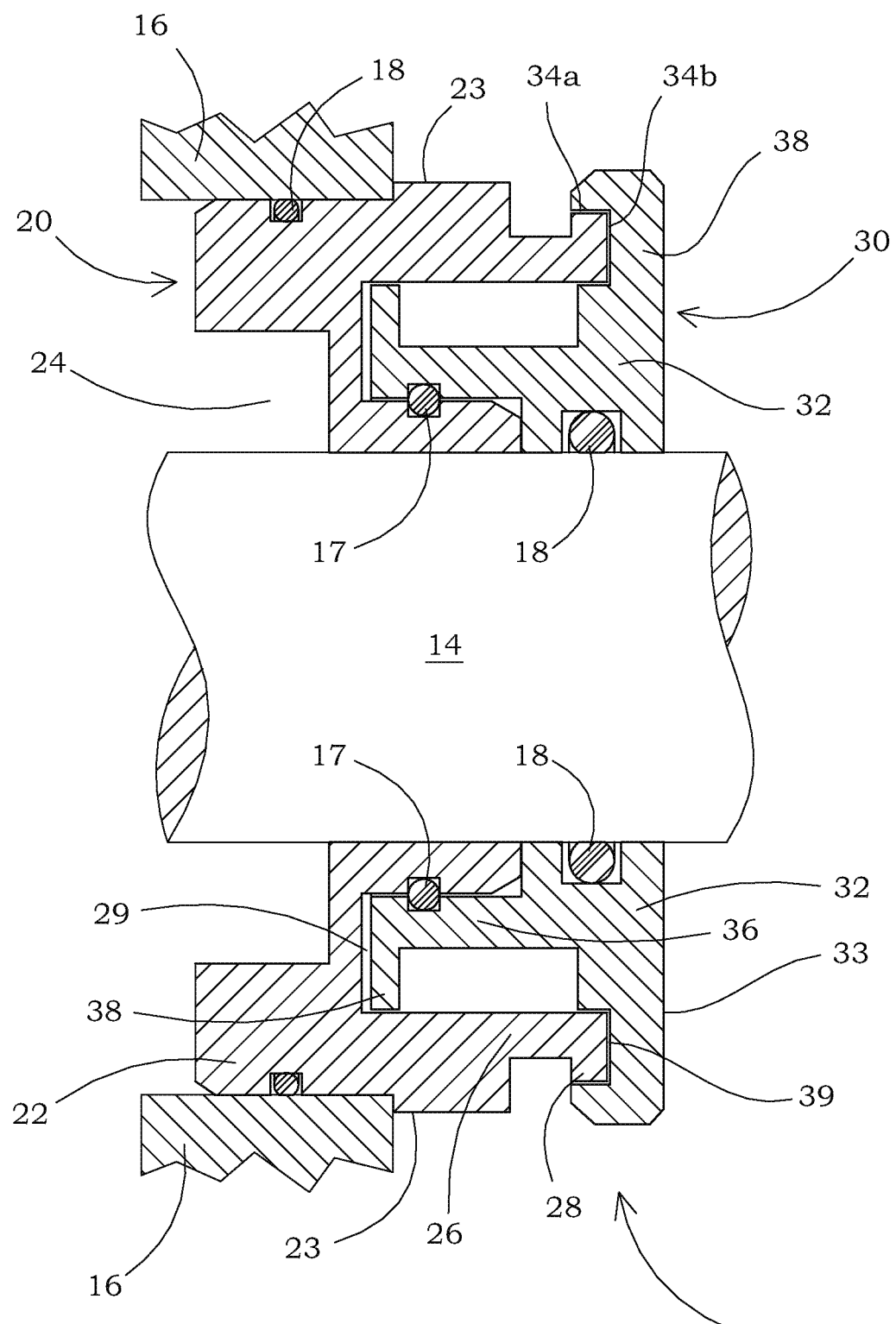
FIG. 3 is a cross-sectional view of a bearing isolator configured to accept a current diverter ring within the stator portion of the bearing isolator.

A more detailed cross-sectional view of one embodiment of a bearing isolator 10 with which the CDR 40 may be used is shown in FIG. 3. The bearing isolator 10 shown in FIGS. 2 and 3 includes a stator 20 and a rotor 30, and is commonly referred to as a labyrinth seal. Generally, labyrinth seals are well known to those skilled in the art and include those disclosed in U.S. Pat. Nos. 7,396,017; 7,090,403; 6,419,233; 6,234,489; 6,182,972; and 5,951,020; and U.S. Pat. App. Pub. No. 2007/0138748, all of which are incorporated by reference herein in their entireties.

The stator 20 may be generally comprised of a stator main body 22 and various axial and/or radial projections extending therefrom and/or various axial and/or radial grooves configured therein, which are described in more detail below. In the embodiment shown in FIGS. 2 and 3, the stator 20 is fixedly mounted to an equipment housing 16 with an O-ring 18 forming a seal therebetween.

The rotor 30 may be generally comprised of a rotor main body 32 and various axial and/or radial projections extending therefrom and/or various axial and/or radial grooves configured therein, which are described in more detail below. In the embodiment shown, one stator axial projection 26 cooperates with a rotor axial groove 39, and one rotor axial projection 36 cooperates with a stator axial groove 29 to form a labyrinth passage between the interior portion of the bearing isolator 10 and the external environment. The rotor 30 may be fixedly mounted to a shaft 14 and rotatable therewith. An O-ring 18 may be used to form a seal therebetween. A sealing member 17 may be positioned between the stator 20 and rotor 30 on an interior interface therebetween to aide in prevention of contaminants entering the interior of the bearing isolator 10 from the external environment while simultaneously aiding in retention of lubricants in the interior of the bearing isolator 10.

In the embodiment of the bearing isolator 10 shown in FIGS. 2 and 3, one stator radial projection 28 provides an exterior groove in the stator 20 for collection of contaminants. A first axial interface gap 34a may be formed between the radially exterior surface of a stator radial projection 28 and the radially interior surface of a rotor radial projection 38. A first radial interface gap 34b may be formed between the axially exterior surface of a stator axial projection 26 and the axially interior surface of a rotor axial groove 39. A rotor axial projection 36 formed with a rotor radial projection 38 may be configured to fit within a stator axial groove 29 to provide another axial interface gap between the stator 20 and the rotor 30.

In the embodiment of a bearing isolator 10 pictured herein, one rotor radial projection 38 (adjacent the rotor axial exterior surface 33) extends radially beyond the major diameter of the stator axial projection 26. This permits the rotor 30 to encompass the stator axial projection 26. As is fully described in U.S. Pat. No. 6,419,233, which is incorporated by reference herein in its entirety, this radial extension is a key design feature of the bearing isolator 10 shown herein. The axial orientation of the first axial interface gap 34a controls entrance of contaminants into the bearing isolator 10. Reduction or elimination of contaminants improves the longevity and performance of the bearing isolator 10, bearing 12, and conductive segment(s) 46. The opening of the first axial interface gap 34a faces rearward, toward the equipment housing 16 and away from the contaminant stream. The contaminant or cooling stream will normally be directed along the axis of the shaft 14 and toward the equipment housing 16.

To facilitate the discharge of electric energy on or adjacent the shaft 14, the bearing isolator 10 may include at least one conductive segment 46 positioned within the stator 20. The stator 20 may be configured with a conductive segment retention chamber adjacent the bearing 12, in which conductive segment retention chamber the conductive segment 46 may be positioned and secured such that the conductive segment 46 is in contact with the shaft 14. As electrical charges accumulate on the shaft 14, the conductive segment 46 serves to dissipate those charges through the bearing isolator 10 and to the equipment housing 16. The specific size and configuration of the conductive segment retention chamber will depend on the application of the bearing isolator 10 and the type and size of each conductive segment 46. Accordingly, the size and configuration of the conductive segment annular channel is in no way limiting.

Configuring the conductive segment retention chamber as an annular channel it is not preferred. This configuration results in difficulties relating to, among other things, performance and manufacturing. A preferred configuration of the conductive segment retention chamber is a radial channel 52, such as those described for the CDR 40 embodiment shown in FIGS. 7-14 or as described for the radial CDR 80, shown in FIGS. 15A-15C.

In the embodiment pictured herein, the bearing isolator 10 is formed with a receptor groove 24. The receptor groove 24 may be fashioned on the inboard side of the bearing isolator 10 adjacent the shaft 14, as best shown in FIG. 3. Generally, the receptor groove 24 facilitates the placement of a CDR 40 within the bearing isolator 10. However, other structures may be positioned within the receptor groove 24 depending on the specific application of the bearing isolator 10.

As shown and described, the bearing isolator 10 in FIGS. 2 and 3 includes a plurality of radial and axial interface passages between the stator 20 and the rotor 30 resulting from the cooperation of the stator projections 26, 28 with rotor grooves 39 and the cooperation of rotor projections 36, 38 with stator grooves 29. An infinite number of configurations and/or orientations of the various projections and grooves exist, and therefore the configuration and/or orientation of the various projections and grooves in the stator 20 and/or rotor 30 are in no way limiting. The bearing isolator 10 as disclosed herein may be used with any configuration stator 20 and/or rotor 30 wherein the stator 20 may be configured with a conductive segment retention chamber for retaining at least one conductive segment 46 therein or a receptor groove 24 as described in detail below.

Figure 4:
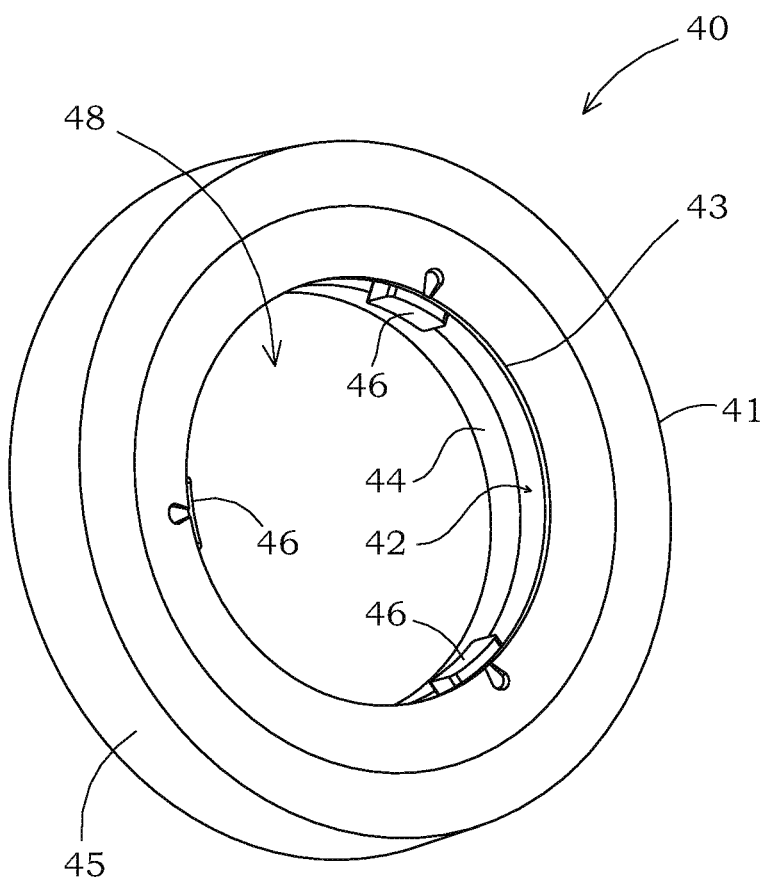
FIG. 4 is a perspective view of the first embodiment of the current diverter ring.
Figure 5:
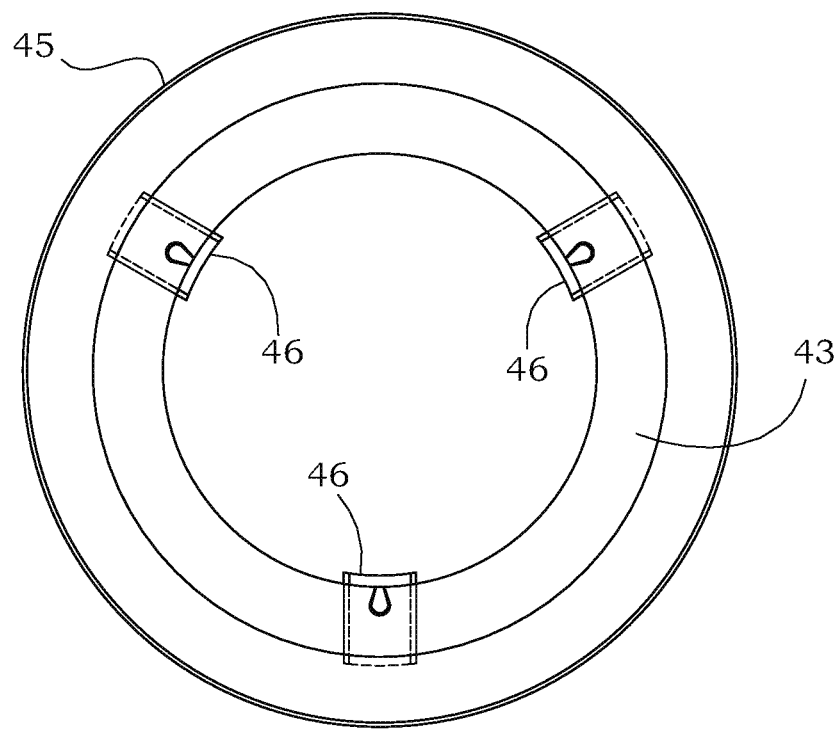
FIG. 5 is an axial view of the first embodiment of the current diverter ring.

A first embodiment of a current diverter ring (CDR) 40 is shown in perspective in FIG. 4, and FIG. 5 provides an axial view thereof. The CDR 40 may be used with any rotating equipment that has a tendency to accumulate an electrical charge on a portion thereof, such as electrical motors, gearboxes, bearings, or any other such equipment. The first embodiment of the CDR 40 is designed to be positioned between an equipment housing 16 and a shaft 14 protruding from the equipment housing 16 and rotatable with respect thereto.

Generally, the CDR 40 is comprised of a CDR body 41, which may be fixedly mounted to the equipment housing 16. In the first embodiment, a first wall 43 and a second wall 44 extend from the CDR body 41 and define an annular channel 42. At least one conductive segment 46 is fixedly retained in the annular channel 42 so that the conductive segment 46 is in contact with the shaft 14 so as to create a low impedance path from the shaft 14 to the equipment housing 16.

Figure 6:
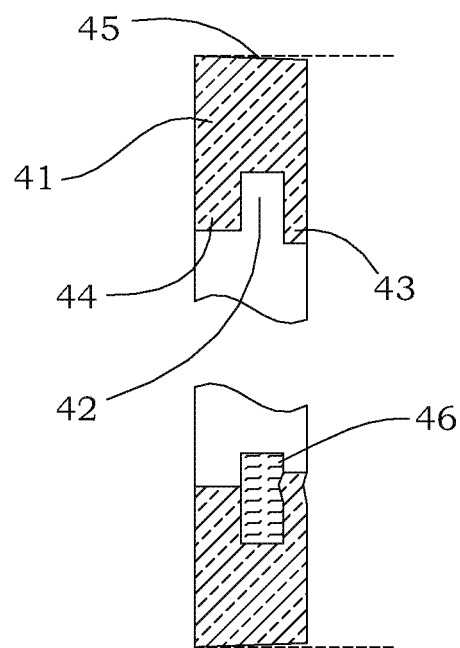
FIG. 6 is a cross-sectional view of the first embodiment of the current diverter ring.
Figure 7:
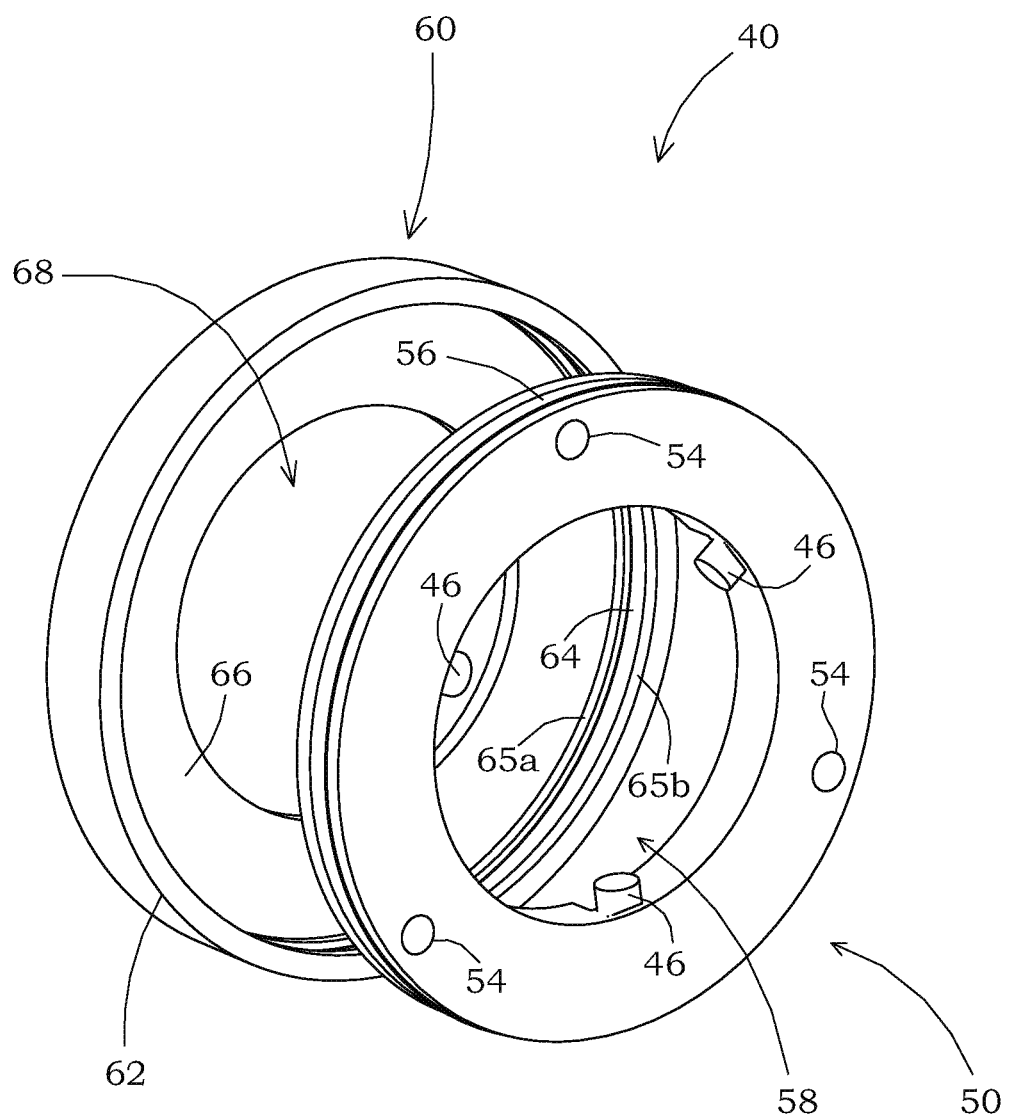
FIG. 7 is a perspective, exploded view of a second embodiment of the current diverter ring.

A cross-sectional view of the first embodiment of the CDR 40 is shown in FIG. 6. As shown in FIG. 6, the axial thickness of the first wall 43 is less than that of the second wall 44. In the first embodiment, the conductive segment 46 is retained within the annular channel 42 by first positioning the conductive segment 46 within the annular channel 42 and then deforming the first wall 43 to reduce the clearance between the distal ends of the first and second walls 43, 44. Deforming the first wall 43 in this manner retains the conductive segment 46 within the annular channel 42. Depending on the material used for constructing the conductive segment 46, the deformation of the first wall 43 may compress a portion of the conductive segment 46 to further secure the position of the conductive segment 46 with respect to the shaft 14.

A detailed view of the CDR radial exterior surface 45 is shown in FIG. 6. The CDR radial exterior surface 45 may be configured with a slight angle in the axial dimension so that the CDR 40 may be press-fit into the equipment housing 16. In the first embodiment, the angle is one degree, but may be more or less in other embodiments not pictured herein. Also, in the first embodiment the first wall 43 is positioned adjacent the bearing 12 when the CDR 40 is installed in an equipment housing 16. However, in other embodiments not shown herein, the second wall 44 may be positioned adjacent the bearing 12 when the CDR 40 is installed in an equipment housing 16, in which case the angle of the CDR radial exterior surface 45 would be opposite of that shown in FIG. 6. The optimal dimensions/orientation of the CDR body 41, annular channel 42, first wall 43, second wall 44, and CDR radial exterior surface 45 will vary depending on the specific application of the CDR 40 and are therefore in no way limiting to the scope of the CDR 40.

As was true for the bearing isolator 10, a CDR 40 with a conductive segment retention chamber configured as an annular channel is not preferred. Performance and manufacturing considerations are among the reasons such a configuration is not preferred. Instead, the other embodiments of the CDR disclosed herein, which do not have an annular channel 42 and the attending difficulties, are preferred.

In other embodiments of the CDR 40 described in detail below, the CDR 40 is mounted to the equipment housing 16 using mounting apertures 54, straps 70, and fasteners 72 fashioned in either the CDR 40 or equipment housing 16. The CDR 40 may be mounted to the equipment housing 16 by any method using any structure suitable for the particular application without departing from the spirit and scope of the CDR 40.

In the embodiment of the CDR 40 shown in FIGS. 4 and 5, three conductive segments 46 are positioned within the annular channel 42. The optimal number of conductive segments 46 and the size and/or shape of each conductive segment 46 will vary depending on the application of the CDR 40, and is therefore in no way limiting. The optimal total length of all conductive segments 46 and the total surface area of the conductive segments 46 that are in contact with the shaft 14 will vary from one application to the next, and is therefore in no way limiting to the scope of the CDR 40 or of a bearing isolator 10 configured with conductive segments 46 (such as the bearing isolator shown in FIGS. 2 and 3).

In the embodiment shown in FIGS. 4-6, the CDR 40 may be sized to be engaged with a bearing isolator 10 having a receptor groove 24, such as the bearing isolator 40 shown in FIGS. 2 and 3. As described above, FIGS. 2 and 3 shown one embodiment of a bearing isolator 10 fashioned to engage a CDR 40. The receptor groove 24 may be formed as a recess in the stator 20 that is sized and shaped to accept a CDR 40 similar to the one shown in FIGS. 4-6, or other embodiments of the CDR 40 disclosed herein. The CDR 40 may be press-fit into the receptor groove 24, or it may be affixed to the stator 20 by any other method or structure that is operable to fixedly mount the CDR 40 to the stator 20, including but not limited to set screws, welding, etc. When the CDR 40 is properly engaged with the receptor groove 24 in the stator 20, the CDR radial exterior surface 45 abuts and contacts the interior surface of the receptor groove 24.

In any of the embodiments of the CDR 40 or bearing isolator 10 employing conductive segments 46, the conductive segment 46 may be constructed of carbon, which is conductive and naturally lubricious. In one embodiment, the conductive segment 46 is constructed of a carbon mesh manufactured by Chesterton and designated 477-1. In other embodiments the conductive segment 46 has no coating on the exterior of the carbon mesh. When mesh or woven materials are used to construct the conductive segments 46, often the surface of the conductive segment 46 that contacts the shaft 14 becomes frayed or uneven, which may be a desirable quality to reduce rotational friction in certain applications. Shortly after the shaft 14 has been rotating with respect to the conductive segments 46, certain embodiments of the conductive segments 46 will wear and abrade from the surface of the shaft 14 so that friction between the conductive segments 46 and the shaft 14 is minimized. The conductive segments 46 may be fibrous, solid, or other material without limitation.

In general, it may be desirable to ensure that the impedance from the shaft 14 to the equipment housing 16 is in the range of 0.2 to 10 ohms to ensure that electrical charges that have accumulated on the shaft 14 are discharged through the equipment housing 16 and to the base of the motor (not shown) rather than through the bearing(s) 12. The impedance from the shaft 14 to the equipment housing 16 may be decreased by ensuring the fit between the bearing isolator 10 and equipment housing 16, bearing isolator 10 and CDR 40, and/or CDR 40 and equipment housing 16 has a very small tolerance. Accordingly, the smaller the gap between the bearing isolator 10 and equipment housing 16, bearing isolator 10 and CDR 40, and/or CDR 40 and equipment housing 16, the lower the impedance from the shaft 14 to the equipment housing 16.

In other embodiments not pictured herein, conductive filaments (not shown) may be affixed to either the CDR 40 or bearing isolator 10 or embedded in conductive segments 46 affixed to either the CDR 40 or bearing isolator 10. Such filaments may be constructed of aluminum, copper, gold, carbon, conductive polymers, conductive elastomers, or any other conductive material possessing the proper conductivity for the specific application. Any material that is sufficiently lubricious and with sufficiently low impedance may be used for the conductive segment(s) 46 in the CDR 40 and/or bearing isolator 10.

In another embodiment of the CDR 40 not pictured herein, the CDR 40 is affixed to the shaft 14 and rotates therewith. The first and second walls 43, 44 of the CDR 40 extend from the shaft 14, and the CDR main body 41 is adjacent the shaft 14. The centrifugal force of the rotation of the shaft 14 causes the conductive segments 46 and/or conductive filaments to expand radially as the shaft 14 rotates. This expansion allows the conductive segments 46 and/or filaments to make contact with the equipment housing 16 even if grease or other contaminants and/or lubricants (which increase impedance and therefore decrease the ability of the CDR 40 to dissipate electrical charges from the shaft 14 to the equipment housing 16) have collected in an area between the CDR 40 and the equipment housing 16.

In another embodiment not pictured herein, a conductive sleeve (not shown) may be positioned on the shaft 14. This embodiment is especially useful for a shaft 14 having a worn or uneven surface that would otherwise lead to excessive wear of the conductive segments 46. The conductive sleeve (not shown) may be constructed of any electrically conductive material that is suitable for the particular application, and the conductive sleeve (not shown) may also be fashioned with a smooth radial exterior surface. The conductive sleeve (not shown) would then serve to conductive electrical charges from the shaft 14 to the conductive segments 46 in either the CDR 40 or a bearing isolator 10. Another embodiment that may be especially useful for use with shafts 14 having worn or uneven exterior surfaces is an embodiment wherein conductive filaments or wires are inserted into the conductive segments 46. These conductive filaments or wires may be sacrificial and fill in depressions or other asperities of the surface of the shaft 14.

In another embodiment not pictured herein, conductive screws (not shown) made of suitable conductive materials may be inserted into the conductive segments 46. Furthermore, spring-loaded solid conductive cylinders may be positioned within the CDR 40 and/or bearing isolator 10 in the radial direction so as to contact the radial exterior surface of the shaft 14.

Although elegant in its design, the CDR 40 shown in FIGS. 4-6 is not the preferred embodiment of the CDR 40, as previously mentioned. Among other considerations, performance and manufacturing difficulties with this design dictate that other embodiments of the CDR 40 are more desirable. Particularly, the two-piece CDR 40 shown in FIGS. 7-14 and described in detail below and the radial CDR 80 shown in FIGS. 15A, 15B result in both of those embodiments being superior to that shown in FIGS. 4-6.

Illustrative Embodiment of a Two-Piece CDR

A second embodiment of a CDR 40 is shown in FIGS. 7-14. In the second embodiment of the CDR 40, the CDR is formed from the engagement of an inner body 50 with an outer body 60, which are shown disengaged but in relation to one another in FIG. 7. The inner body 50 and outer body 60 in the second embodiment of the CDR 40 engage one another in a snapping, interference-type fit, which is described in detail below.

Figure 9:
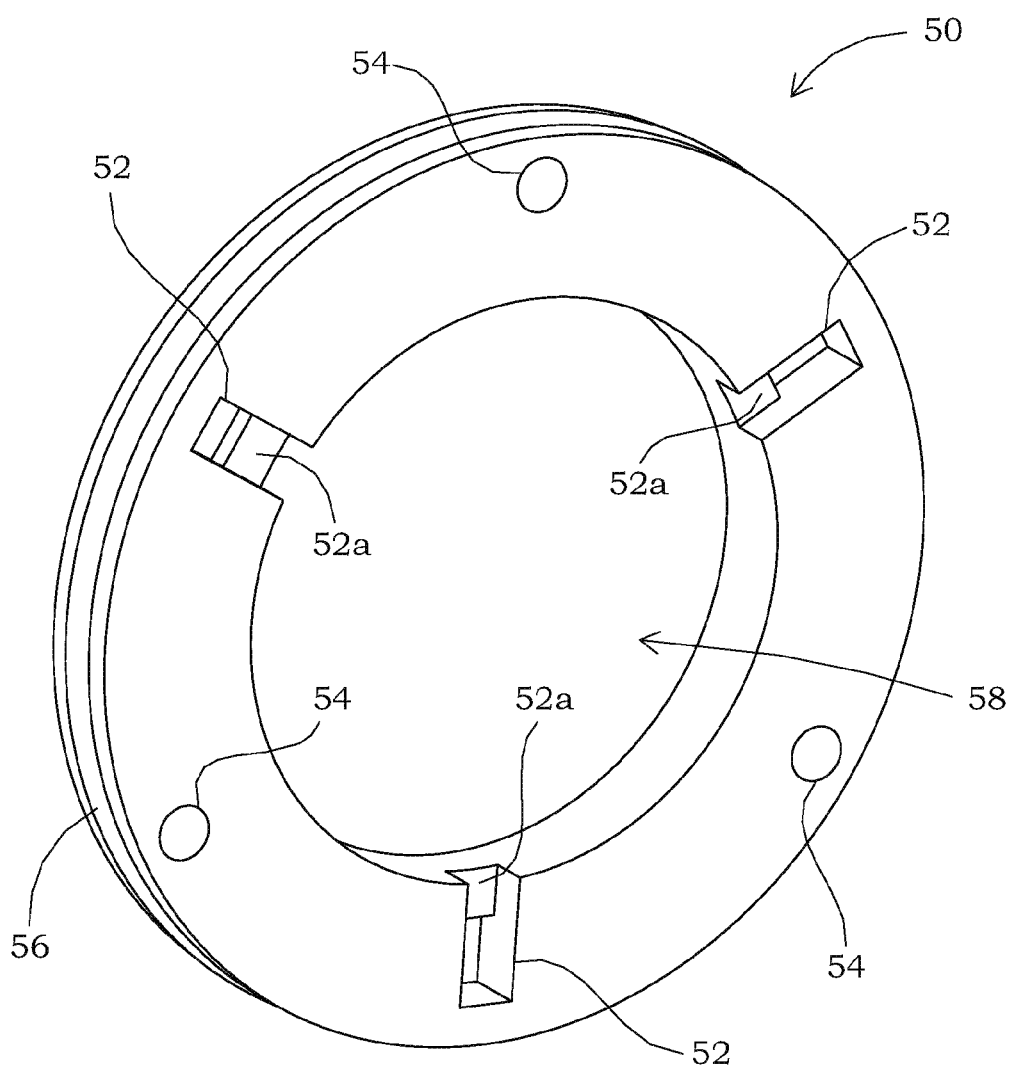
FIG. 9 is a detailed perspective view of one embodiment of an inner body for use with the second embodiment of the current diverter ring.

A perspective view of an inner body 50, which may be generally ring shaped, is shown in FIG. 9. The inner body 50 may include at least one radial channel 52 fashioned in an exterior face of the inner body 50, which includes a main aperture 58 through which a shaft 14 may be positioned. The embodiment pictured in FIG. 9 includes three radial channels 52, but other embodiments may have a greater or lesser number of radial channels 52, and therefore the number of radial channels in no way limits the scope of the CDR 40. Each radial channel 52 may be formed with a catch 52a therein to more adequately secure certain types of conductive segments 46. It is contemplated that a catch 52a will be most advantageous with conductive segments 46 made of a deformable or semi-deformable material (as depicted in FIG. 14B), but a catch 52a may be used with conductive segments 46 constructed of materials having different mechanical properties. The radial channels 52 as shown are configured to open toward a shaft 14 positioned in the main aperture 58. The inner body 50 may be formed with a ridge 56 on the radial exterior surface thereof. The ridge 56 may be configured to engage the annular groove 64 formed in the outer body 60 as described in detail below.

Figure 8A:
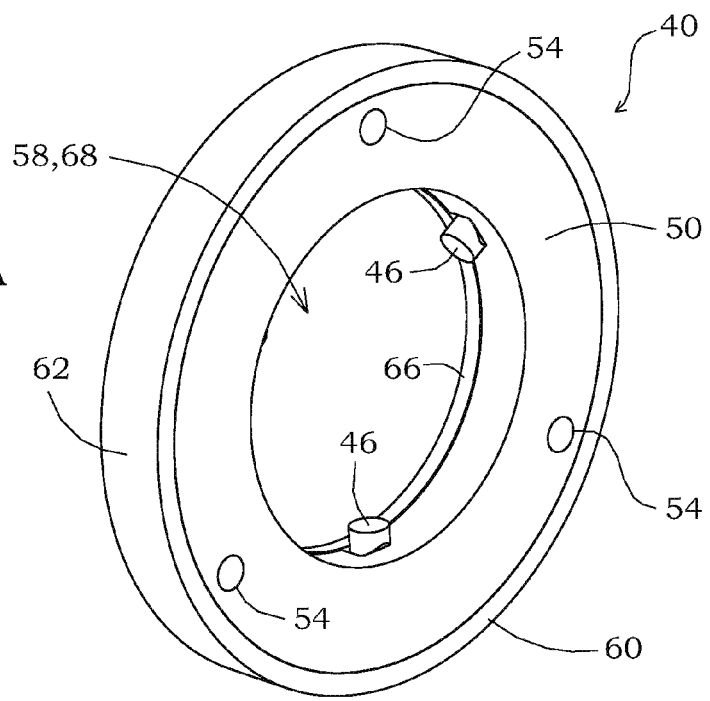
FIG. 8A is a perspective view of a second embodiment of the current diverter ring assembled.
Figure 8B:
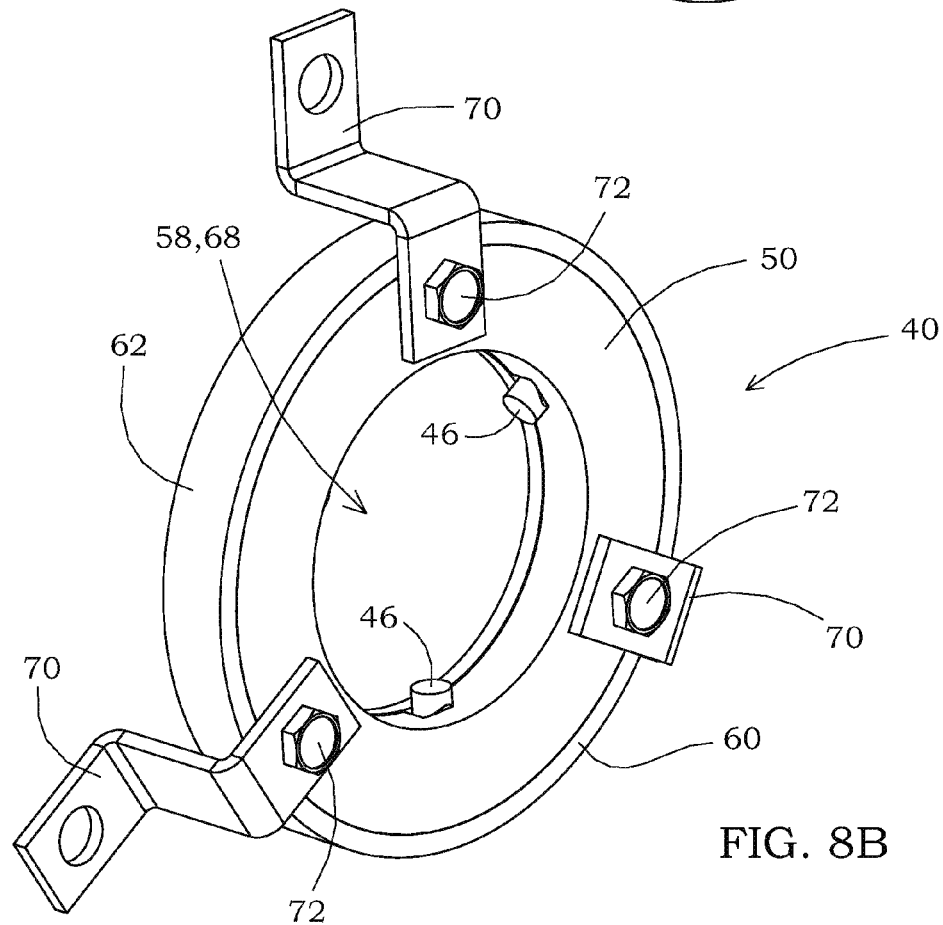
FIG. 8B is a perspective view of a second embodiment of the current diverter ring assembled with mounting clips.

The inner body 50 may be formed with one or more mounting apertures 54 therein. The embodiment shown in FIGS. 8-11 is formed with three mounting apertures 54. Mounting apertures 54 may be used to secure the CDR 40 to an equipment housing 16 or other structure as shown in FIG. 1. A strap 70 or clip may be secured to the CDR 40 using a fastener 72, such as a screw or rivet, engaged with a mounting aperture 54, as shown in FIGS. 1 and 8B. The presence or absence of mounting apertures 54 will largely depend on the mounting method of the CDR 40. For example, in the embodiment shown in FIGS. 14A and 14B, the inner body 50 does not include any mounting apertures 54. It is contemplated that such embodiments will be optimal for use within a bearing isolator 10 and/or a CDR 40 that will be press fit into an equipment housing 16 or other structure.

Figure 12:
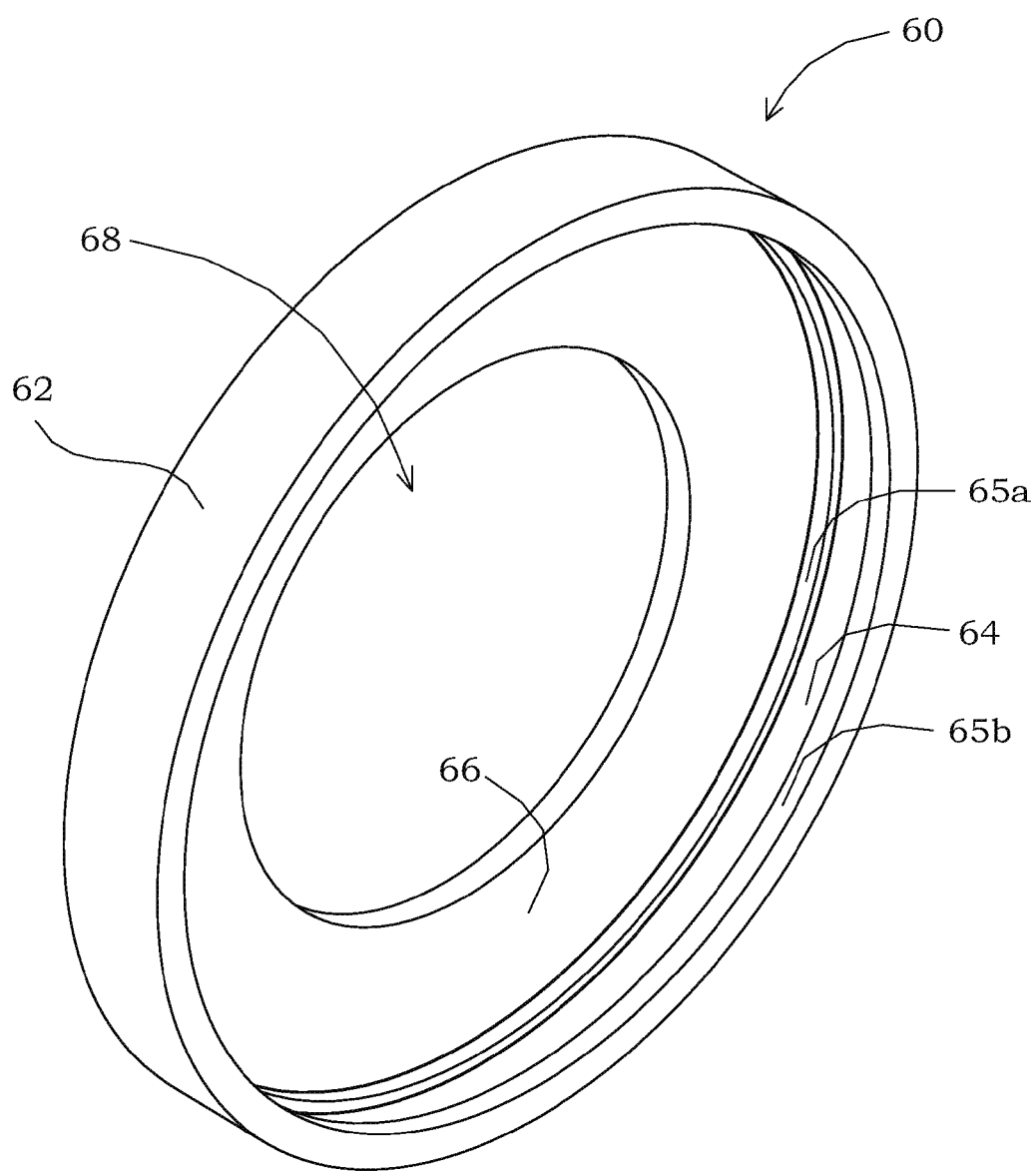
FIG. 12 is a detailed perspective view of one embodiment of an outer body for use with the second embodiment of the current diverter ring.
Figure 13A:
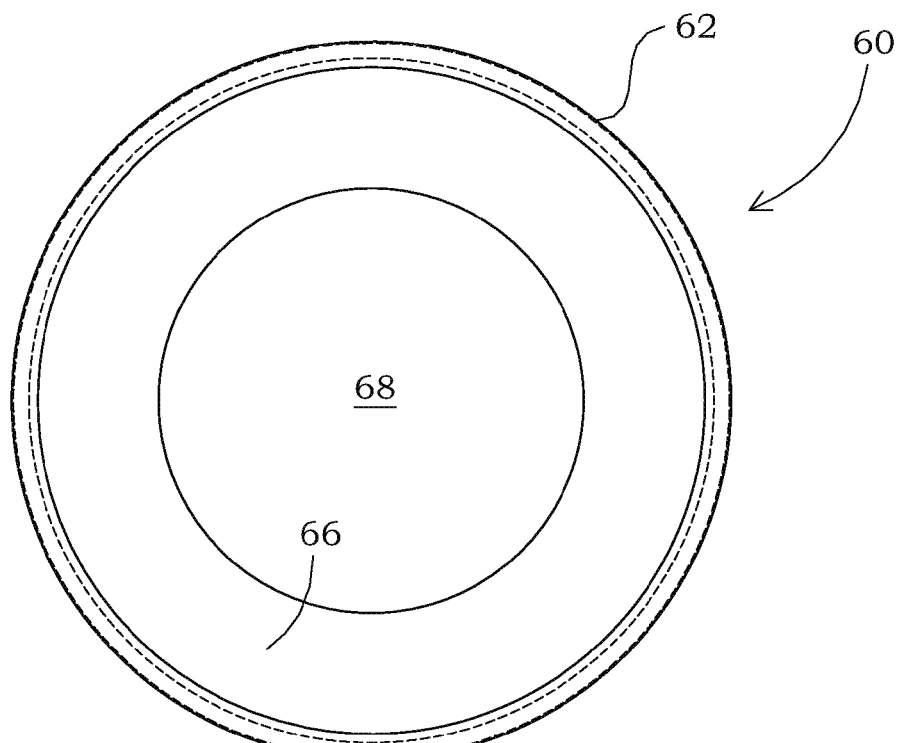
FIG. 13A is an axial view of one embodiment of an outer body for use with the second embodiment of the current diverter ring.
Figure 13B:
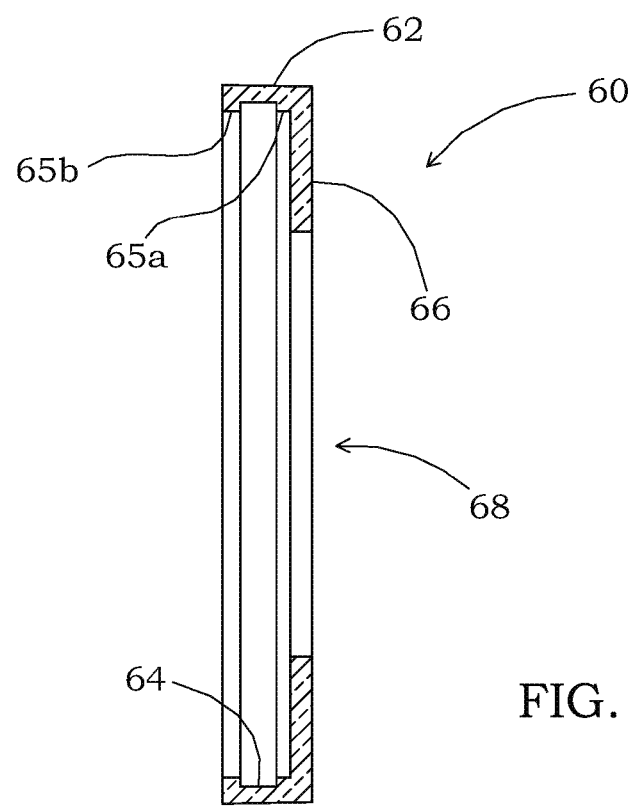
FIG. 13B is a cross-sectional view of one embodiment of an outer body for use with the second embodiment of the current diverter ring.

A perspective view of an outer body 60, which also may be generally ring shaped, is shown in FIG. 12. The outer body 60 may be formed with a base 62 having an annular groove 64 formed on the radial interior surface thereof. The annular groove 64 may be defined by a first annular shoulder 64a and a second annular shoulder 65b. A radial projection 66 may extend radially inward from the base 62 adjacent either the first and/or second shoulder 65a, 65b. In the embodiment pictured, the radial projection 66 is positioned adjacent the first annular shoulder 65a and includes a main aperture 68 therein, through which a shaft 14 may be positioned.

Figure 10A:
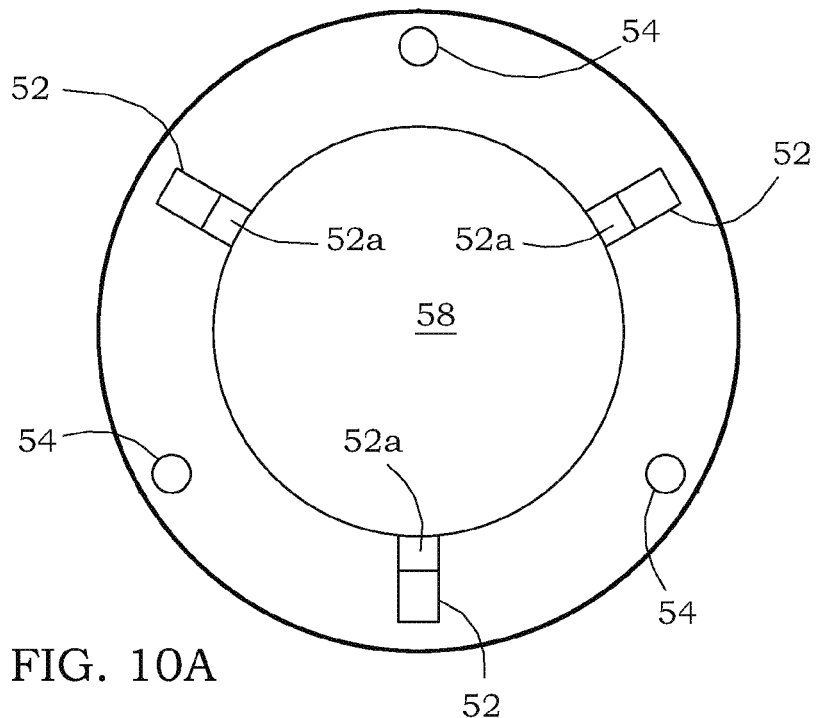
FIG. 10A is an axial view of one embodiment of an inner body for use with the second embodiment of the current diverter ring.
Figures 10B, 11:
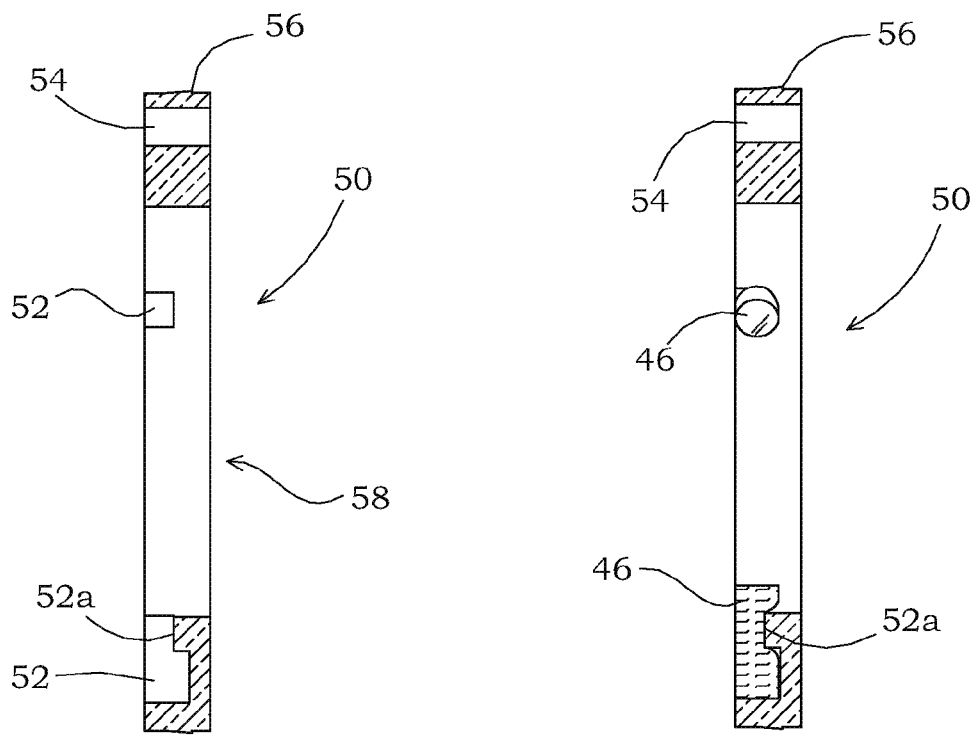
FIG. 10B is a cross-sectional view of one embodiment of an inner body for use with the second embodiment of the current diverter ring.
FIG. 11 is a cross-sectional view of one embodiment of an inner body for use with the second embodiment of the current diverter ring with conductive fibers positioned therein.

The annular groove 64 may be configured such that the ridge 56 formed in the inner body 50 engages the annular groove 64 so as to substantially fix the axial position of the inner body 50 with respect to the outer body 60. As shown in FIGS. 10B, and 14B, the ridge 56 may be slanted or tapered so that upon forced insertion of the inner body 50 in the outer body 60, the ridge 56 slides past the second annular shoulder 65b and into the annular groove 64 to axially secure the inner body 50 and the outer body 60. The engagement between the ridge 56 and the annular groove 64 thereafter resists separation or dissociation of the inner and outer bodies 50, 60. In other embodiments not shown herein, the ridge 56 is not limited to a tapered configuration. The ridge 56 and base 62 may also be configured so an interference fit is created upon engagement to resist separation or disassociation of the inner and outer bodies 50, 60.

Figure 14A:
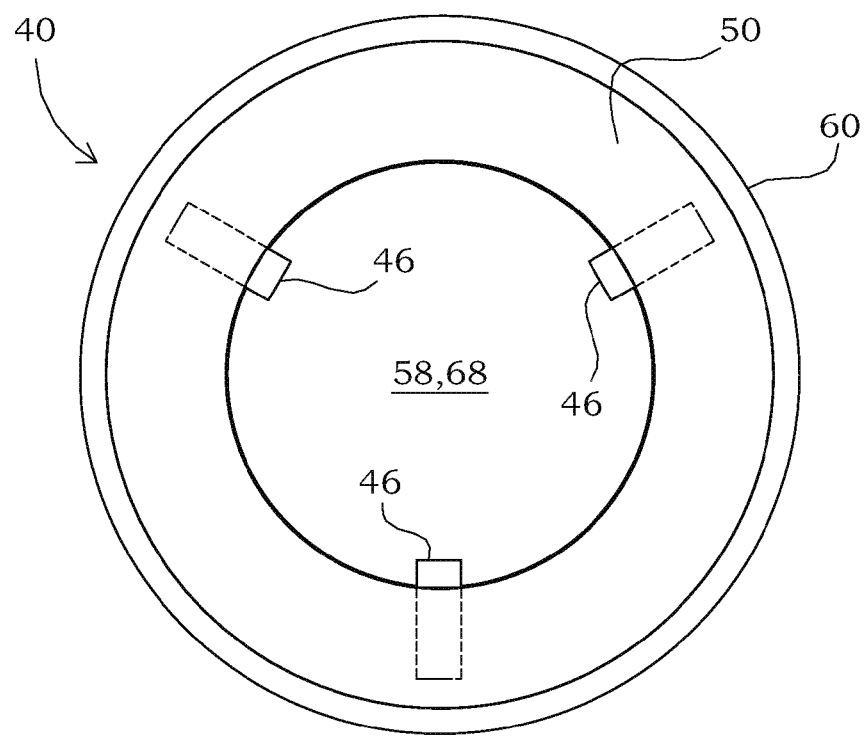
FIG. 14A is an axial view of the second embodiment of the current diverter ring assembled.
Figure 14B:
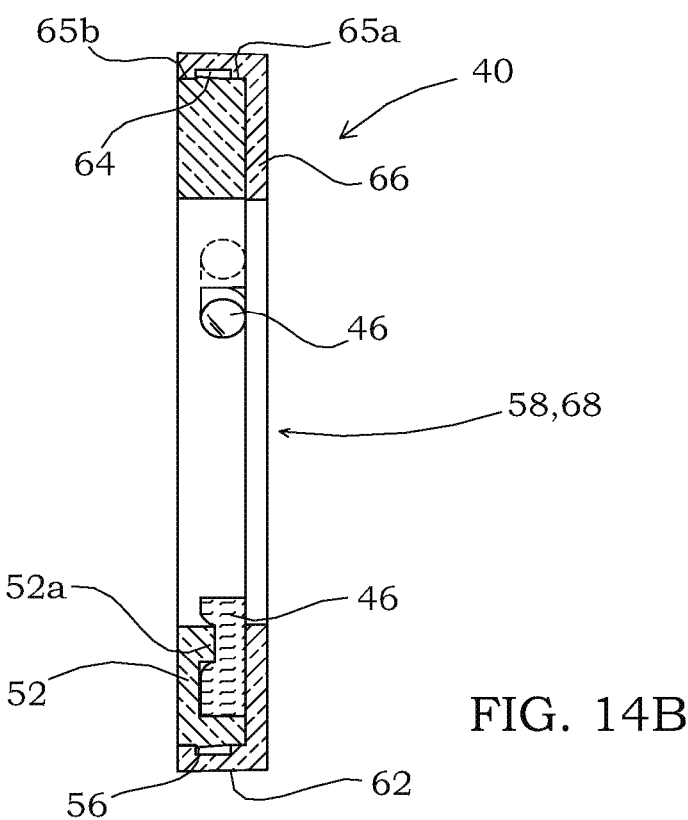
FIG. 14B is a cross-sectional view of the second embodiment of the current diverter ring assembled.
Figure 16A:
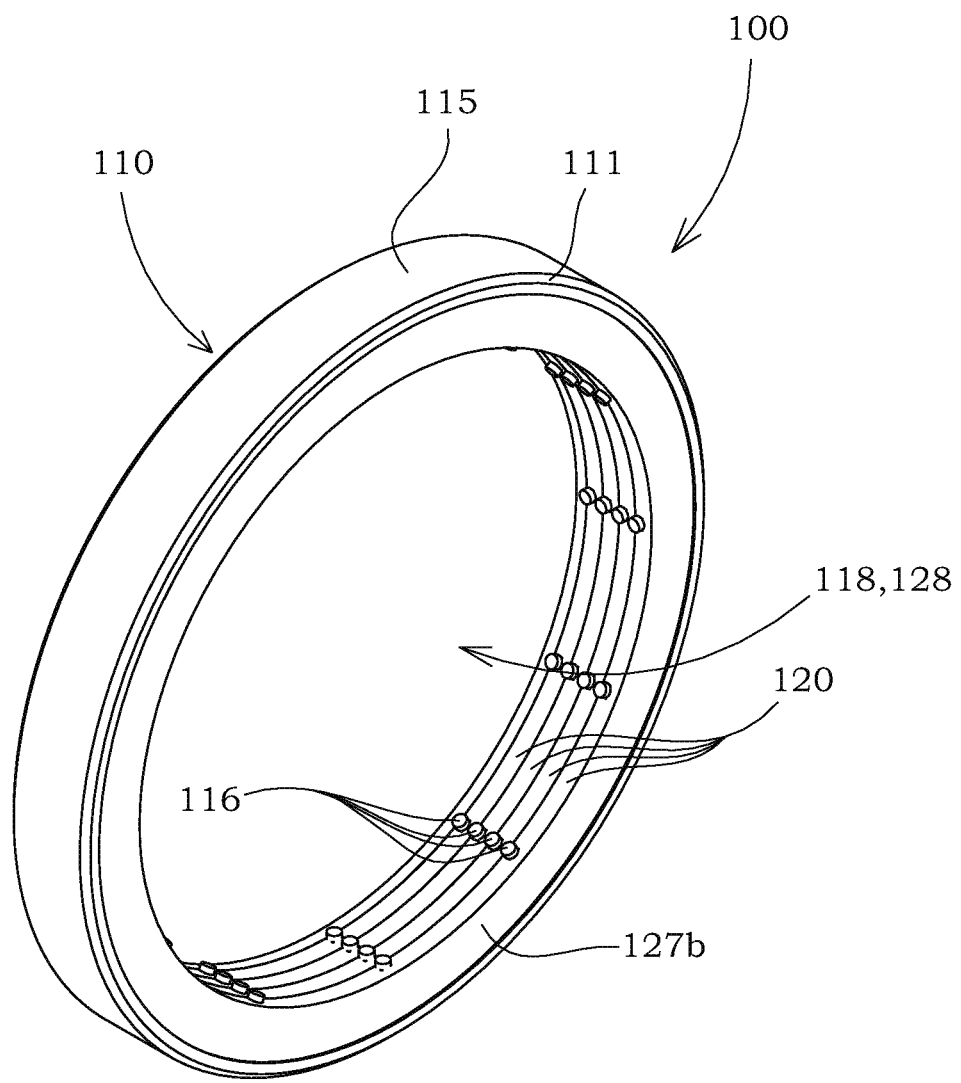
FIG. 16A is a perspective view of a fourth embodiment of the CDR.
Figure 16B:
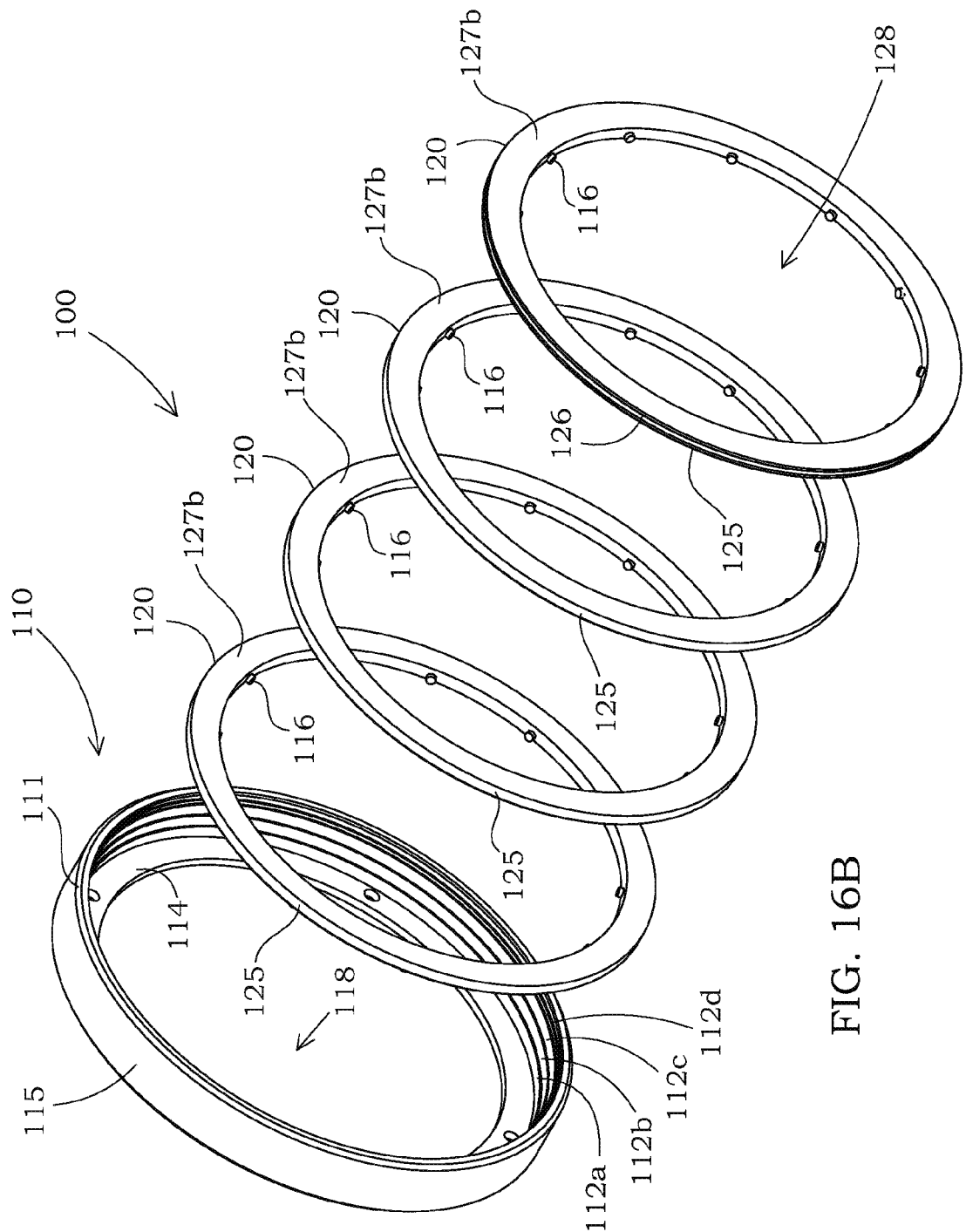
FIG. 16B is a perspective, exploded view of the fourth embodiment of the CDR.
Figure 17A:
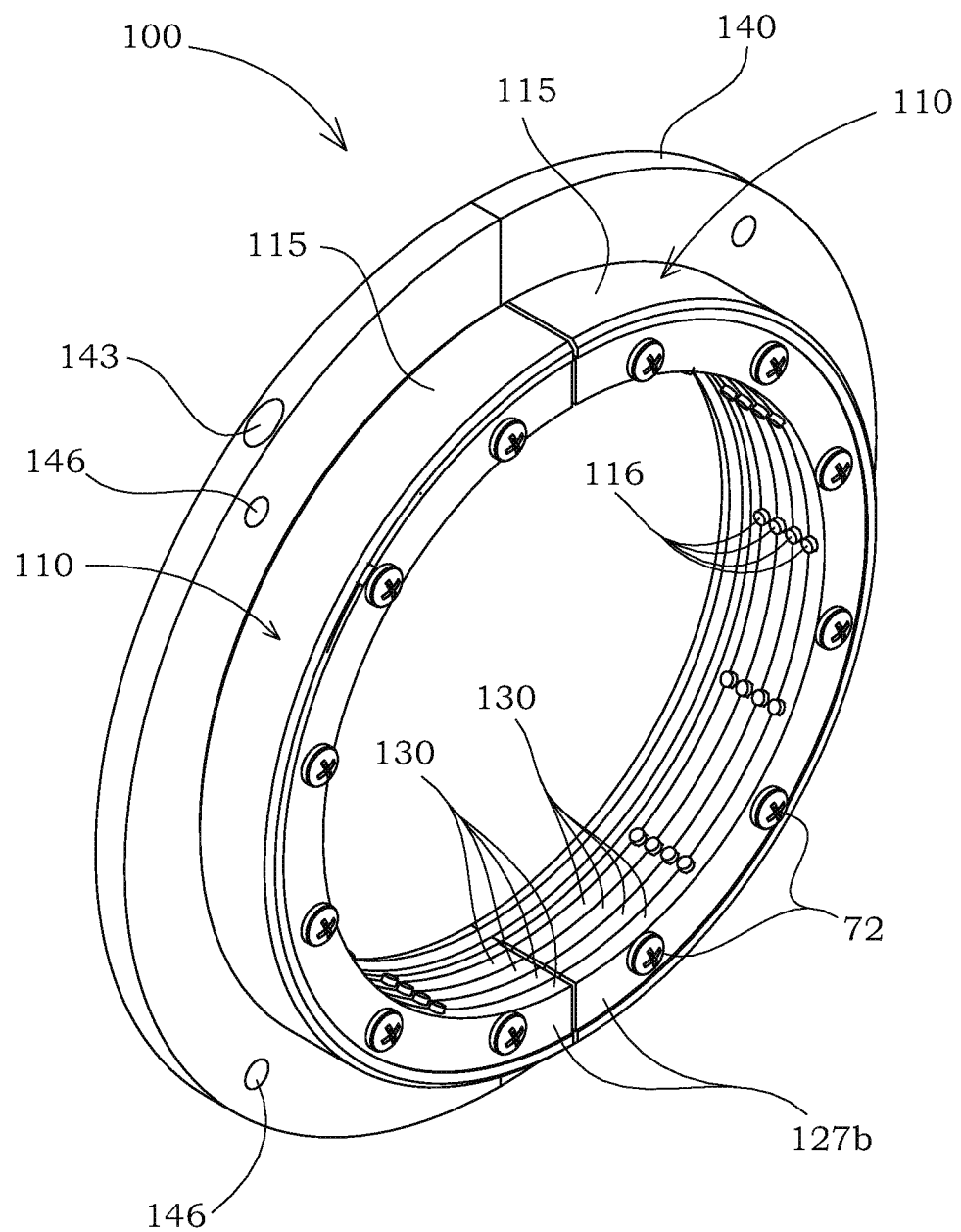
FIG. 17A is a perspective view of a fifth embodiment of the CDR having a split design.
Figure 17B:
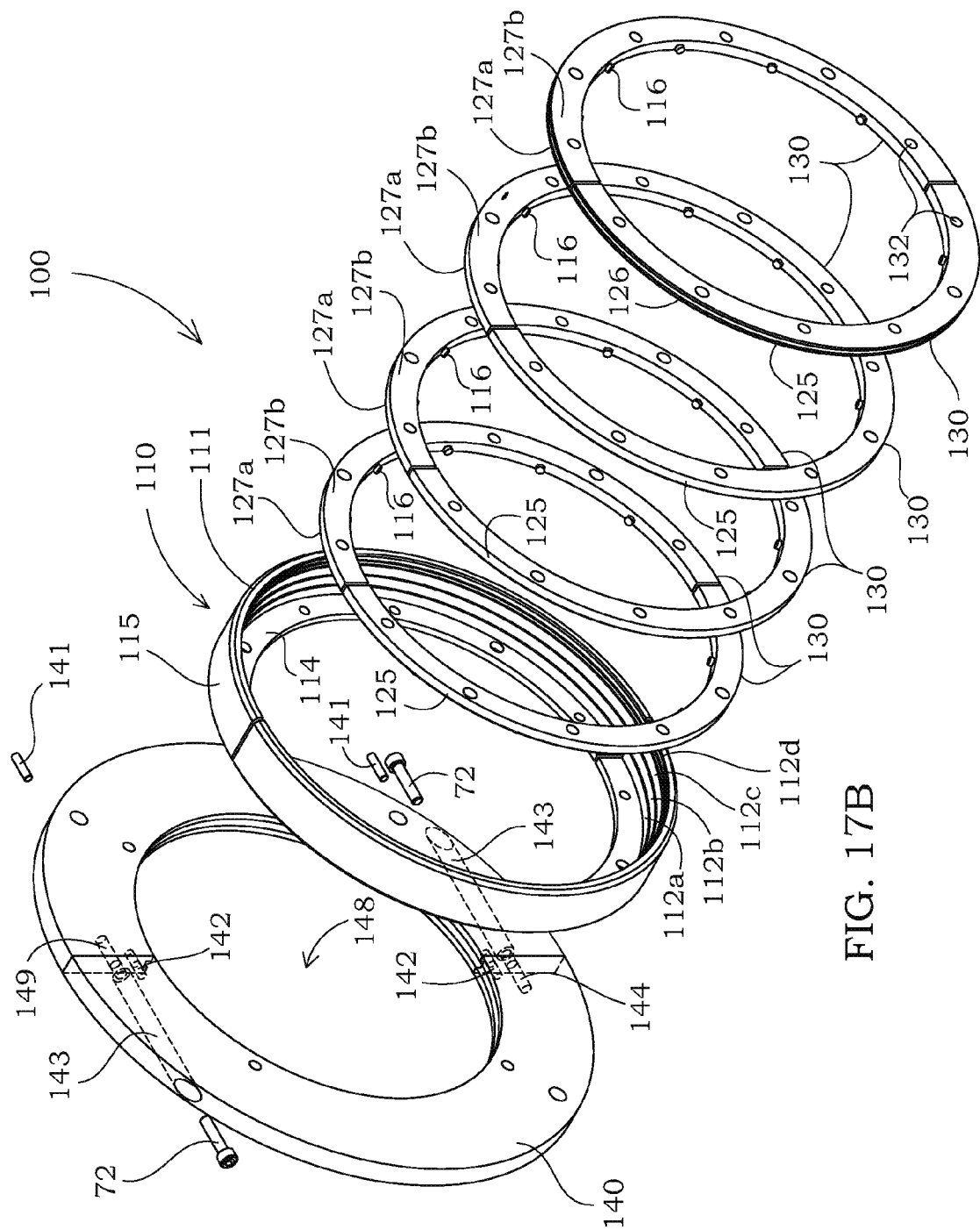
FIG. 17B is a perspective, exploded view of the fifth embodiment of the CDR.

As shown in FIGS. 14A and 14B, the inner body 50 and outer body 60 may be configured so that the interior periphery of the radial projection 66 has the same diameter as the interior periphery of the inner body 50 so that both the inner and outer bodies 50, 60 have the same clearance from a shaft 14 when installed. It is contemplated that in most applications the CDR 40 will be installed so that the surface shown in FIG. 14A is axially exterior to the equipment housing 16 or other structure. However, if the CDR 40 is engaged with a bearing isolator 10, the CDR 40 may be oriented such that the surface shown in FIG. 14A is facing toward the interior of the equipment housing 16 or other structure to which the bearing isolator 10 is mounted.

As shown in FIG. 11, conductive segments 46 may be positioned in each radial channel 52. It is contemplated that the radial channels 52 will be fashioned in the axial surface of the inner body 50 that is positioned adjacent the radial projection 66 of the outer body 60 when the CDR 40 is assembled, as shown in FIGS. 14A and 14B. This orientation secures the axial position of the conductive segments 46. As mentioned previously, a CDR 40 employing radial channels 52 for retention of conductive segments 52 is preferred as compared to a CDR 40 having an annular channel 42. Typically, but depending on the materials of construction, the conductive segments 46 are sized so as to extend past the minor diameter of the inner body 50 into the main aperture 58 to contact the shaft 14. The radial channels 52 are sized so as to not intersect the outer periphery of the inner body 50. This prevents the conductive segment 46 from contacting the annular groove 64 of the outer body 60.

The bearing isolator 10 and CDR 40 may be constructed from any machinable metal, such as stainless steel, bronze, aluminum, gold, copper, and combinations thereof, or other material having low impedance. The CDR 40 or bearing isolator 10 may be flange-mounted, press-fit, or attached to the equipment housing 16 by any other structure or method, such as through a plurality of straps 70 and fasteners 72.

In certain applications, performance of the bearing isolator 10 may be improved by eliminating the O-rings 18 and their companion grooves fashioned in the stator 20 and the rotor 30, as shown in FIGS. 2 and 3. The high-impedance nature of material used to construct the O-ring 18 (such as rubber and/or silicon) may impede conductivity between bearing isolator 10 and the equipment housing 16, thereby decreasing the overall electrical charge dissipation performance of the bearing isolator 10. However, if the O-rings 18 may be constructed of a low-impedance material, they may be included in any application of the CDR 40 and/or bearing isolator 10. The optimal dimensions/orientation of the CDR 40, inner body 50, outer body 60, and various features thereof will vary depending on the specific application of the CDR 40 and are therefore in no way limiting to the scope of the CDR 40.

Second Embodiment of a Single-Piece CDR

A radial CDR 80 is another embodiment of a CDR 40, which is shown in FIGS. 15A, 15B as a ring-shaped structure having a main aperture 88 in the center thereof. As with other embodiments of the CDR 40 disclosed herein, the CDR 40 may be mounted to rotational equipment through any structure and/or method without limitation. The embodiment of the radial CDR 80 shown in FIGS. 15A and 15B includes three straps 70 affixed to the radial CDR 80 via fasteners 72. Other fasteners 72 may be used to secure the straps 70 to the rotational equipment, thereby securing the radial CDR 80 to the rotational equipment. In other embodiments of the radial CDR 80, the radial exterior surface 85a of the radial CDR 80 is press-fit into the rotational equipment housing 16. However, the mounting method for the radial CDR is in no way limiting to its scope.

The embodiment of the radial CDR 80 shown herein includes three radial channels 82 extending from the radial exterior surface 85a to the radial interior surface 85b. Each radial channel 82 may include a radial channel shelf 83, which is best shown in FIG. 15B. In the pictured embodiment, the radial channel shelf 83 is located adjacent the radial interior surface 85b of the radial CDR 80.

A conductive assembly 86 may be configured to securely fit within the radial channel 82. One embodiment of a conductive assembly 86 is shown in detailed in FIG. 15C. The conductive assembly 86 may comprise a binder 86a that is primarily located within the radial channel 82 and a contact portion 86b that extends radially inward from the radial channel 82. The binder 86a may be formed as any structure that retains the elements of the conductive assembly 86, including but not limited to a chemical adhesive, structural cap or tether, or combinations thereof. Other types of conductive assemblies 86 may be used with the radial CDR 80 without limitation.

The conductive assemblies 86 in the radial CDR 80 may be configured to be replaceable. That is, once the contact portion 86b of a conductive assembly 86 has been exhausted, or the conductive assembly 86 should otherwise be replaced, the user may remove the conductive assembly 86 from the radial channel 82 and insert a new conductive assembly 86 therein.

Illustrative Embodiments of a Multi-Jung CDR

A first embodiment of a multi-ring CDR 100 is shown in FIGS. 16A-16D. This embodiment of a multi-ring CDR 100 is similar to the two-piece CDR 40 described in detail above and shown in FIGS. 7-14B. The multi-ring CDR 100 includes a retainer 110 with which at least two rings 120 are secured. The retainer 110 may be substantially ring-shaped with a retainer main aperture 118 in the center thereof, which retainer main aperture 118 corresponds to each ring main aperture 128.

The retainer 110 may be formed with a plurality of annular grooves 112a, 112b, 112c, 112d on the radial interior surface of the retainer base 111 to provide seating surfaces for the various rings 120. The embodiment of the multi-ring CDR 100 shown herein includes a total of four rings 120 and four annular grooves 112. However, other embodiments may be a greater or smaller number of rings 120 and corresponding annular grooves 112 without limiting the scope of the multi-ring CDR 100.

The rings 120 may be formed with a plurality of radial channels 122 similar to those formed in the inner body 50 for the embodiment of the CDR 40 shown in FIGS. 7-14. The radial channel 116 is typically formed on the interior axial surface 127a of the ring 120. A conductive segment 116 may be positioned in each radial channel 122. Additionally, each radial channel 122 may be formed with a catch 122a therein to better retain the conductive segment 116.

A retainer wall 114 may extend radially inward from the first annular groove 112a toward the retainer main aperture 118, which retainer wall 114 is analogous to the radial projection 66 of the outer body 60 for the CDR 40 embodiment shown in FIGS. 7-14. In the embodiments pictured herein, the retainer wall 114 is substantially perpendicular to the retainer base 111. The retainer wall 114 may serve as a stop for the innermost ring 120 as shown in FIGS. 16C and 16D. The interior axial surface 127a of the innermost ring 120 may abut the retainer wall 114, thereby compressing the conductive segments 116 positioned in the radial channels 122 of the innermost ring 120 between the ring 120 and the retainer wall 114. The ring radial exterior surface 125 of the innermost ring 120 may engage the first annular groove 112a in such a manner as to secure the innermost ring 120 to the retainer 110 via an interference fit.

The interior axial surface 127a of the ring 120 immediately exterior to the innermost ring 120 may abut the exterior axial surface 127b of the innermost ring 120, thereby compressing the conductive segments 116 positioned in the radial channels 112 of that ring 120 between that ring 120 and the innermost ring 120. The ring radial exterior surface 125 of the ring 120 immediately exterior to the innermost ring 120 may engage the second annular groove 112b in such a manner as to secure that ring 120 to the retainer via an interference fit. This is shown in detail in FIGS. 16C and 16D. The arrangement may continue with all rings 120 engaged with the retainer 110.

The outermost ring 120 may be configured with a ridge 162 on the ring radial exterior surface 125. This ridge 162 may be angled upward from the interior axial surface 127a to the exterior axial surface 127b, such that the ridge 126 engages a snap groove 113 that may be formed in the outermost annular groove 112 (which is the fourth annular groove 112d in the embodiment shown herein). Accordingly, the outermost ring 120 may be secured to the retainer 110, thereby securing all other rings 120, through the engagement of the ridge 126 with the snap groove 113. This is analogous to the engagement of the inner body 50 with the outer body 60 via the ridge 56 and annular groove 64, respectively located on the inner body 50 and outer body 60 for the CDR 40 shown in FIGS. 7-14.

In a split embodiment of a multi-ring CDR 100, the rings 120 may be secured to the retainer 110 using fasteners, such as fasteners, as shown in FIGS. 17A-17D. The rings 120 in this embodiment may be comprised of two ring segments 130, and the retainer 110 may be formed as two separate pieces. The interaction between the innermost split ring segments 130 and the retainer 110 is analogous to that described above for the first embodiment of the multi-ring CDR 100. Furthermore, the interaction between adjacent split ring segments 130 and the corresponding retention of conductive segments 116 for the split multi-ring CDR 100 is analogous to that described for the first embodiment of the multi-ring CDR 100. To retain the split ring segments 130, an interference fit between the ring radial exterior surface 125 and individual annular grooves 112a, 112b, 112c, 112d in conjunction with a snap groove 113 in the outermost annular groove 112 and a ridge 126 in the outermost ring 120. The interference fit securement mechanism may be employed alone or in combination with a plurality of fasteners 72, or the plurality of fasteners 72 may be solely employed as a securement mechanism. If fasteners 72 are used, the ring segments 130 may be formed with apertures 132 to receive the fasteners 72.

A backing ring 140 may be used with certain embodiments of the CDR 40, 80, 100, as shown in FIGS. 17A-17D. The backing ring 140 may also be formed of two distinct pieces, which pieces may be secured to one another through a plurality of corresponding alignment pin receptors 142, fastener bores 143, fastener receptors 144 and corresponding alignment pins 141 and fasteners 72. In the embodiment shown in FIG. 17B, two alignment pins 141 and corresponding alignment pin receptors 142 are positioned at the seam of the backing ring 140 to properly align the two pieces. Two fasteners 72 may be placed in respective fastener bores 143 so that a portion of each fastener 72 engages a respective fastener receptor 144, thereby securing the two pieces of the backing ring 140 to one another.

The backing ring 140 may be manufactured so that the gap between the two pieces is negligible so as to preventingress of contaminants to and egress of lubricants from the bearing location. To do this, first a circle may be bisected across its diameter. The two pieces, when joined, form an ellipse due to the material removed during cutting. Accordingly, the two pieces may be machined so that together they form a perfect or near perfect circle. Alignment pin receptors 142 and corresponding alignment pins 141 and/or fastener bores 143 and corresponding fasteners 72 may be used alone or in combination to secure the relative positions of the two pieces (as described above) during the machining Relative stability of the two pieces is required to create a perfect or near perfect circle from the two pieces. At this point the backing ring main aperture 148 and O-ring channel 145 may be fashioned in the backing ring 140 to the desired specifications. Apertures 146 may be fashioned in the backing ring 140 per the user's requirements so that the perfectly or near perfectly circular backing ring 140 may be properly centered over a shaft or other structure.

Illustrative Embodiment of an Adpatable CDR

Figure 18A:
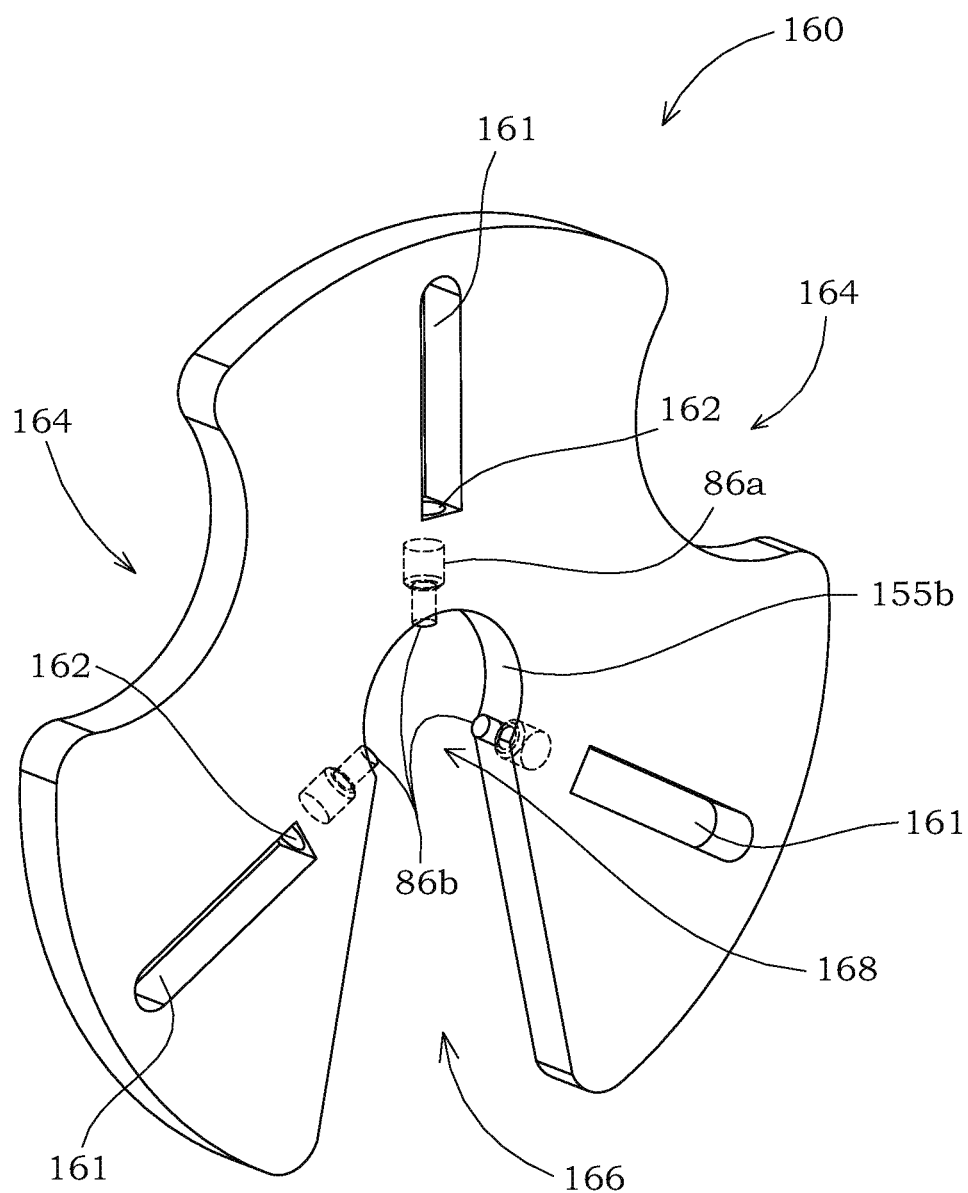
FIG. 18A is a perspective view of one embodiment of an adaptable CDR.
Figure 18B:
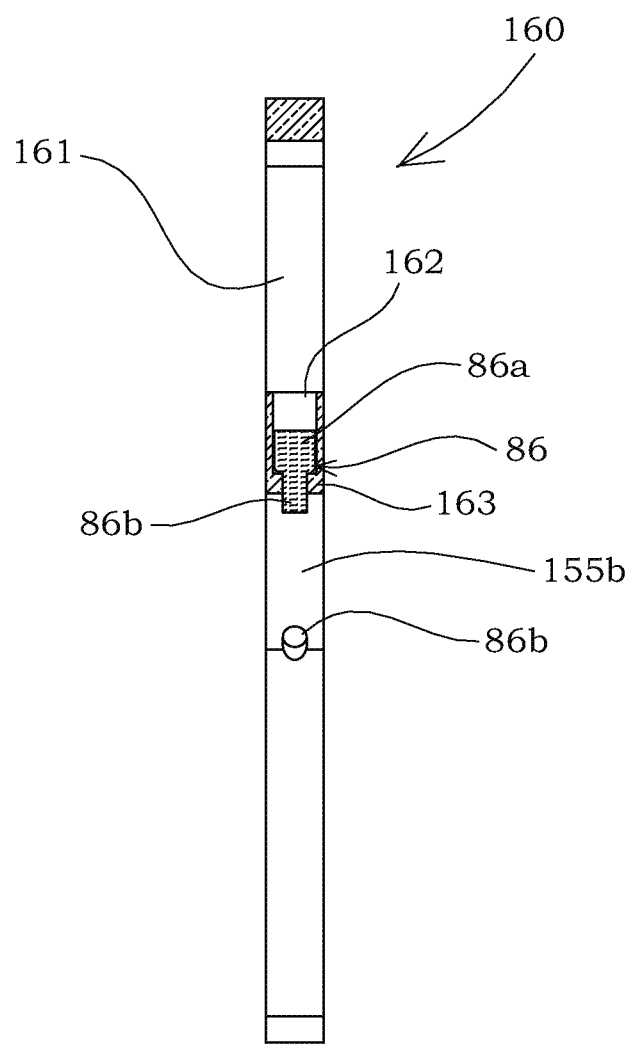
FIG. 18B is an axial cross section view of one embodiment of an adaptable CDR.

One embodiment of an adaptable CDR 160 is shown in FIGS. 18A and 18B. The adaptable CDR 160 is designed so that it may be mounted to a wide variety of rotational equipment with different geometries. The adaptable CDR may include a plurality of radial channels 162 that extend from the radial exterior surface 165a to the radial interior surface 165b adjacent the main aperture 168. Like the radial channels 82 in the radial CDR 80, the radial channels 162 in the adaptable CDR 160 may include a radial channel shelf 163. Accordingly, a conductive assembly 86 may secured in each radial channel 162.

It is contemplated that the user will drill and tap holes in the exterior of the rotational equipment such that a fastener 72 may pass through each of the slots 161 formed in the adaptable CDR 160. The adaptable CDR 160 may include a plurality of recesses 164 to better accommodate differences in the exterior of various rotational equipment. The adaptable CDR 160 may have a cut out 166 protruding into the main aperture 168 to facilitate installation of the adaptable CDR 160 over a shaft or other object.

Illustrative Embodiments of an ARC CDR

Figure 19A:
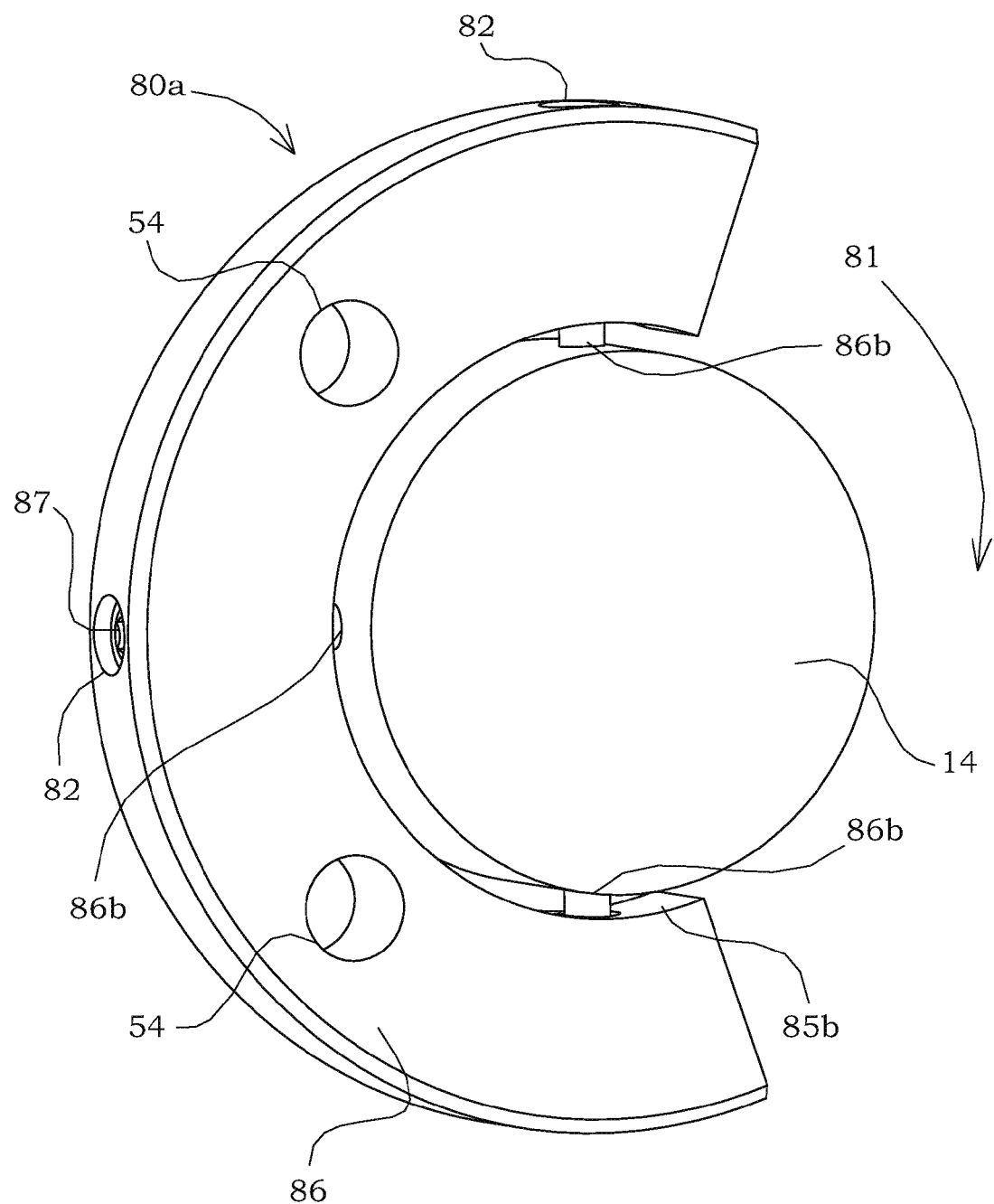
FIG. 19A is a perspective view of one embodiment of an arc CDR.
Figures 19B, 19C:
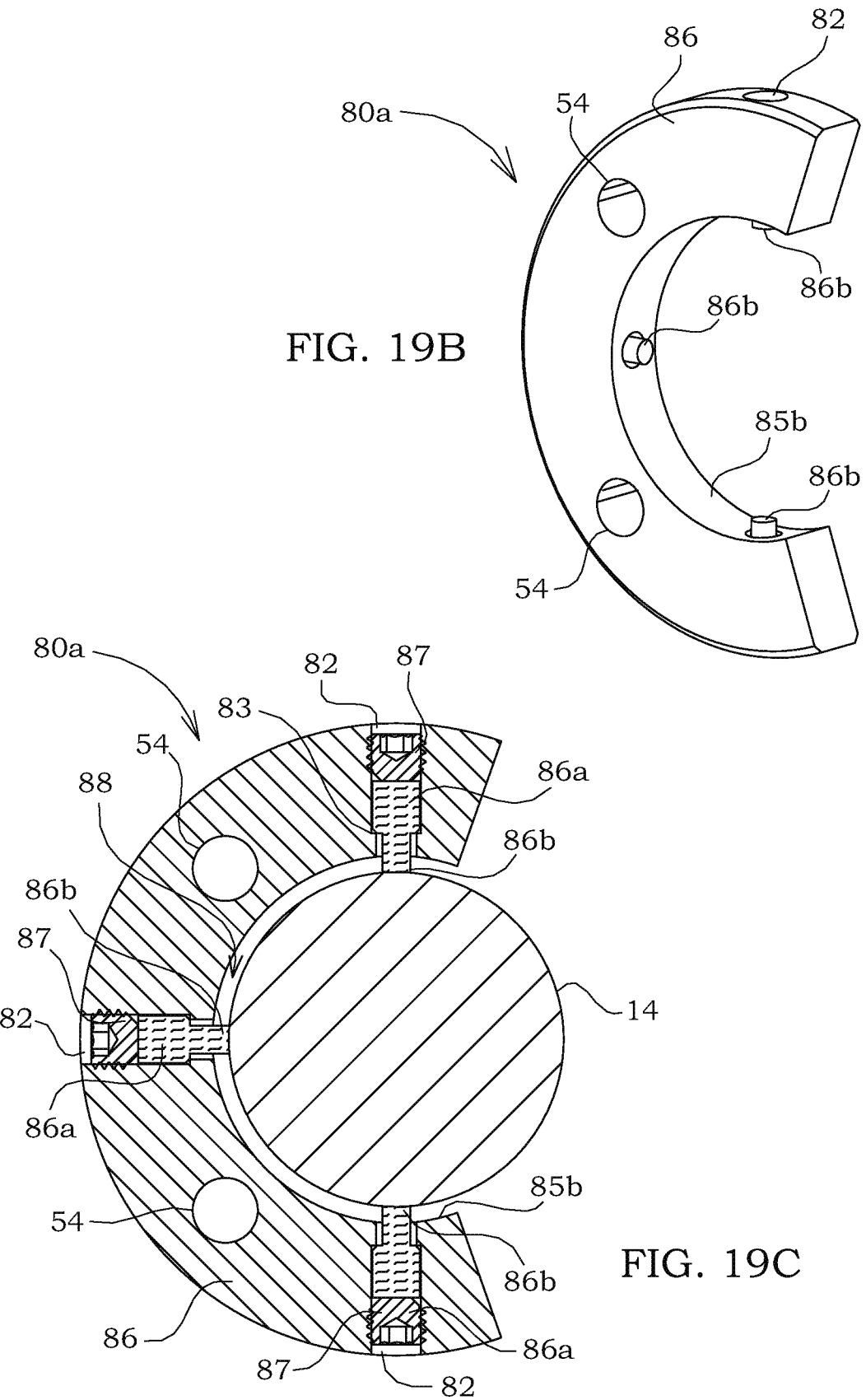
FIG. 19B is an axial cross section view of the embodiment of an arc CDR shown in FIG. 19A.
FIG. 19C is an axial-face view of the embodiment of an arc CDR shown in FIGS. 19A & 19B.
Figure 20A:
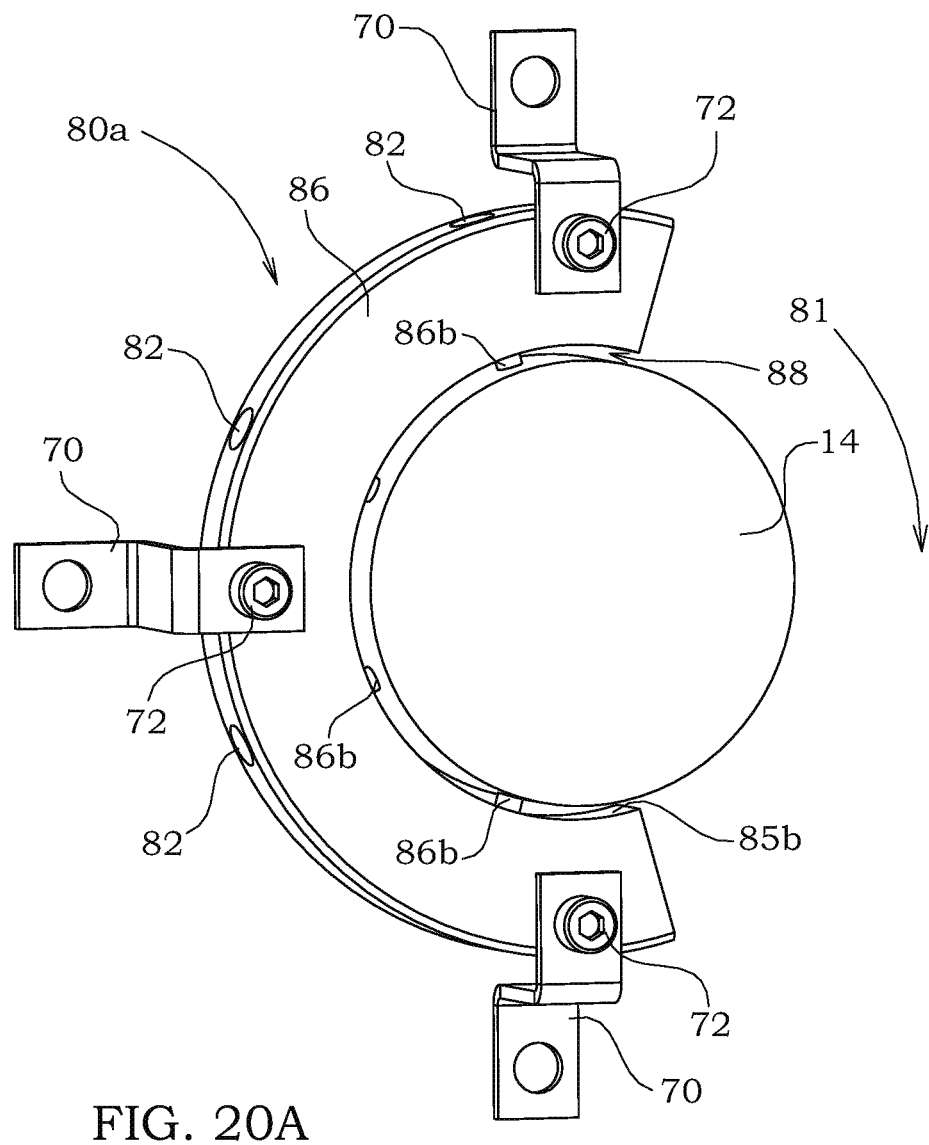
FIG. 20A is a perspective view of a second embodiment of an arc CDR.

An arc CDR 80a is another embodiment of a CDR 40. A first embodiment of an arc CDR 80a is shown in FIGS. 19A-19C as a semi-circular shaped structure having a main aperture 88 in the center thereof and an arc cut out 81. FIG. 19A provides a perspective view of the first illustrative embodiment of an arc CDR 80a positioned over a shaft 14. FIG. 19B provides another perspective view of the first embodiment of an arc CDR 80a without a shaft 14 for purposes of clarity. FIG. 19C provides a radial cross-sectional view of the arc CDR 80a shown in FIGS. 19A & 19B. A perspective view of a second embodiment of an arc CDR 80a shown positioned around a shaft 14 is shown in FIG. 20A. FIG. 20B provides another perspective view of this embodiment of an arc CDR 80a with the shaft 14 removed in FIG. 20B, and FIG. 20C is a radial cross-sectional view.

The illustrative embodiments of the arc CDR 80a as shown herein function substantially the same as the radial CDR 80 shown in FIGS. 15A and 15B. However, because the arc CDR 80a is not a full ring (which the radial CDR 80 is) the arc CDR 80a may be easier to install over certain shafts 14 than the radial CDR 80 for specific applications in the same way the adaptable CDR 160 (shown in FIGS. 18A and 18B) be easier to install than the radial CDR 80. For certain embodiments of the arc CDR 80a it may be beneficial to use a sleeve (not shown), plate (not shown) or other structure to properly position the arc CDR 80a with respect to the shaft 14. It is contemplated that the embodiment of an arc CDR 80a shown in FIGS. 19A-19C may be engaged with the structure from which the shaft 14 extends via one or more mounting apertures 54 therein that may cooperate with a fastener 72. It is contemplated that the embodiment of an arc CDR 80a shown in FIGS. 20A-20C may be engaged with the structure from which the shaft 14 extends via one or more straps 70 in cooperation with one or more fasteners 72. However, any suitable structure and/or method for securing the arc CDR 80a to a structure may be used without limitation.

The illustrative embodiments of an arc CDR 80a pictured herein is configured such that the arc CDR 80a extends beyond 180 degrees of a circle. More specifically, the illustrative embodiment of the arc CDR 80a is approximately 200 degrees of a full circle. However, in other embodiments the length of the arc CDR 80a may be greater than 200 degrees of a full circle. In still other embodiments, the length of the arc CDR 80a may be less than 180 degrees of a full circle.

The embodiment of an arc CDR 80a shown in FIGS. 19A-19C includes three radial channels 82 extending from the radial exterior surface 85a to the radial interior surface 85b. Each radial channel 82 may include a radial channel shelf 83, which is best shown in FIG. 19C. In the pictured embodiments, the radial channel shelf 83 is located adjacent the radial interior surface 85b of the arc CDR 80a. The embodiment of an arc CDR 80a shown in FIGS. 20A-20C includes four radial channels 82 that may be so configured. A conductive assembly 86 may be configured to securely engage a radial channel 82, and a plug 87 may be positioned over the conductive assembly 86 to secure the position of the conductive assembly 86. One embodiment of a conductive assembly 86 is shown in detailed in FIG. 15C. Other types of conductive assemblies 86 may be used with the arc CDR 80a without limitation. One embodiment of a plug 87 is threaded and cooperates with threads formed in a radial channel 82, as shown in FIG. 19C.

The conductive assemblies 86 in the arc CDR 80a may be configured to be replaceable. That is, once the contact portion 86b of a conductive assembly 86 has been exhausted, or the conductive assembly 86 should otherwise be replaced, the user may remove the conductive assembly 86 (and/or plug 87 if one is used) from the radial channel 82 and insert a new conductive assembly 86 therein. The number of radial channels 82 formed in an arc CDR 80a in no way limits the scope thereof, and similarly, the number of conductive assemblies engaged therewith in no way limits the scope of an arc CDR 80a.

Illustrative Embodiment Of Another CDR

Figure 21A:
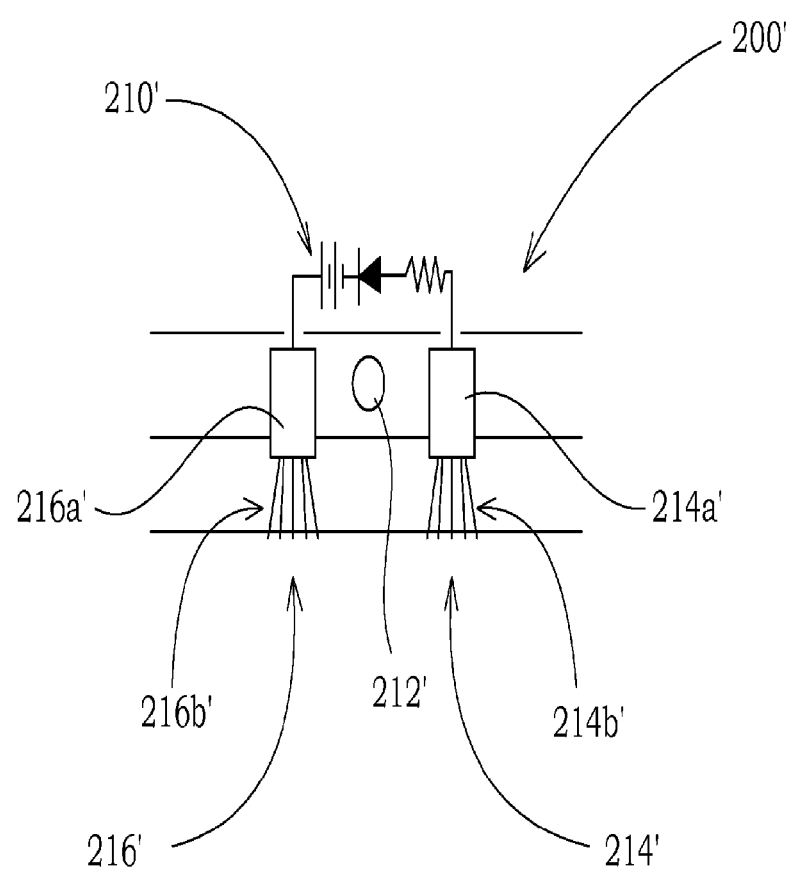
FIG. 21A is a simplified schematic of one embodiment of a CDR.
Figure 21B:
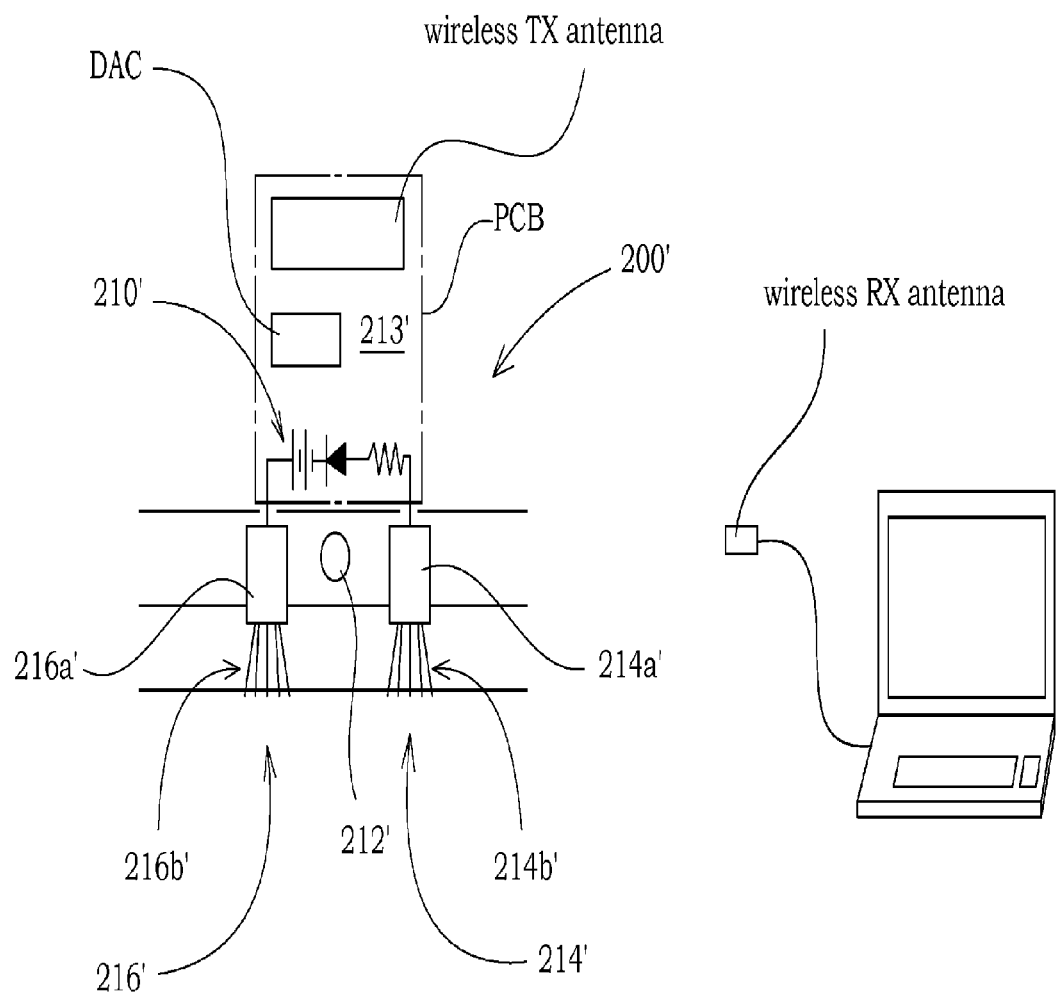
FIG. 21B is a detailed view of some of the components of the embodiment of a CDR shown in FIG. 21A

One embodiment of a CDR 200' is shown in FIGS. 21A & 21B. As shown, the illustrative embodiment of the CDR 200' may be configured to alert the user when the CDR 200' is no longer adequately diverting current from the shaft 14 to ground. The embodiment of the CDR 200' shown herein accomplishes this in part through the use of an indicator conductive assembly 214' engaged with an existing CDR 40 or integrated into an existing CDR 40. In other embodiments, the CDR 200' is incorporated into a separate structure adjacent an existing CDR 40. Any CDR 40, 80, 80a, 100, 160, 200, 202 may be configured for use as and/or with a CDR 200' without limitation.

In the illustrative embodiment, the indicator conductive assembly 214', shaft 14, secondary conductive assembly 216', and various electronics may be configured to constitute a circuit through which electricity may flow when the conductive assemblies 214', 216' are adequately contacting the shaft 14. The indicator conductive assembly 214' may be formed substantially in the same manner as other conductive assemblies 86 previously described herein, using an indicator binder 214a' and indicator contact portion 214b'. Similarly, the secondary conductive assembly 216' may be formed with a secondary binder 216a' and secondary contact portion 216b'. However, any suitable structure and/or method for determining electrical contact between the indicator 216', 214' and the shaft 14 may be used with the CDR 200' without limitation.

A power source 210' and indicator 212' may be incorporated into the circuit described above as one structure/method to alert the user as to when the conductive assembly 86 is no longer functioning properly. The power source 210' and indicator 212' may be incorporated in various manners to achieve this function. In one configuration, the power source 210' is in electrical communication with the indicator 212' (which comprises an LED light) via the indicator conductive assembly 214', shaft 14, and secondary conductive assembly 216'. The power source 210' causes the indicator 212' to be active until the circuit is opened via the indicator conductive assembly 214' or secondary conductive assembly 216' no longer contacting the shaft 14 at their respective contact portions 214b', 216b' (i.e., upon failure of the CDR 40 to adequately divert current from the shaft 14 to ground). Accordingly, when the LED light (indicator 212' in this embodiment) is no longer illuminated, the conductive assemblies 86 should be replaced.

In another embodiment, a switch 213' may be positioned to be in electrical communication with the power source 210' and the indicator 212'. These elements may be configured such that when the user activates the switch 213', if the indicator conductive assembly 214' and secondary conductive assembly 216' are both adequately contacting the shaft 14, the indicator 212' will communicate that information. For example, if the indicator 212' is configured as an LED light, the light may illuminate upon the user activating the switch 213'. Alternatively, the indicator 212 may be configured as an auditory device, or a combination of visual and auditory devices. Accordingly, the CDR 200' is not limited by the type of indicator 212 that may be used therewith, and any indicator 212' that may be configured to alert the user as to whether the indicator conductive assembly 214' and secondary conductive assembly 216' are or are not adequately contacting the shaft 14.

In another embodiment of the CDR 200', the indicator 212' may become active when the indicator conductive assembly 214' and/or secondary conductive assembly 216' no longer adequately contact the shaft 14, which is opposite to the previously described embodiment. In an embodiment in which the indicator 212' becomes active upon inadequate contact, either the indicator conductive assembly 214' and/or secondary conductive assembly 216' may be configured so that upon a certain amount of wear to the respective contact portions 214b', 216b', an ancillary member (not shown) contacts the shaft 14. Upon contact of the ancillary member with the shaft 14, the circuit containing the power source 210' and indicator 212' may become closed. Alternatively, a conductive member of a different configuration and/or dimensions (e.g., shorter) than that of the indicator conductive assembly 214' and/or secondary conductive assembly 216' may be positioned inside one of the conductive assemblies 214', 216' such that when the conductive member engages the shaft 14, the indicator 212' will become active.

The CDR 200' may also be incorporated into a fastener 72 used to mount the CDR 40 to an equipment housing 16. In such an embodiment of the CDR 200', it may be required for that particular fastener 72 to be electrically isolated from any other fasteners 72 attached to the CDR 200' to ensure proper functionality. In such an embodiment, the electrical discharges from the bearing 12 to the equipment 16 may cause the indicator 212' to become active as those discharges pass through the fastener 72 engaged with the CDR 200'.

These or other embodiments of the CDR 200' may be equipped with other features. For example, a radio frequency identification tag ("RFID" tag, not shown) may be integrated into the circuitry of the CDR 200'. The circuitry of the CDR 200' may also include a micro-PLC, which may be configured to gather and record various data related to the CDR 200', CDR 40, bearing isolator 10', and/or equipment. The RFID tag may simplify maintenance identification of the various equipment, CDRs 200', CDR 40 and/or bearing isolators 10 at a given site.

In another embodiment of the CDR 200', the circuitry thereof may include a microprocessor (not shown) to perform various functions related to the CDR 200', bearing isolator 10, and/or equipment. The microprocessor may be configured with a wireless communication module, such as Bluetooth, short wave radio frequency transponder, various 802.11 protocol devices, and/or any other suitable wireless communication system. If the CDR 200' is so equipped, the system may be remotely monitored by a user or maintenance personnel. The CDR 200' may simply communicate with a properly programmed CPU (not shown) either wired or wirelessly to relay and/or record operational data and alert the user to specific conditions. Other embodiments of the CDR 200' may employ wireless communication ability without the use of a microprocessor.

Figure 21C:
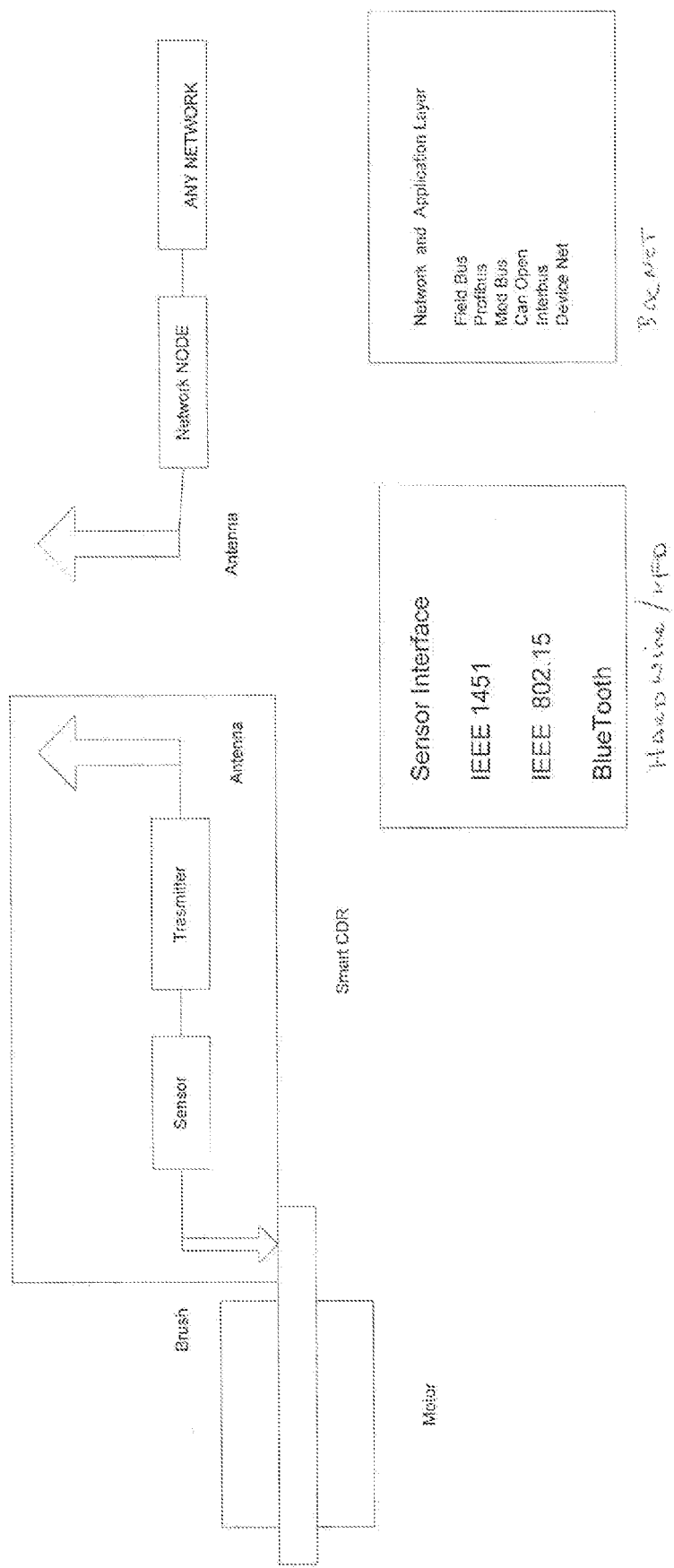
FIG. 21C is a schematic of how one wireless embodiment of a CDR may be configured.

One illustrative embodiment of a wireless embodiment of a CDR 200' is shown in FIG. 21C. Those practiced in the arts will understand that there are an infinite number of implementation methods, operational parameters to monitor/record/relay, and/or uses for a CDR 200' so configured. As shown, the sensor may be in communication with a transmitter. The transmitter may be configured to wirelessly communicate with a network node and/or other wireless device (e.g., smartphone, computer, etc.). That network node and/or other wireless device may be in communication with a local area network, wide area network, or any other communications network suitable for the particular application of the CDR 200'. As shown, the sensor interface may be configured to communicate with the transmitter and/or the transmitter may be configured to communicate with the network node and/or other wireless device via any suitable protocol, including but not limited to IEEE 1451, IEEE 802.15, BlueTooth, etc. As shown, the network and adaptor layer may include, but is not limited to a field bus, profibus, mod bus, can open, interbus, and/or device net.

Any other structure and/or methods that functions to alert the user when the conductive assemblies 86 no longer properly contact the shaft 14 may be used in the CDR 200' without departing from the spirit and scope thereof irrespective of whether such structures and/or methods require an active step from the user to bring forth the alert (e.g., press a button, scan a frequency, etc.).

Various other electrical components that may be required to facilitate the operation of the CDR 200', such as capacitors, resistors, transistors, etc. are not shown herein for purposes of clarity, and are in no way limiting to the scope of the CDR 200'. All of the electrical components required to facilitate the CDR 200' may be positioned in a cavity (not shown) formed within the body of a CDR 40 as described herein and/or bearing isolator 10. Alternatively, the CDR 200' and/or certain components thereof may be positioned in a shaft grounding device, shaft seal, or other structure suitable for rotating equipment not disclosed herein.

Captured CDR

Figure 22A:
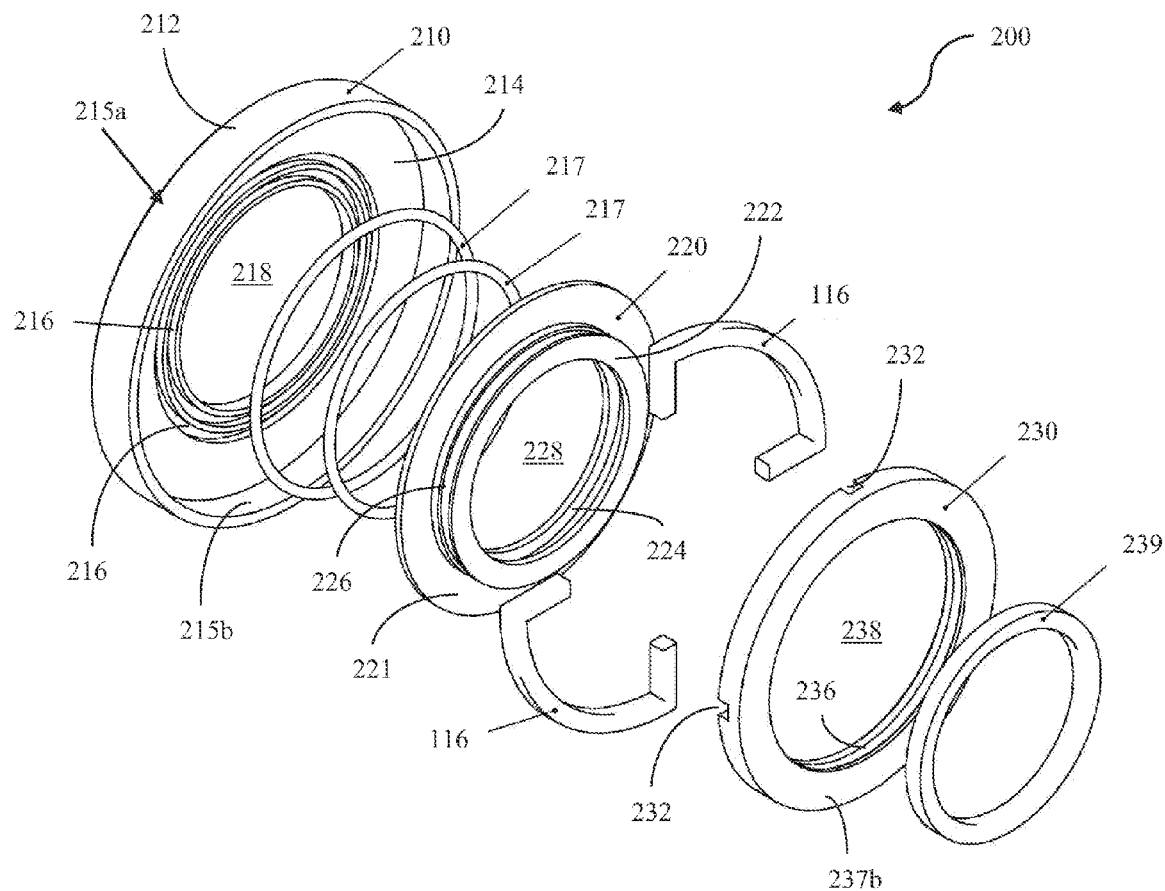
FIG. 22A is an exploded view an embodiment of the CDR using a captured rotor design and an open face.
Figures 22B, 22C, 22D:
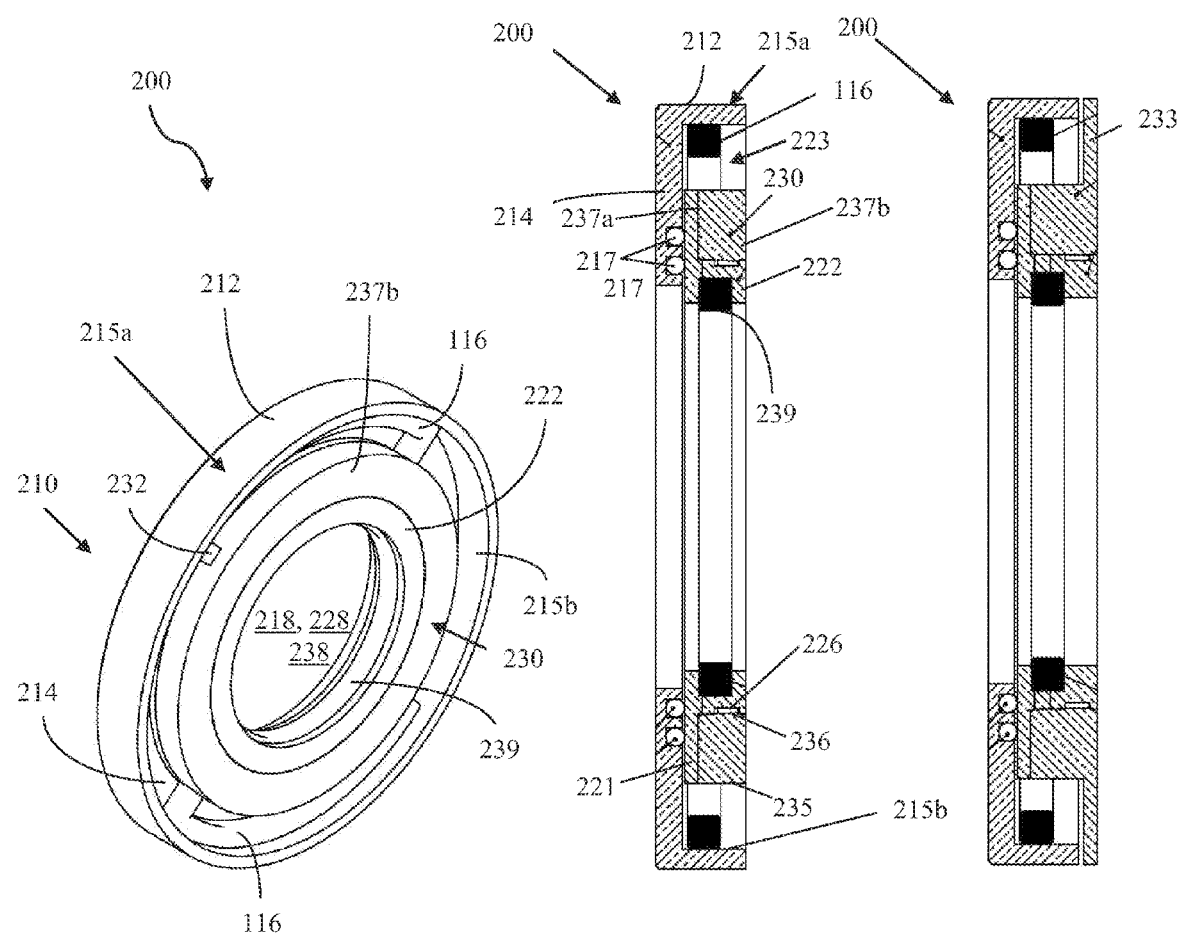
FIG. 22B is a perspective view of the assembled captured CDR shown in FIG. 22A.
FIG. 22C is an axial, cross-sectional view of the captured CDR shown in FIGS. 22A and 22B.
FIG. 22D is an axial, cross-sectional view of another embodiment of a captured CDR similar to that shown in FIGS. 22A-22C, but with a closed face.

A first embodiment of a captured CDR 200 is shown in FIGS. 22A-22C. As with other embodiments of the CDR 40 disclosed herein, the captured CDR 200 may be mounted within a bearing isolator 10 or it may be mounted directly to equipment housing 16 using any structure and/or method disclosed herein for other CDRs 40. The first embodiment utilizes an open face, as best shown in FIG. 22B, which provides a front perspective view of the captured CDR 200 fully assembled.

The main body 210 may include a base 212 extending along the axis of the main body main aperture 218 and a main body wall 214 extending perpendicular to the base 212. In this embodiment, the main body 210 includes a radial exterior surface 215a and a radial interior surface 215b. In a press-fit design, the radial exterior surface 215a directly abuts the equipment housing 16. The main body wall 214 may be fashioned with one or more skate grooves 216 on the interior surface thereof. Skates 217, which are generally comprised of ring-shaped, low-friction, and/or low-wear material, may be positioned in the skate grooves 216 to reduce the frictional losses between the main body 210 and the rotor body 220, which is described in detail below. It is contemplated that some embodiments of skates 217 may be constructed of PTFE, but any suitable material may be used without limitation.

The rotor may be comprised of two separate units—a rotor body 220 and a rotor ring 230. The rotor body 220 may also be substantially ring shaped with a base 222 and a rotor body main aperture 228 in the center thereof. A flange 221 may extend radially outward from the base 222. A lock channel 226 may be formed on the radially exterior surface of the base 222 and a drive ring groove 224 may be formed on the radially interior surface of the base 222. A drive ring 239 may be positioned within the drive ring groove 224 and fit securely around a shaft 14 that is positioned concentric with the rotor body main aperture 228. The drive ring 239 may be configured to couple the rotor body 220 to the shaft 14 so that the rotor body 220 rotates with the shaft 14. The drive ring 239 may be formed of any suitable material for the particular application, including but not limited to, woven carbon fibers, solid conductive segments, conductive polymers, and/or combinations thereof. Accordingly, the scope of the captured CDR 200 is not limited by the material chosen for the drive ring 239.

The rotor ring 230 may also be ring-shaped with a rotor ring main aperture 238 formed substantially in the center thereof. The rotor ring 230 may be formed with a plurality of radial channels 232 on the interior axial surface 237a of the rotor ring 230. Each radial channel 232 may be configured with a catch 232a to better retain conductive segments 116 as previously described for other embodiments of the CDR 40. The interior axial surface 237a of the rotor ring 230 may be positioned to abut the interior surface of the flange 221 of the rotor body 220 when the captured CDR 200 is fully assembled, as best shown in FIG. 22C. The rotor ring 230 may also be formed with a ridge 236 around the periphery of the rotor ring main aperture 238.

Distal ends of conductive segments 116 may be positioned in the radial channels 232, and the rotor ring 230 may be pressed over the rotor body 220 base 222. As the rotor ring 220 is pressed over the rotor body 220 base 222, the ridge 236 on the rotor ring 230 may be configured to snap into the lock channel 226 formed in the rotor body 220 base 222 such that the rotor ring 230 and rotor body 220 are engaged with one another in such a manner that the rotor ring 230 rotates with the rotor body 220 (and, consequently, the shaft 14). This may also engage the distal ends of the conductive segments 116 within the radial channels 232 formed in the rotor ring 230 between the rotor ring 230 and the flange 221 of the rotor body 220 such that the conductive segments 116 are properly retained.

In operation, the main body 210 is generally static, while the rotor body 220 and rotor ring 230 generally rotate with the shaft 14. The main body wall 214, radial interior surface 215a of the main body 210 base 212, and the ring radial exterior surface 235 of the rotor ring 230 may cooperate to form a retention chamber 223 in which the non-distal ends of the conductive segments 116 may be positioned. The centrifugal force imparted to the conductive segments 116 due to the rotation of the rotor body 220 and rotor ring 230 may cause a portion of the conductive segments 116 to contact the radial interior surface 215a of the main body 210 base 212. Accordingly, the drive ring 239 may conduct charges to the rotor body 220, which may conduct charges to the rotor ring 230, which may conduct charges to the conductive segments 116, which may conduct charges to the main body 210 and subsequently to the equipment housing 16.

In a second embodiment of the captured CDR 200, which is shown in cross section in FIG. 22D, the rotor ring 230 includes a rotor ring flange 233 extending radially from the rotor ring 230 adjacent the exterior axial surface 237b of the rotor ring 230. In this embodiment, the rotor ring flange 233 cooperates with the other surfaces to close the retention chamber 233, which may increase the longevity of the conductive segments 116 in various applications.

Another embodiment of the captured CDR 200 is shown in FIGS. 23A-23D. In this embodiment, the rotor is essentially comprised of a rotor ring 230. The main body 210 may still include a base 212 terminating with a cap interface surface 213 and a main body wall 214 extending radially inward from the base 212, which is shown in detail in FIG. 23D. The main body wall 214 may be configured with at least one skate groove 216 fashioned therein. Skates 217 may be positioned in the skate grooves 216 to reduce friction and/or wear between the moving parts, as previously described for other embodiments. The cap interface surface 213 may be fashioned with at least one receiver 219 for engaging the cap 240 with the main body 210, which is described in detail below.

The rotor ring 230 in this embodiment may be configured with at least one radial channel 232 extending from the ring radial exterior surface 235 to the rotor ring main aperture 238. The rotor ring 230 is shown in detail in FIG. 23E. A segment groove 234 may be fashioned around the periphery of the rotor ring main aperture 238 between two adjacent radial channels 232. Conductive segments 116 may be positioned so that the distal ends thereof extend through the radial channels 232 and the interior portions thereof are retained within the segment groove 234.

Figure 23A:
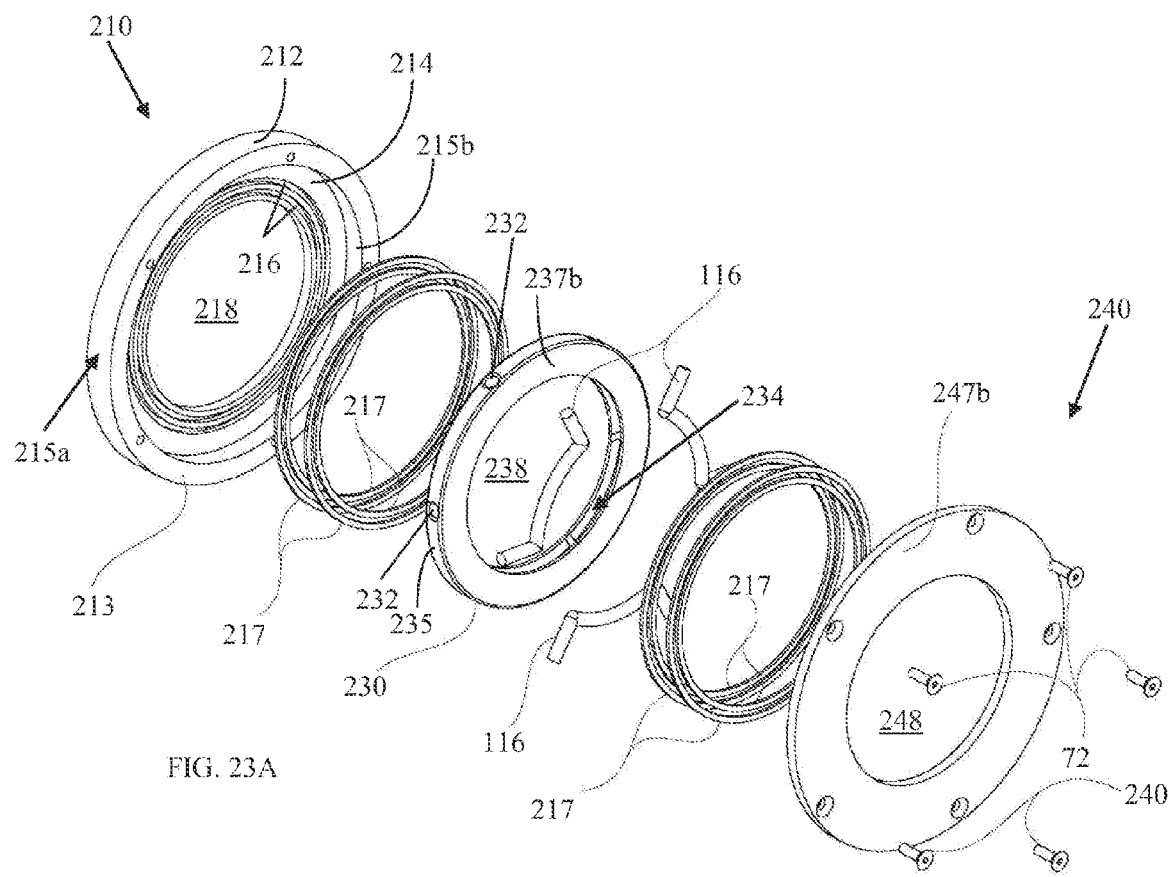
FIG. 23A is an exploded view of another embodiment of a captured CDR with the distal ends of the conductive segments facing away from the shaft.
Figure 23B:
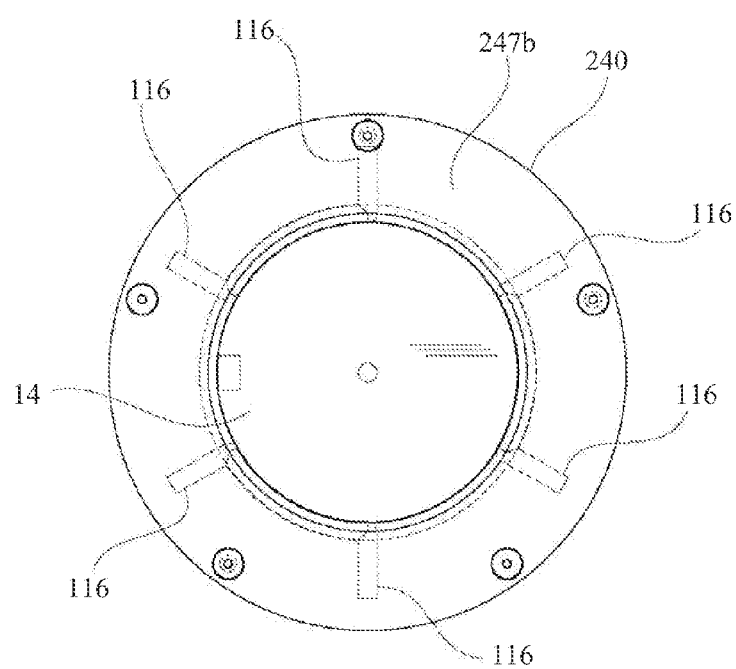
FIG. 23B is a front view of the embodiment of a captured CDR shown in FIG. 23A.
Figure 23C:
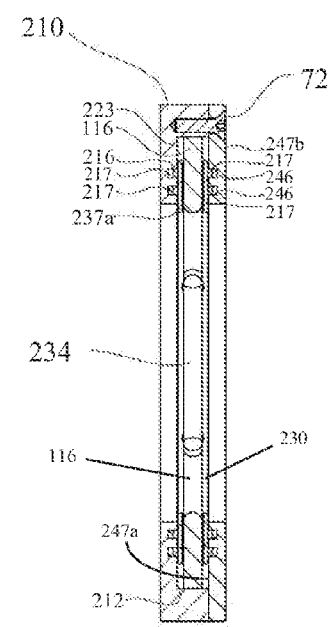
FIG. 23C is an axial, cross-sectional view of the captured CDR shown in FIGS. 23A and 23B.

When assembled, the interior axial surface 237a of the rotor ring 230 may abut the main body wall 214, as best shown in FIG. 23C, which provides an axial cross section of this embodiment of the captured CDR 200 when assembled. The portion of the conductive segments 116 positioned in the segment groove 234 may be configured so as to engage the shaft 14 such that the rotor ring 230 rotates with the shaft 16.

A generally ring-shaped cap 240 may be fashioned with a cap main aperture 248 substantially positioned in the geometric center of the cap 240. The cap 240 may be formed with at least one skate groove 246 on the cap interior axial surface 247a as best shown in FIG. 23C, into which skates 216 may be positioned to reduce friction and/or wear as previously described. The cap 240 may be engaged with the main body 210 via a plurality of fasteners 72 passing through apertures 249 in the cap 240 and engaging corresponding receivers 219 fashioned in the main body 210. When the cap 240 is engaged with the main body 210, the main body wall 214, the main body 210 radial interior surface 215b, and the axial interior surface 247a of the cap 240 may cooperate to form a retention chamber 223 in which a portion of each conductive segment 116 may be positioned.

As with other embodiments of the captured CDR 200, in operation the main body 210 is generally static, while the rotor ring 230 generally rotates with the shaft 14. The centrifugal force imparted to the conductive segments 116 due to the rotation of the rotor ring 230 may cause a portion of the conductive segments 116 to contact the radial interior surface 215a of the main body 210 base 212. Accordingly, the conductive segments 116 may conduct charges from the shaft to the main body 210 and subsequently to the equipment housing 16.

Explosion-Proof CDR

Certain embodiments of the explosion-proof CDR 202 may be configured to comply with ATEX 95 equipment directive 94/9/EC and/or the standard UL 1203 for explosion-proof and dust-ignition-proof electrical equipment. Such compliance may include the following certifications: (1) UL ClassI/II Division 2; (2) ATEX EX Group II, Equipment Category 3 (G, Zone 2; D, Zone 22); and, (3) Mining Certification, Equipment Category ½ and Zones 0, 1/20, 21. Mounting such an embodiment of an explosion-proof CDR 202 to an explosion-proof certified motor will create an explosion-proof certified system without the need for additional testing and/or certification. However, the explosion-proof CDR 202 is in no way limited by the specific certifications, standards, and/or certification body.

A first embodiment of an explosion-proof CDR 202 is shown in FIGS. 24A-24E. The first embodiment of an explosion-proof CDR 202 may be configured to engage a housing (not shown) via one or more fasteners 205 passing through corresponding apertures formed in the cap flange 272. As described for the bearing isolators 10 and other CDRs 40, 80, 80a, 100, 160, 200, and/or captured CDR 200, any suitable mounting structure(s) and/or method(s) may be used with any embodiment of the explosion-proof CDR 202 without limitation. Accordingly, the specific structure and/or method for properly mounting an explosion-proof CDR 202 in no way limits the scope thereof as disclosed and claimed herein.

Figure 24A:
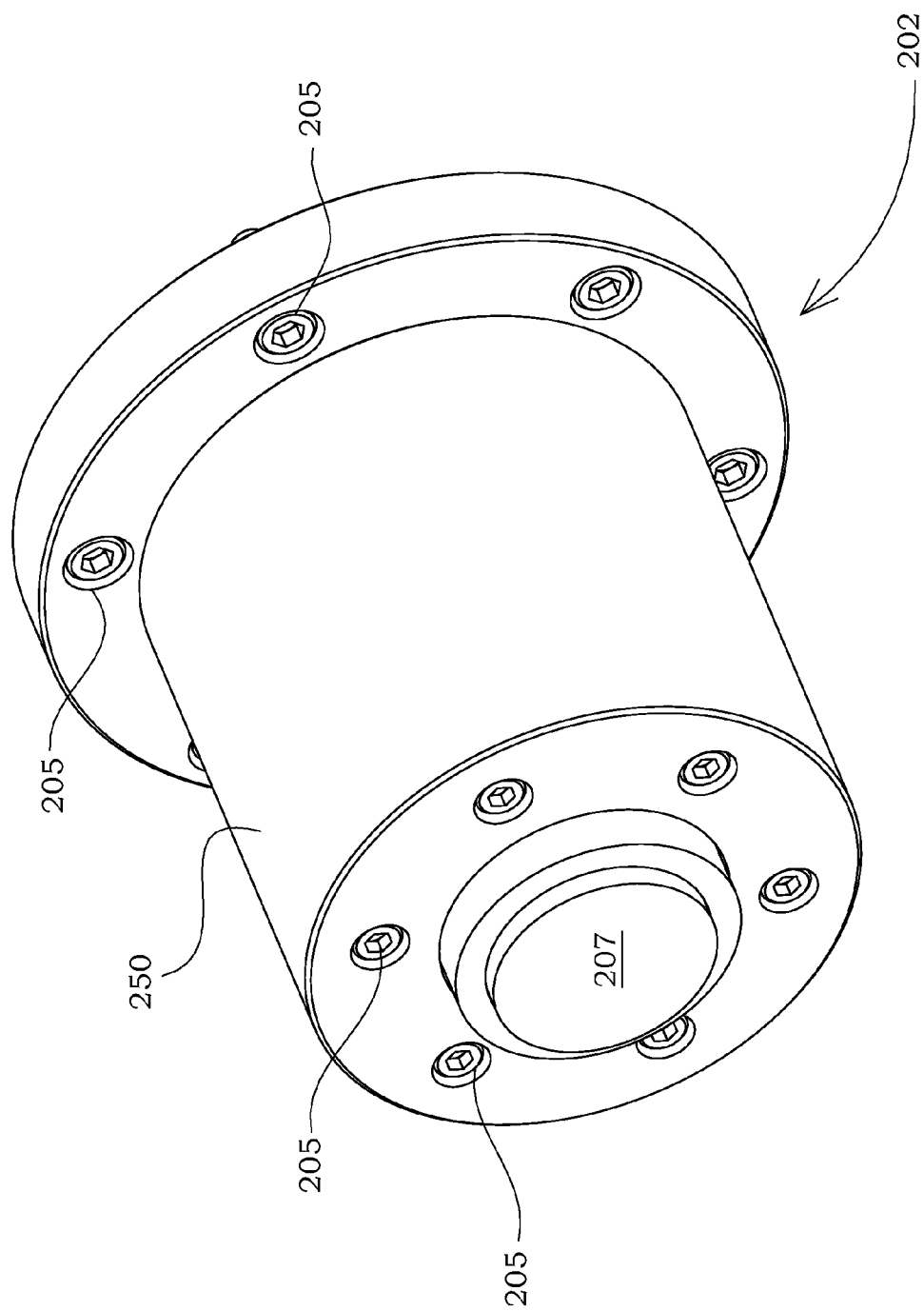
FIG. 24A is a perspective view of a first embodiment of an explosion-proof CDR.
Figure 24B:
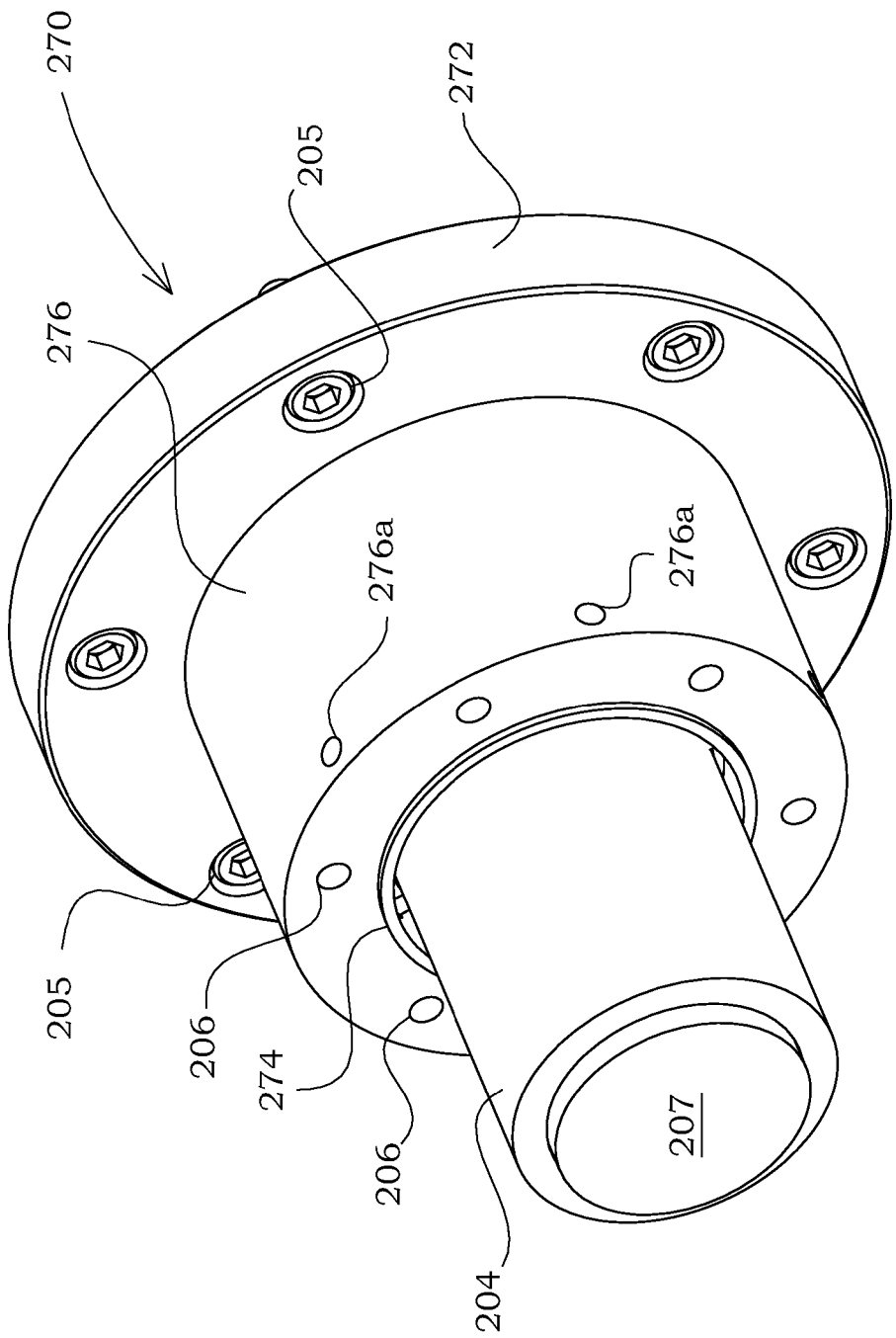
FIG. 24B is a perspective view of the embodiment of an explosion-proof CDR shown in FIG. 24A with the stator removed for clarity.
Figure 24C:
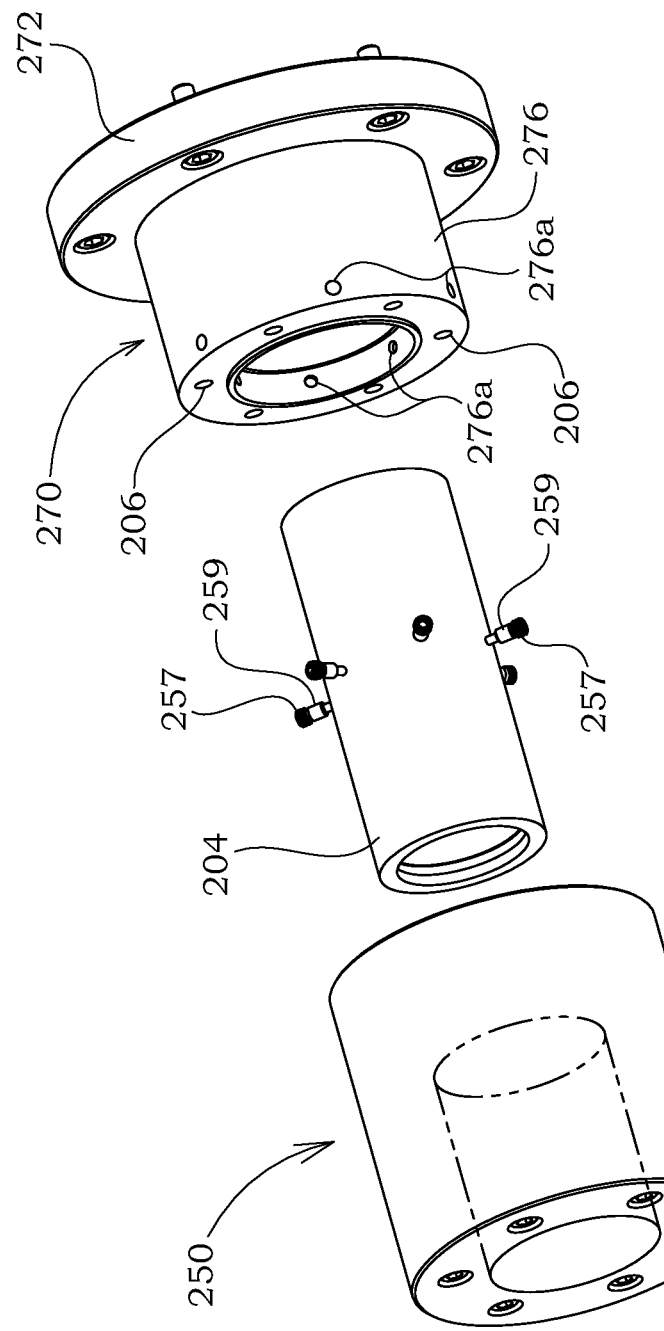
FIG. 24C is an exploded perspective view of the embodiment of an explosion-proof CDR shown in FIGS. 24A and 24B.
Figure 24D:
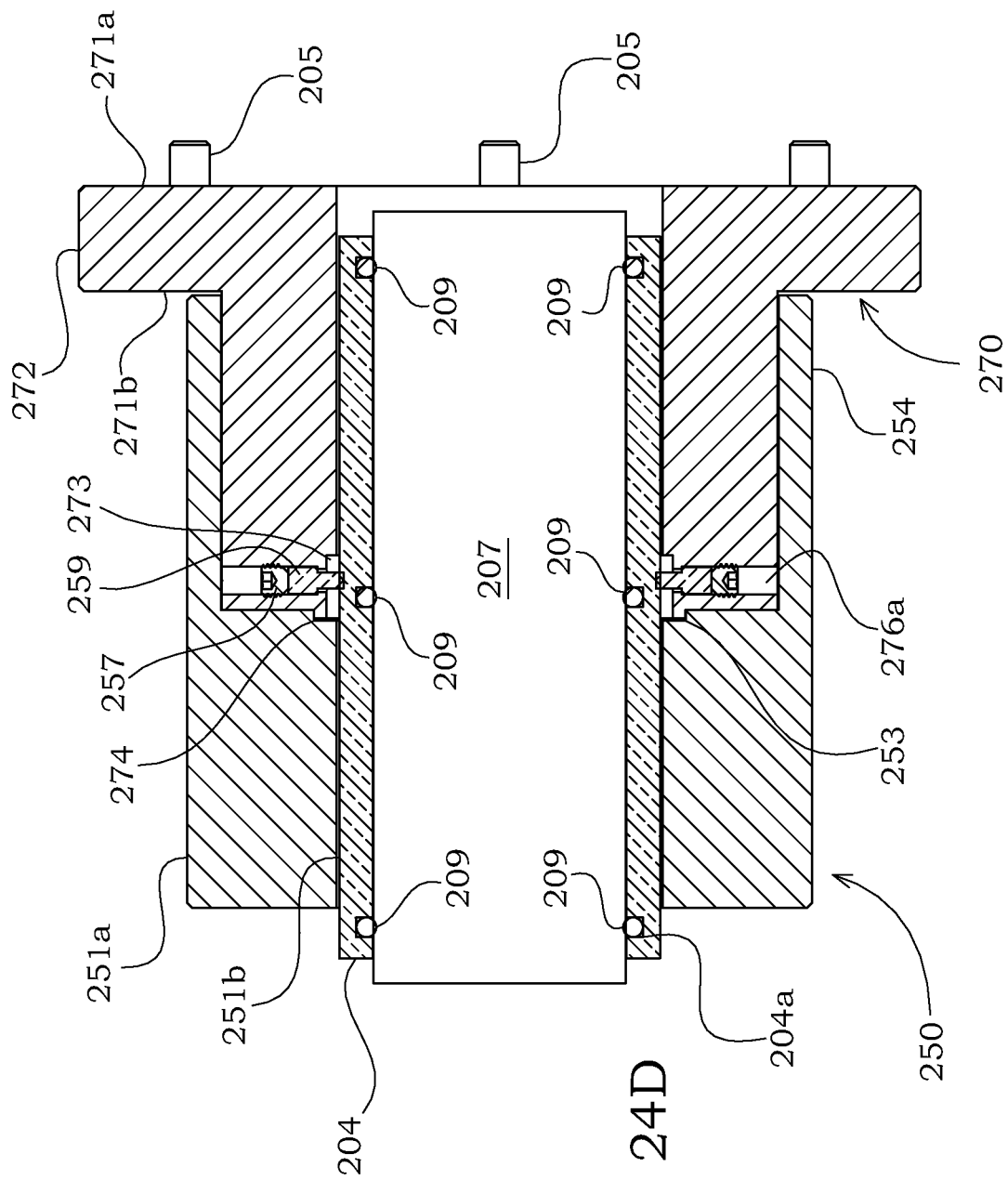
FIG. 24D is an axial, cross-sectional view of the embodiment of an explosion-proof CDR shown in FIGS. 24A-24C.
Figure 24E:
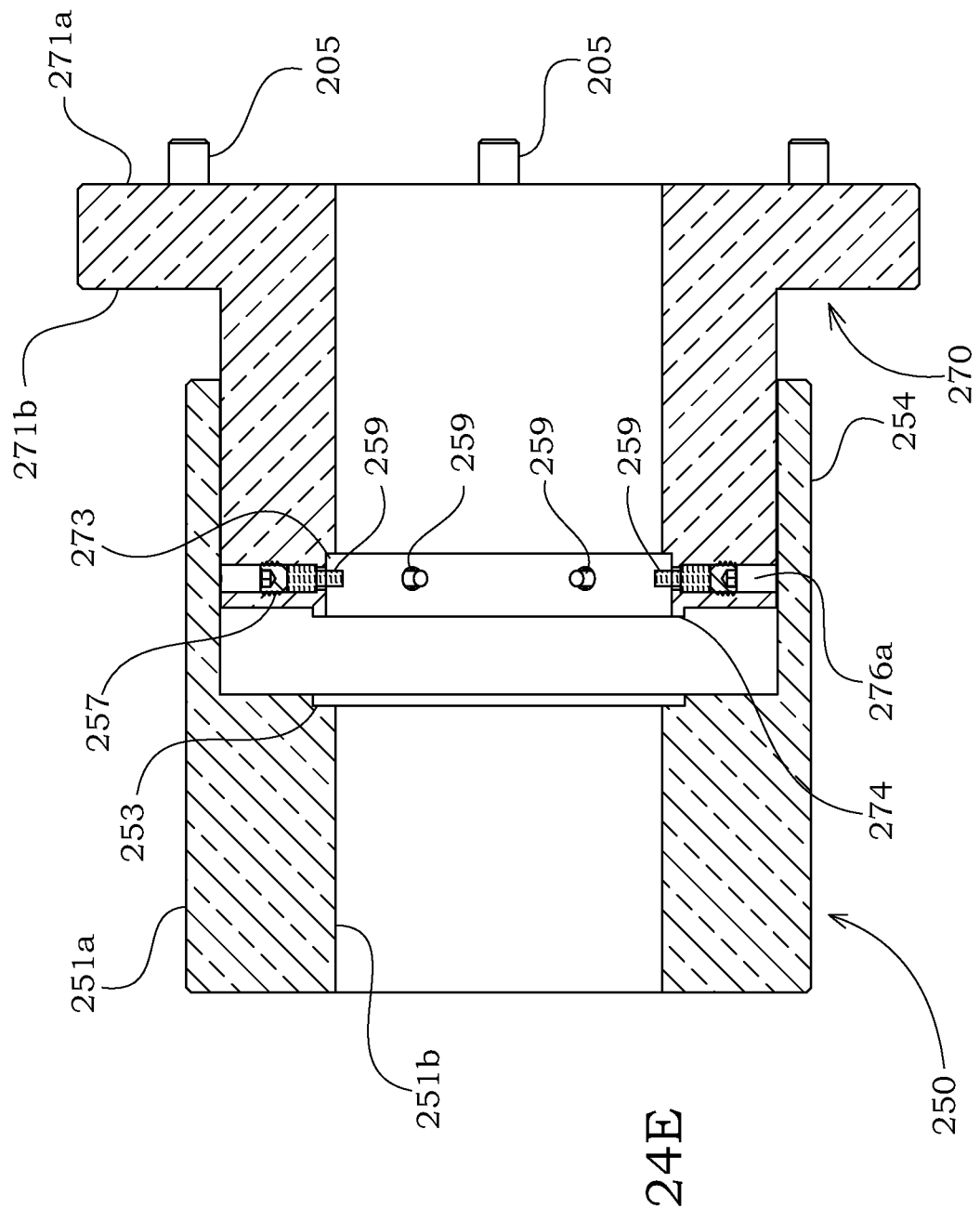
FIG. 24E is another axial, cross-sectional view of the embodiment of an explosion-proof CDR shown in FIGS. 24A-24D wherein the cap and stator are axial spaced from one another and the shaft and sleeve have been removed for clarity.

Referring now to FIGS. 24C and 24D, the first embodiment of an explosion-proof CDR 202 may include a cap 270 formed with a cap flange 272 around a portion thereof. A central bore may be positioned in the cap 270 to accommodate a sleeve 204 and/or a shaft 207. It is contemplated that in most applications the shaft 207 will be rotatable with respect to a piece of equipment, such as an electric motor (not shown). The cap 270 may be formed with a cap axial interior surface 271a and a cap axial exterior surface 271b, which may extend to the cap flange 272 as shown in FIG. 24D, and in most applications it is contemplated that the cap axial interior surface 271a may be positioned to abut a housing from which the shaft 207 protrudes. The interface between the cap axial interior surface 271a and the housing may be sealed and/or one or more sealing members (e.g., o-rings) may be positioned between the cap 270 and housing alone or in combination with a deformable substance to ensure definition of the proper flame path. Such deformable substances include but are not limited to epoxies, chemical adhesives, ceramics, metals, polymers, and/or combinations thereof.

The cap 270 may be formed with a cap body 276 extending axially from the cap flange 272. A plurality of body radial bores 276a may be formed in the cap body 276 to accommodate a conductive assembly 259 and/or plug 257. Each body radial bore 276a may extend from the exterior surface of the cap body 276 into the central bore of the cap 270 (see FIG. 24D). The embodiment of an explosion-proof CDR 202 shown in FIGS. 24A-24E includes six body radial bores 276a and six corresponding conductive assemblies 259 and plugs 257. However, the optimal number of body radial bores 276a, conductive assemblies 259, and/or plugs 257 will vary from one application of the explosion-proof CDR 202 to the next, and is therefore in no way limiting to the scope thereof.

The conductive assembly 259 and/or plug 257 may be similar to the conductive assemblies 86, 214 as previously disclosed herein and configured to make electrical contact with a shaft 207 and/or sleeve 204. Alternatively, the conductive assembly 259 may comprise any structure and/or method that provides an adequate electrical pathway for current from the shaft 207 and/or sleeve 204 to the explosion-proof CDR 202. The plug 257 may seal the conductive assembly 259 from the external environment, and may also assist in properly retaining a portion of the conductive assembly 259 within the cap 270. In the illustrative embodiment, the plug 257 may engage the cap 270 via conventional threads for relatively easy removal/installation, but any suitable structure and/or method may be used to adequately engage the plug 257 and/or conductive assembly 259 with the cap 270 without limitation. It is contemplated that a portion of the conductive assembly 259 will contact the shaft 207 and another portion thereof will simultaneously contact either the stator 250 and/or cap 270 for direct conduction of current from the shaft 207 through the explosion-proof CDR 202 to the equipment housing (not pictured). The cap body 276 may be formed with a cap axial projection 274 and cap groove 273 adjacent the distal end of the cap body 276 (see FIGS. 24D & 24E). In this embodiment of an explosion-proof CDR 202, the radially inward portion of a body radial bore 276a may intersect the cap groove 273. The distal axial face of the cap body 276 may be formed with one or more fastener receivers 206 for cooperative engagement with one or more fasteners 205 that may be used to engage a stator 250 to the cap 270 as described in further detail below.

The first illustrative embodiment of an explosion-proof CDR 202 may also include a stator 250 cooperating with the cap 270. The geometry and various interface surfaces leading from the area adjacent the cap groove 273 to an area external to the explosion-proof CDR 202 (sometimes referred to herein as the "flame path") may be specifically designed (e.g., width, length, transitions, etc. of interfaces between the stator 250 and cap 270) to pass the standards previously disclosed herein or other standards without limitation. Typically, if a flame and/or ignition originates in the explosion-proof CDR 202, the flame may move outward therefrom. Generally, the flame path may be designed to have enough distance and volume to an area external to the explosion-proof CDR 202 such that when the flame exits the explosion-proof CDR 202, the flame has sufficiently cooled such that it cannot ignite material (e.g., gases, vapors, etc.) external to the explosion-proof CDR 202. Generally, such a design requires relatively tight tolerances along the flame path.

The stator 250 may be formed with a central bore to accommodate a sleeve 204 and/or a shaft 207. The stator 250 may also include an axial projection 254 that may be configured to encompass all or a portion of the cap body 276 (see FIG. 24D). A stator radial exterior surface 251a may be positioned toward the external environment and a stator radial interior surface 251b may be positioned toward the shaft 207 and/or sleeve 204. The stator 250 may also include a stator groove 253 configured to cooperate with the cap axial projection 274 (see FIGS. 24D & 24E) such that the contact portion of the conductive assembly 259 may be positioned within the cap groove 273 and adjacent the stator groove 253. As previously mentioned, the configuration of the various interface passages between the stator 250 and cap 270 may vary from one application to the next, and may be specifically designed for the specific certifications disclosed above and/or other certifications.

The stator 250 may be engaged with the cap 270 via a one or more fasteners 205 passing through corresponding apertures formed in the stator 250 and engaging one or more fastener receivers 206 formed in the cap body 276 as previously described. Generally, it is contemplated that for most applications of the explosion-proof CDR 202 it will be desirable for the stator 250 to be rigidly and securely engaged with the cap 270. However, the scope of the explosion-proof CDR 202 is not so limited. Accordingly, and suitable structure and/or method for engaging the stator 250 with the cap 270 for the particular application of the explosion-proof CDR 202 may be used therewith without limitation.

In the first illustrative embodiment of an explosion-proof CDR 202, a sleeve 204 may be engaged with the shaft 207. The sleeve 204 may be formed with one or more sleeve grooves 204a on the surface thereof that is adjacent the shaft 207 during use. An o-ring 209 may be positioned in a sleeve groove 204a to engage the sleeve 204 with the shaft 207 in such a manner that the sleeve 204 rotates with the shaft 207. The o-rings 209 may be formed of a low or relatively low impedance material including but not limited to silicon with embedded and/or entwined silver and/or aluminum components, metallic braids, other conductive compounds, and/or combinations thereof. One such o-ring 209 that may be suitable for certain applications is offered for sale by Kemtron Co., in Braintree, Essex, UK, and is comprised of a fully cured silicone and/or flourosilicone loaded with a variety of highly conductive particles, which particles may include but are not limited to silver, aluminum, other metallic compounds, other conductive compounds, and/or other combinations thereof. This o-ring 209 may be specifically configured to ensure galvanic compatibility while simultaneously providing low contact resistance between mating surfaces. Furthermore, if it may be desirable for any drive rings and/or o-rings disclosed for any embodiments of a bearing isolator and/or CDR disclosed herein, such drive rings and/or o-rings may be so configured without limitation.

In another embodiment, the sleeve 204 may be engaged with the shaft 207 via chemical adhesives and/or the sleeve 204 may be configured as a conductive tape or other self-adhering member. In still other embodiments the sleeve 204 may be press-fit onto the shaft 207 (i.e., interference fit), or engaged therewith via other mechanical fasteners (e.g., set screws, bolts, etc.), welds, and/or any combination of the foregoing. Accordingly, the scope of the explosion-proof CDR 202 is in no way limited by the presence or absence of a sleeve 204, and if a sleeve 204 is used, the specific structure and/or method used to properly engage the sleeve 204 with the shaft 207 in no way limits the scope of the explosion-proof CDR 202. The length of the sleeve 204 in the first illustrative embodiment of the explosion-proof CDR 202 is approximately equal to the axial dimension of the explosion-proof CDR 202 when the stator 250 and cap 270 are engaged with one another, wherein the sleeve 204 is slightly offset toward the exterior of the explosion-proof CDR 202 in the axial dimension (see FIG. 24D).

Using a sleeve 204 may provide several advantages. First, it may allow the manufacturer and/or user to precisely control the tolerances at the point where electrical contact is made between the conductive assemblies 259 and the rotational element (e.g., sleeve 204, shaft 207) when designing a flame path in the explosion-proof CDR 202. Second, such use of a sleeve 204 may also allow the designer to overcome problems in defining a flame path with an imprecisely machined shaft 207. Oftentimes the exterior surface of a shaft 207 may be irregular, non-uniform, or constructed of a material prone to corrosion, pitting, and/or other degradation. It is contemplated that a sleeve 204 may be especially useful in applications in which a smoother, more uniform surface is required for contact between a rotating member and shaft grounding device, including but not limited to any of the bearing isolators 10 and/or CDRs 40, 80, 80a, 100, 160, 200', captured CDR 200, and/or explosion-proof CDRs 202 disclosed herein. The sleeve 204 may be formed with a smooth, uniform exterior surface to provide an optimal surface for a conductive insert 259 or other conductive member to contact. It is contemplated that using a sleeve 204 in conjunction with a shaft grounding device will increase the performance and longevity of the shaft grounding device.

As mentioned, the sleeve 204 may include one or more sleeve grooves 204a formed on the interior surface thereof, which interior surface will be adjacent the exterior surface of a shaft 207 during use. The illustrative embodiment includes three sleeve grooves 204, wherein the axial limits of each sleeve groove 204a may be defined by an end wall on a first side and an interior wall on a second side. Other embodiments of a shaft sleeve 204 may include more or fewer sleeve grooves 204a without limitation. Also, in the illustrative embodiment the height of each end wall and the interior wall may be equal, but this configuration in no way limits the scope of the sleeve 204.

Again, an o-ring 209 acting as a drive ring may be positioned within each sleeve groove 204. It is contemplated that the o-ring(s) 209 may be configured engage the sleeve 204 with the shaft 207 such that the sleeve 204 rotates with the shaft 207. It is further contemplated that the o-ring(s) 209 may be constructed of a low-impedance material, such that current from the shaft 207 may be easily transmitted from the o-ring 209 to the sleeve 204, from where they may pass through a shaft grounding device. It is contemplated that one o-ring 321 may be positioned in each sleeve groove 204a, but the sleeve 204 as disclosed herein is not so limited. The o-ring 209 may be formed of any material that is suitable for the particular application for which the sleeve 204 will be used. For example, it is contemplated that in some embodiments, the o-ring(s) 209 may be formed of a synthetic, low-impedance rubber or rubber-like material. However, in other embodiments the o-ring(s) 209 may be formed of metallic coated fibers. Accordingly, the specific material used to construct the o-ring(s) 209 in no way limits the scope of the sleeve 204.

Figure 25A:
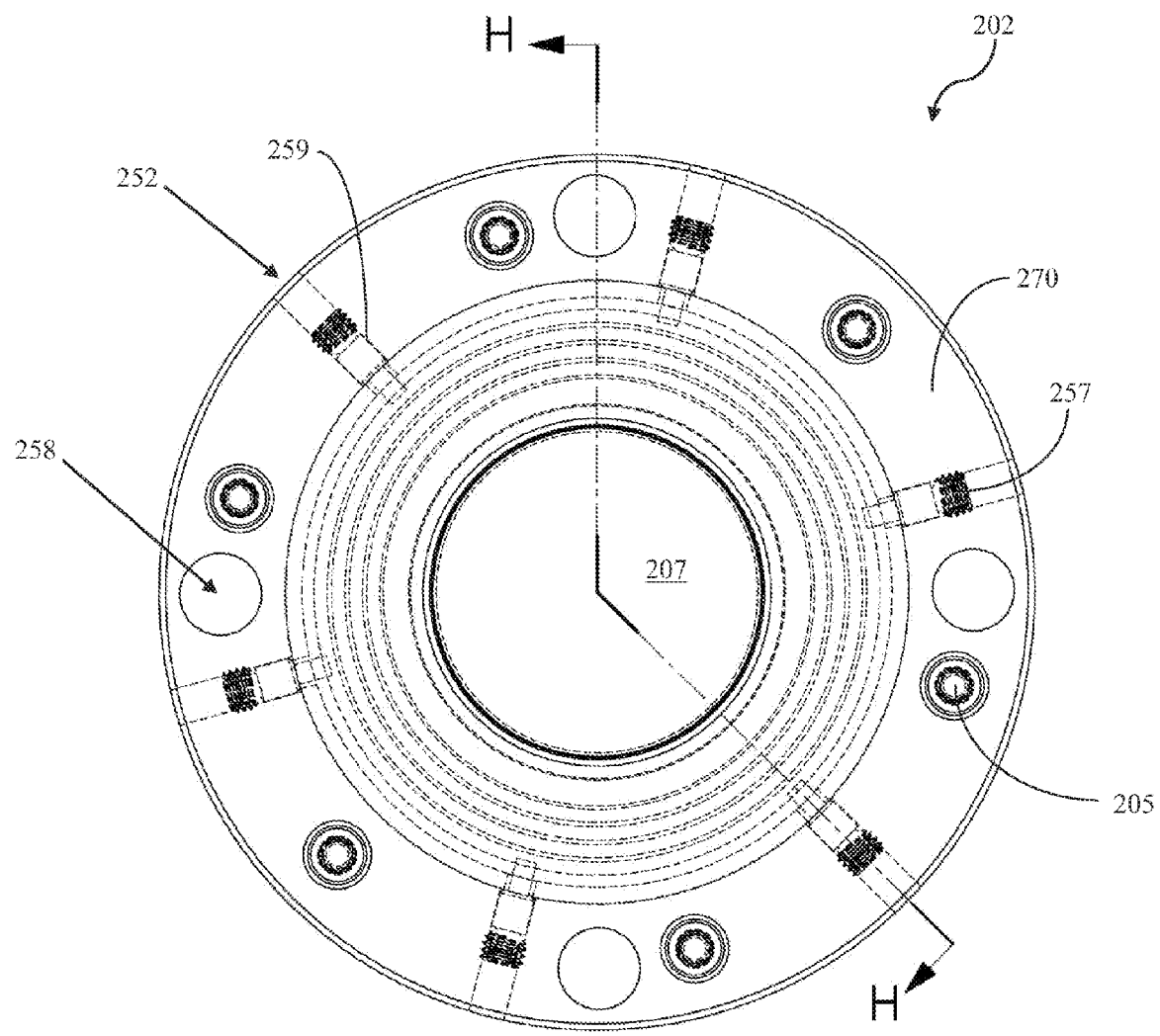
FIG. 25A is an axial-face view of another embodiment of an explosion-proof CDR.
Figure 25B:
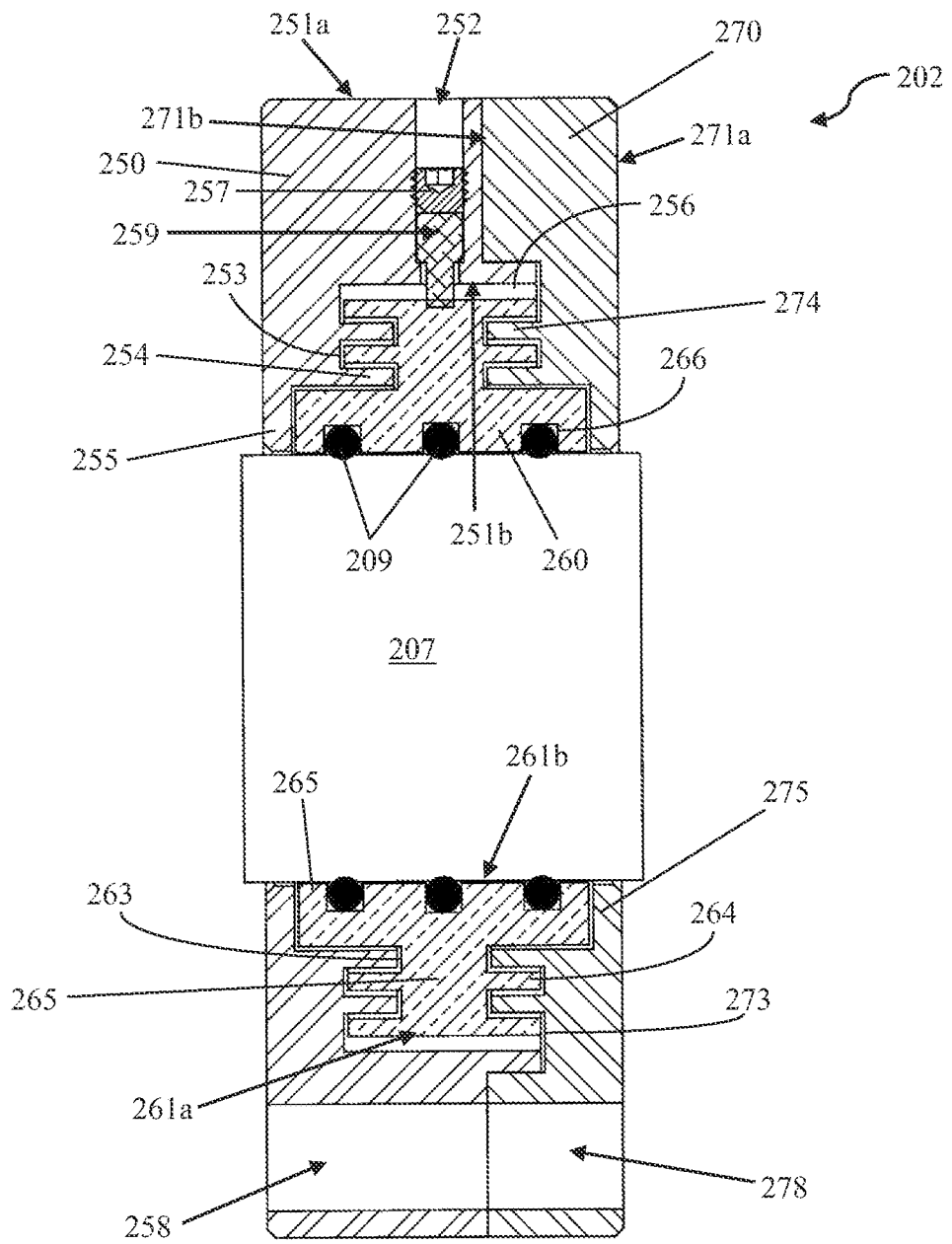
FIG. 25B is an axial, cross-sectional view of the explosion-proof CDR shown in FIG. 25A along the lines H-H.

Another embodiment of an explosion-proof CDR 202 is shown in FIGS. 25A & 25B. This embodiment of an explosion-proof CDR 202 includes a stator 250 and a rotor 260. As with some embodiments of the captured CDR 200 disclosed herein, the stator 250 may be mounted to a housing for a piece of equipment (neither pictured) with a shaft 207 protruding therefrom. The rotor 260 may be mounted to the shaft 207 so as to rotate therewith. As best shown in FIG. 25A, this embodiment of an explosion-proof CDR 202 may be formed with one or more radial bores 252 in the stator 250. The radial bores 252 may be configured to accommodate a conductive assembly 259 so that a portion thereof contacts the shaft 207 as previously described for other embodiments of the explosion-proof CDR 202 without limitation.

Referring now to FIG. 25B, which provides an axial-cross sectional view of this embodiment of the explosion-proof CDR 202, a cap 270 may be configured to engage a portion of the stator 250, thereby enclosing a portion of the rotor 260 within the stator 250 and cap 270. The cap 270 may be engaged with the stator 250 in a secure manner using fasteners 205 as best shown in FIG. 25A. Alternatively, the cap 270 may be engaged with the stator 250 in the desired manner using any method and/or structure suitable for the particular application of the explosion-proof CDR 202, including but not limited to chemical adhesives, interference fittings, welding, and/or combinations thereof. The cap 270 may be formed with a plurality of cap fastener channels 278 corresponding to the fastener channels 258 formed in the stator 250, depending on the specific embodiment of the explosion-proof CDR 202

The rotor 260 may be mounted to the shaft 207 so that it rotates therewith. In the pictured embodiments of an explosion-proof CDR 202 utilizing a rotor 260, a plurality of o-rings 209 are used to mount the rotor 260 to the shaft 207. However, any other method and/or structure suitable for the particular application of the explosion-proof CDR 202 may be used without limitation, including but not limited to adhesives, interference fittings, welding, set screws, and/or combinations thereof.

In this embodiment of the explosion-proof CDR 202, the stator 250 may include a stator radial exterior surface 251a with which the distal end of the radial bores 252 may intersect. The stator 250 may also include a stator radial interior surface 251b oriented toward the rotor 260 (if present for that embodiment of an explosion-proof CDR 202). The embodiment of a stator 250 shown in FIG. 25B may be formed with one or more stator grooves 253 that may correspond to one or more rotor axial projections 264 and/or rotor radial projections 265. The stator 250 may also include one or more axial projections 254 and/or radial projections 255 that may correspond to one or more rotor grooves 263 and/or cap grooves 273. One stator radial projection 255 on the equipment side of the explosion-proof CDR 202 (generally oriented toward the left in the orientation shown in FIG. 25B) may extend toward the shaft 207 to create a relatively tight clearance between that stator radial projection 255 and the shaft 207. The various interface passages between the stator 250 and rotor 260, stator 250 and cap 270, and/or rotor and cap 270 may be configured such that the explosion-proof CDR 202 meets certain certification criteria.

Still referring to FIG. 25B, this embodiment of an explosion-proof CDR 202 may include a rotor 260 formed with a rotor radial exterior surface 261a oriented toward a portion of the stator 250 and a rotor radial interior surface 261b oriented toward a shaft 207. One or more o-ring channels 266 may be fashioned in the rotor radial interior surface 261b to receive an o-ring 209 to mount the rotor 260 to the shaft 207 in a desired manner. As explained above, other methods and/or structures may be used to mount the rotor 260 to the shaft 207 without limitation. It is contemplated that if o-rings 209 are used, it will be most advantageous for those o-rings 209 to be constructed of a material that is sufficiently conductive. The rotor 260 in the embodiment of an explosion-proof CDR 202 shown in FIG. 25B may include a rotor radial projection 265 having one or more rotor axial projections 264 extending therefrom, which projections 264, 265 may cooperate with one or more stator grooves 253 and/or cap grooves 273 to form a flame path for the appropriate certification are previously mentioned. The most distal rotor radial exterior surface 261a may cooperate with a stator radial interior surface 251b to define an interface channel 256 between the stator 250 and the rotor 260 in which a portion of the conductive assembly 259 may be positioned. It is contemplated that a portion of the conductive assembly 259 will contact the shaft 207 and another portion thereof will contact the stator 250 simultaneously for direct conduction of current from the shaft 207 through the explosion-proof CDR 202 to the equipment housing (not pictured).

This embodiment of an explosion-proof CDR 202 may include a cap 270 formed with a cap axial interior surface 271a, a portion of which may abut the stator 250, and a cap axial exterior surface 271b, a portion of which may be exposed to the external environment. One or more cap grooves 273 may be formed in a portion of the cap axial interior surface 271a. Additionally, the cap 270 may be formed with one or more cap axial projections 274 and/or cap radial projections 275 to cooperate with rotor grooves 263 and/or rotor axial and/or radial projections 264, 265 to form the desired flame path. One cap radial projection 275 on the external side of the explosion-proof CDR 202 (generally oriented toward the right in the orientation shown in FIG. 25B) may extend toward the shaft 207 to create a relatively tight clearance between that cap radial projection 275 and the shaft 207.

Figure 26A:
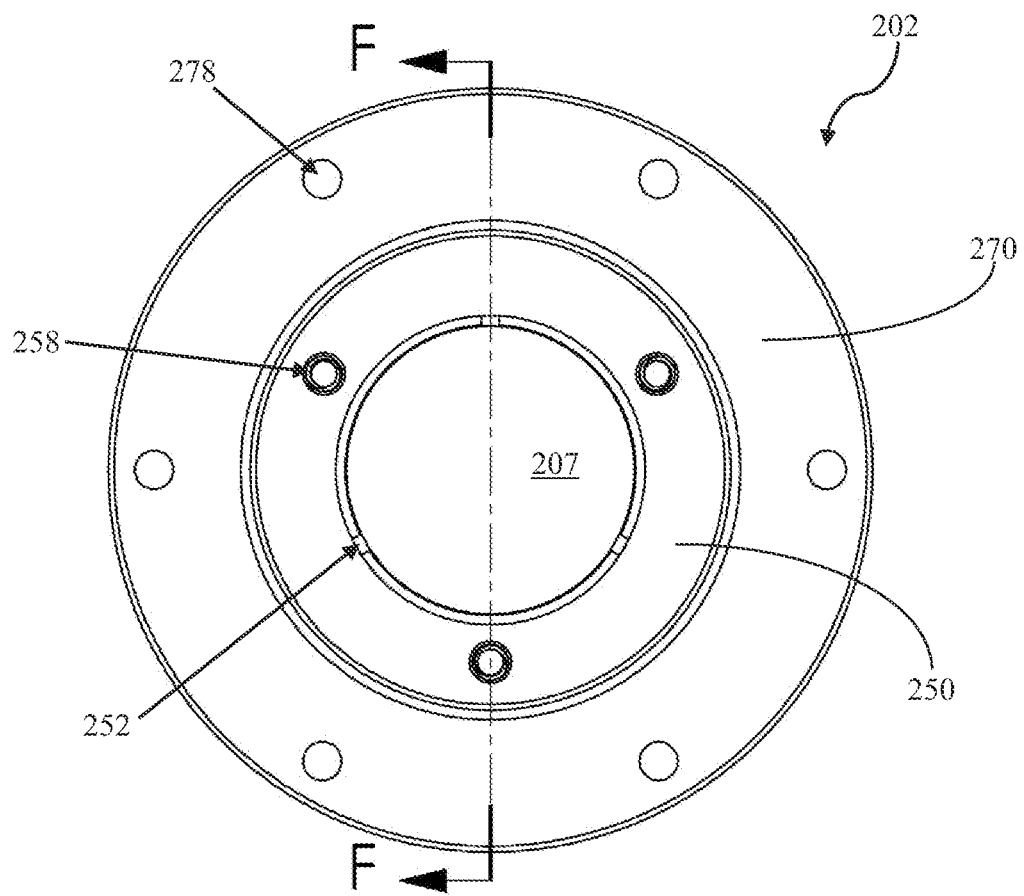
FIG. 26A is an axial-face view of another embodiment of an explosion-proof CDR.
Figure 26B:
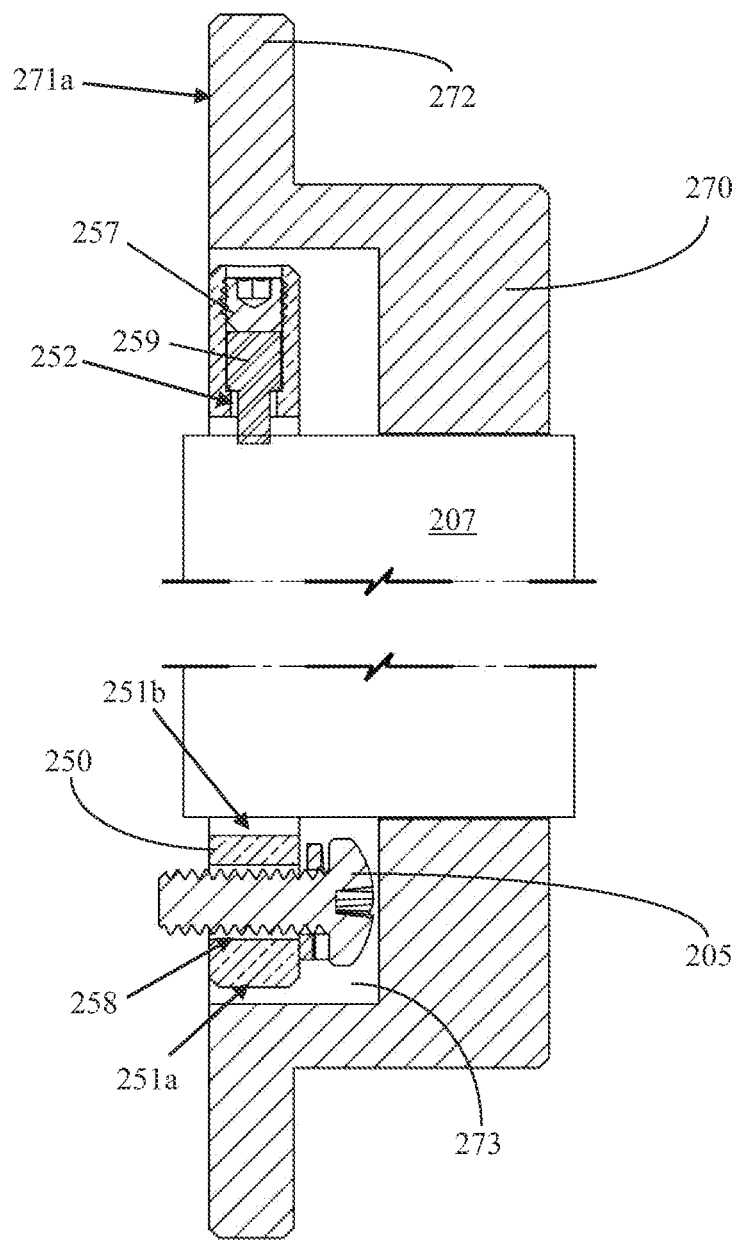
FIG. 26B is an axial, cross-sectional view of the explosion-proof CDR shown in FIG. 26A along the line F-F.

Another embodiment of an explosion-proof CDR 202 is shown in FIGS. 26A & 26B. The embodiment utilizes a stator 250 but not a rotor 260. The stator 250 in this embodiment of an explosion-proof CDR 202 is configured substantially similar to the radial CDR 80 disclosed above. The stator 250 may be formed with one or more radial bores 252 to accommodate a conductive insert 259 and plug 257 (if desired) in a manner substantially the same as previously described for other embodiments of an explosion-proof CDR 202. Additionally, the stator 250 in this embodiment of an explosion-proof CDR 202 may be engaged directly with a housing. The stator 250 may be formed with one or more fastener channels 258 into which respective fasteners 205 may be inserted to mount the stator 250 to a housing. As described for the bearing isolators 10 and other CDRs 40, 80, 80a, 100, 160, 200, and/or captured CDR 200, any suitable mounting structure(s) and/or method(s) may be used to mount the stator 250 to a housing. Accordingly, the specific structure and/or method for properly mounting a stator 250 in no way limits the scope of any explosion-proof CDR 202 as disclosed and claimed herein.

Still referring to FIGS. 26A & 26B, this embodiment of an explosion-proof CDR 202 may also include a cap 270 having a cap axial interior surface 271a, a portion of which may be positioned adjacent a housing during use. The cap 270 may also include a cap axial exterior surface 271b opposite the housing. The cap 270 may include a cap flange 272 to provide additional surface area for the portion of the cap axial interior surface 271a that is positioned adjacent the housing. The cap 270 may also include a cap groove 273 configured to accommodate the stator 250. The cap 270 may be formed with one or more cap fastener channels 278 into which respective fasteners 205 may be inserted to mount the cap 270 to a housing. As described for the bearing isolators 10 and other CDRs 40, 80, 80a, 100, 160, 200, and/or captured CDR 200, any suitable mounting structure(s) and/or method(s) may be used to mount the cap 270 to a housing. Accordingly, the specific structure and/or method for properly mounting a cap 270 in no way limits the scope of any explosion-proof CDR 202 as disclosed and claimed herein. To adequately define a flame path, a deformable substance (not shown) having the required electrical and mechanical properties may be positioned between the housing and the portion of the cap axial interior surface 271a adjacent the housing as previously described.

Figure 27A:
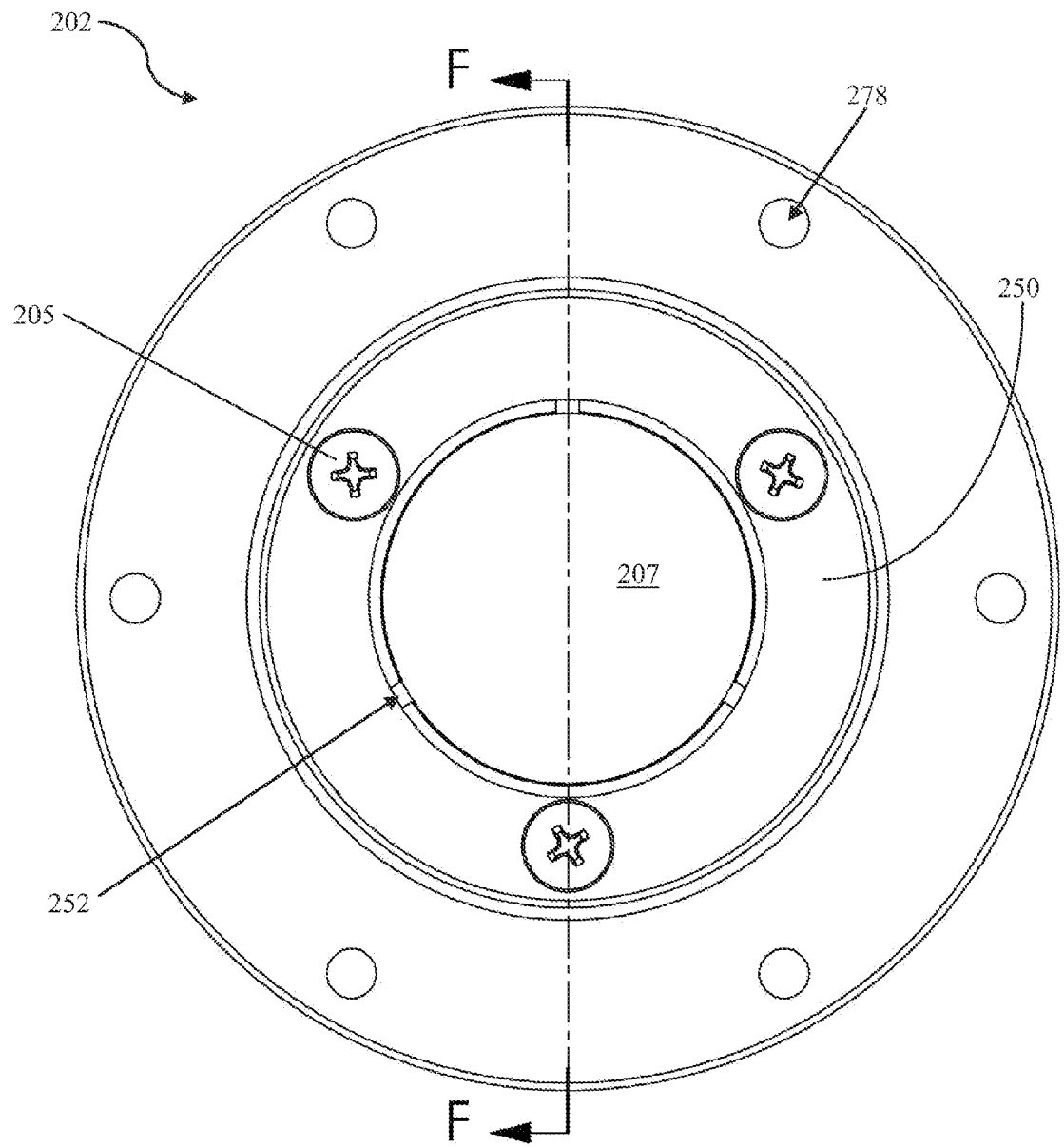
FIG. 27A is an axial-face view of another embodiment of an explosion-proof CDR.
Figure 27B:
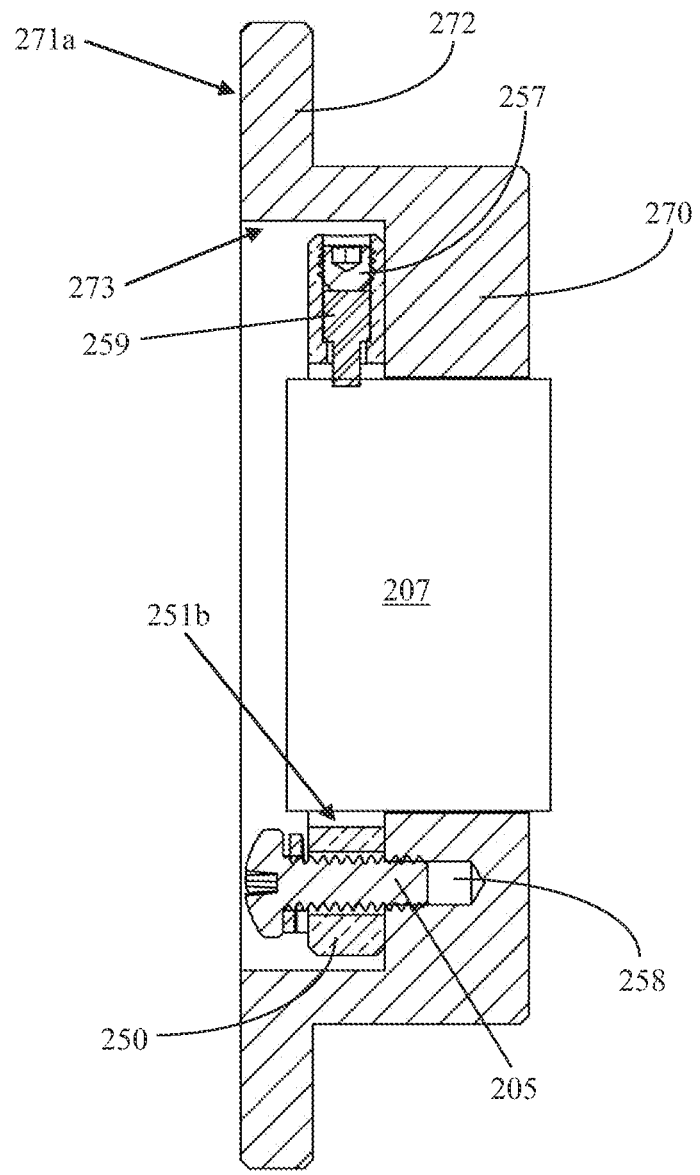
FIG. 27B is an axial, cross-sectional view of the explosion-proof CDR shown in FIG. 27A along the line F-F.

Another embodiment of an explosion-proof CDR 202 is shown in FIGS. 27A & 27B. This embodiment is similar to that shown in FIGS. 26A & 26B in that no rotor 260 is used. However, in this embodiment, the stator 250 may be mounted to a portion of the axial interior surface 271a of the cap 270 rather than mounting the stator 250 to the housing. Accordingly, it is contemplated that the cap 270 in this embodiment of an explosion-proof CDR 202 will be mounted directly to the housing.

Figure 28A:
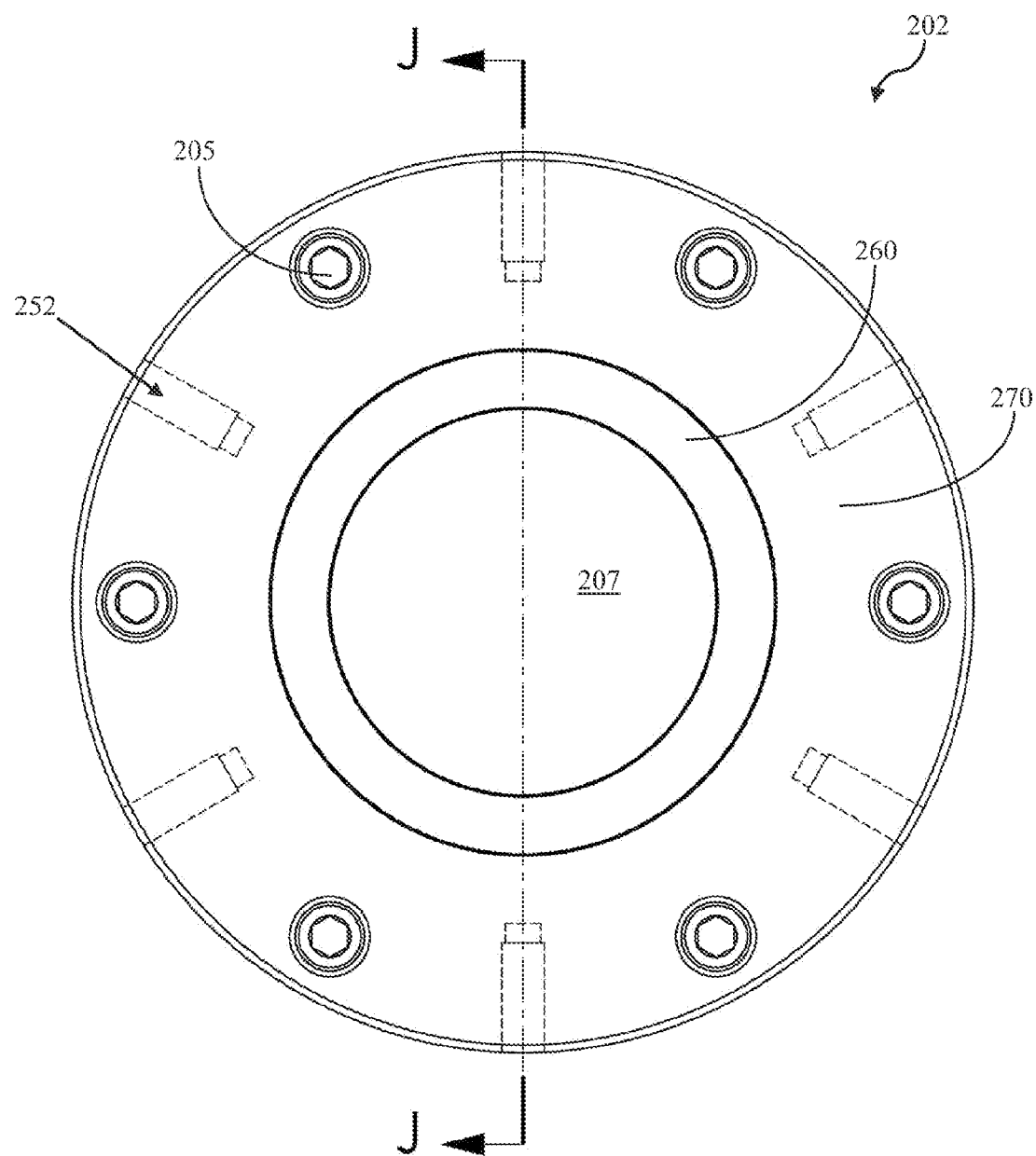
FIG. 28A is an axial-face view of another embodiment of an explosion-proof CDR.
Figure 28B:
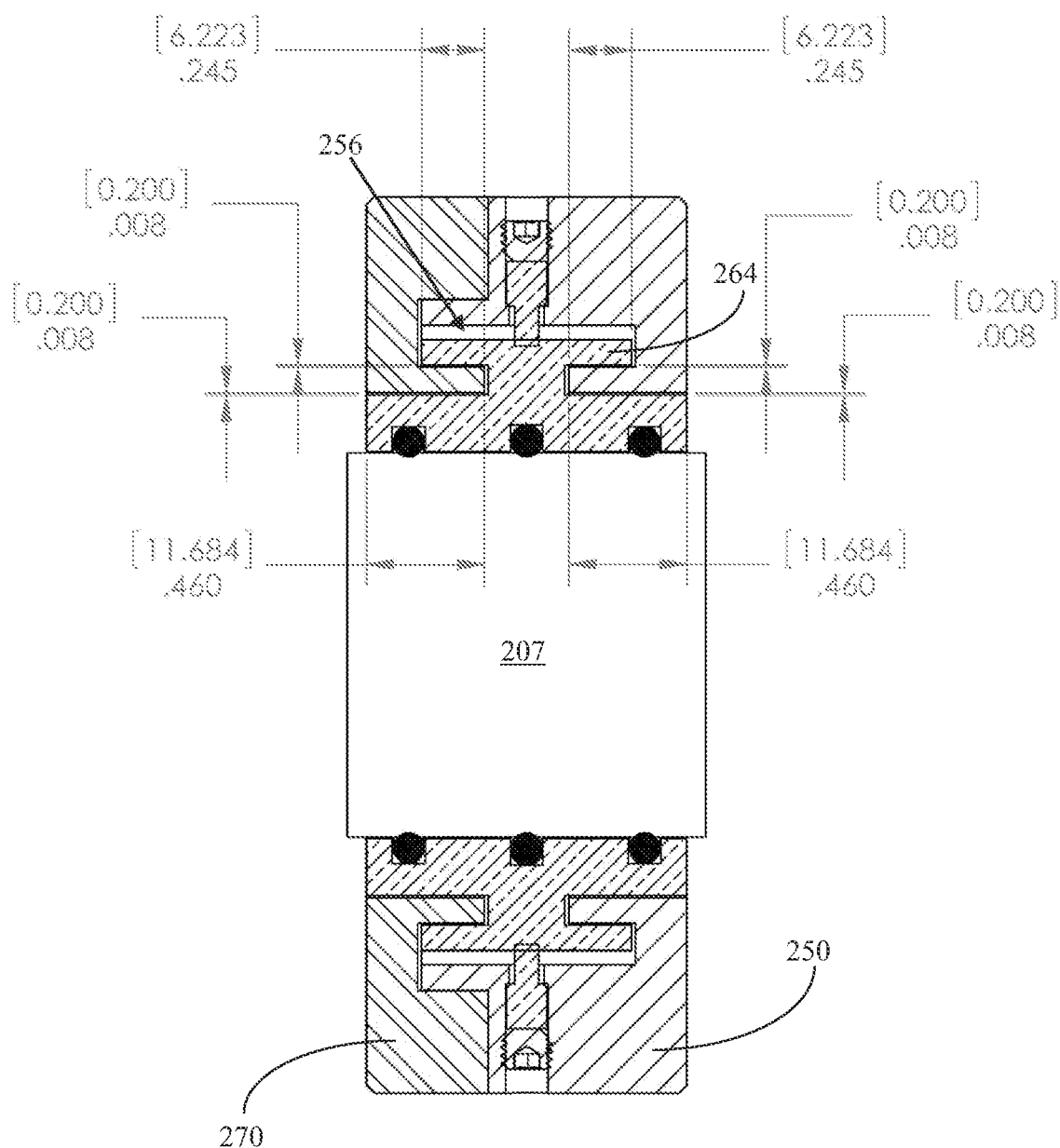
FIG. 28B is an axial, cross-sectional view of the explosion-proof CDR shown in FIG. 28A along the line J-J.

Another embodiment of an explosion-proof CDR 202 is shown in FIGS. 28A & 28B. This embodiment is similar to that shown in FIGS. 25A & 25B in that it employs a stator 250 and a rotor 260. However, in this embodiment of an explosion-proof CDR 202, the stator grooves 253, axial and radial projections 254. 255 of the stator 250, rotor grooves 263, rotor axial and radial projections 264, 265, cap grooves 273, and cap axial and radial projections 274, 275 cooperate to form a different flame path than that shown in FIGS. 25A & 25B in that embodiment of an explosion-proof CDR 202. Accordingly, the rotor 260 in the embodiment of an explosion-proof CDR 202 shown in FIGS. 28A & 28B may be formed with a rotor radial projection 265 having to rotor axial projections 264 extending therefrom.

Figure 29A:
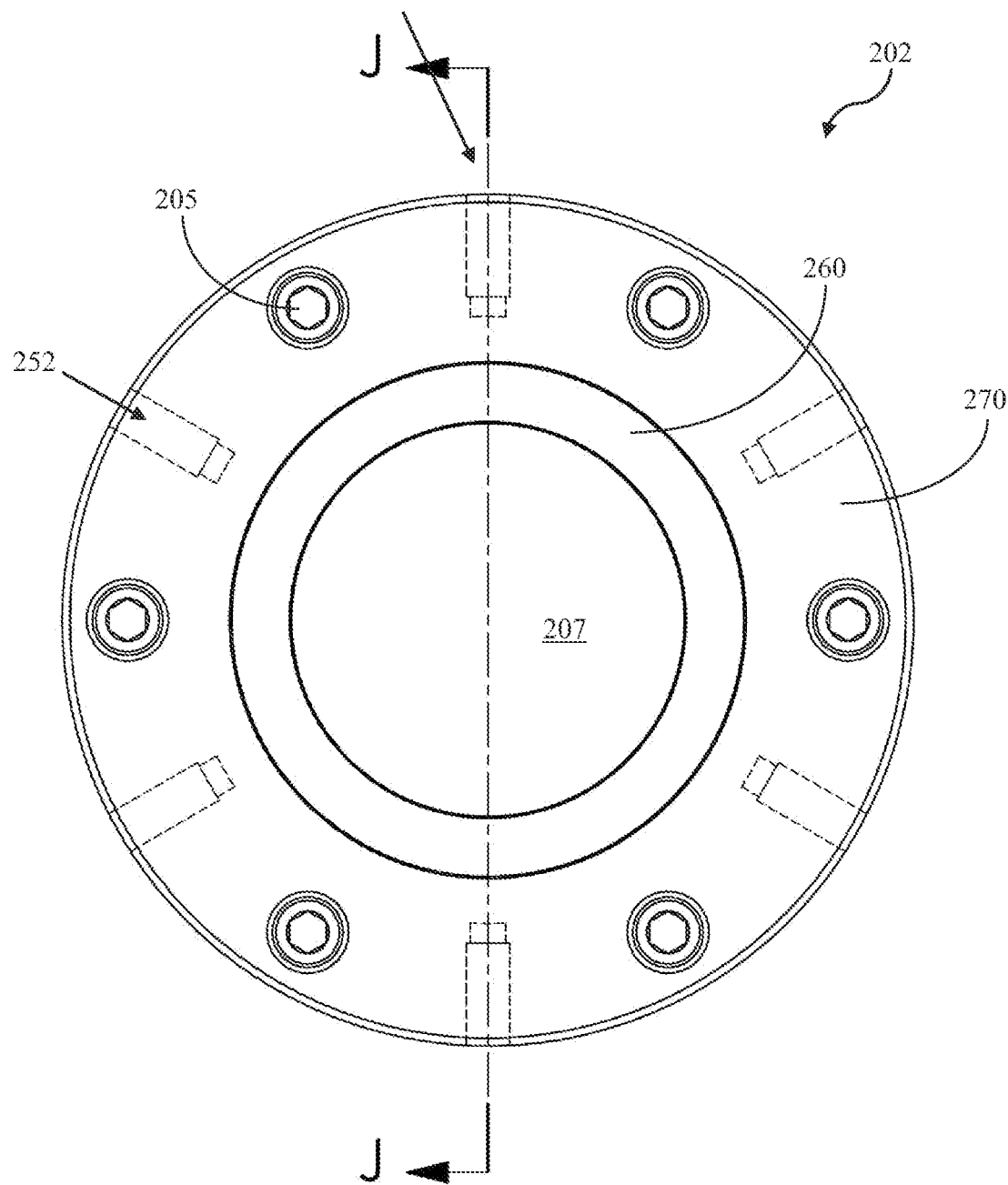
FIG. 29A is an axial-face view of another embodiment of an explosion-proof CDR.
Figure 29B:
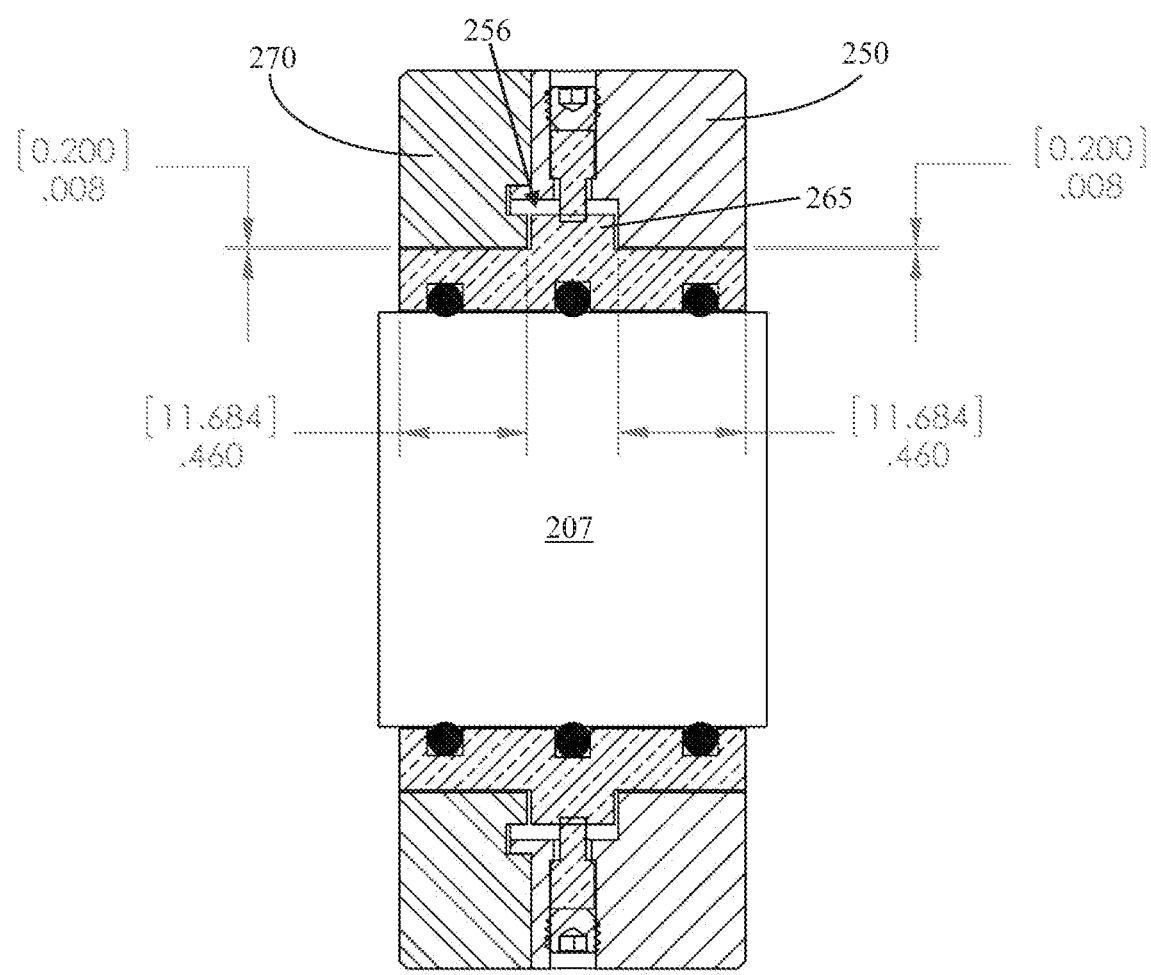
FIG. 29B is an axial, cross-sectional view of the explosion-proof CDR shown in FIG. 29A along the line J-J.

Another embodiment of an explosion-proof CDR 202 is shown in FIGS. 29A & 29B. This embodiment is similar to those shown in FIGS. 25B & 25B in that it employs a stator 250 and a rotor 260. However, in this embodiment of an explosion-proof CDR 202, the stator grooves 253, axial and radial projections 254. 255 of the stator 250, rotor grooves 263, rotor axial and radial projections 264, 265, cap grooves 273, and cap axial and radial projections 274, 275 cooperate to form a different flame path than that shown in FIGS. 25B & 28B in the respective embodiments shown in those figures. Accordingly, the rotor 260 in this embodiment may be formed with a rotor radial projection 265 extending into a stator groove 253, wherein one axial face of the rotor radial projection 265 is adjacent a radial projection 255 of the stator 250 and the opposite axial face thereof is adjacent a cap axial projection 274.

Any of the various features for the bearing isolator 10, CDR 40, 80, 80a, 100, 160, 200, captured CDR 200, CDR 200', and/or explosion-proof CDR 202 disclosed in the present application may be used alone or in combination with one another depending on the compatibility of the features. Accordingly, an infinite number of variations of the bearing isolator 10, CDR 40, 80, 80a, 100, 160, 200, captured CDR 200, CDR 200', and/or explosion-proof CDR 202 exists. Modifications and/or substitutions of one feature for another in no way limit the scope of the bearing isolator 10, CDR 40, 80, 80a, 100, 160, 200, captured CDR 200, CDR 200', and/or explosion-proof CDR 202.

The bearing isolator 10, CDR 40, 80, 80a, 100, 160, 200, captured CDR 200, CDR 200', and/or explosion-proof CDR 202 employed with an equipment housing 16 may be configured to create a stable, concentric system with the rotating shaft 14 as the center point. Inserting a CDR 40, 80, 80a, 100, 160, 200, captured CDR 200, CDR 200', and/or explosion-proof CDR 202 into bearing isolator 10 such as the one shown in FIGS. 2 and 3 within the equipment housing 16 may form a relatively fixed and stable spatial relationship between the conducting elements, which may improve the collection and conduction of electrostatic discharge from the shaft 14, 207 to ground, through the conducting elements of the CDR 40, 80, 80a, 100, 160, 200, captured CDR 200, CDR 200', and/or explosion-proof CDR 202 and bearing isolator 10. This improved motor ground sealing system may directly seat major elements together, which may compensate for imperfections in the shaft 14, 207 (which may not be perfectly round) and may ensure that the variation or change in distance from the conductive segments 46 to the surface of the shaft 14 caused by external forces acting on the bearing isolator 10, and/or CDR 40, 80, 80a, 100, 160, 200, captured CDR 200, CDR 200', and/or explosion-proof CDR 202 is minimal. This may promote effective conduction of electrical charges from the shaft 14, 207 to the equipment housing 16.

For various embodiments and/or applications of the bearing isolator 10, CDR 40, 80, 80a, 100, 160, 200, captured CDR 200, CDR 200', and/or explosion-proof CDR 202, it may be necessary to engage one component with another component in a secure manner such that the two components are fixedly positioned with respect to one another. In such embodiments and/or applications the two components may be engaged with one another via any suitable method and/or structure, including but not limited to one or more o-rings and/or drive rings, mechanical fasteners (e.g., set screws, bolts, pins, etc.), adhesives (tapes, glues, epoxies, etc.), welds, press fit (i.e., interference fit), and/or any combinations thereof.

Having described the preferred embodiments, other features of the bearing isolator 10, CDR 40, 80, 80a, 100, 160, 200, captured CDR 200, CDR 200', and/or explosion-proof CDR 202 will undoubtedly occur to those versed in the art, as will numerous modifications and alterations in the embodiments as illustrated herein, all of which may be achieved without departing from the spirit and scope of the bearing isolator 10, CDR 40, 80, 80a, 100, 160, 200, captured CDR 200, CDR 200', and/or explosion-proof CDR 202. Although some figures provided herein include dimensions of various elements, such dimensions are for illustrative purposes only and in no way limit the scope of the present disclosure. It should be noted that the bearing isolator 10, CDR 40, 80, 80a, 100, 160, 200, captured CDR 200, CDR 200', and/or explosion-proof CDR 202 are not limited to the specific embodiments pictured and described herein, but are intended to apply to all similar apparatuses and methods for dissipating an electrical charge from a shaft 14, 207 to an equipment housing 16 and/or providing an explosion-proof bearing isolator 10, CDR 40, 80, 80a, 100, 160, 200, captured CDR 200, CDR 200', and/or explosion-proof CDR 202, motor, gearbox, other equipment, and/or system. Modifications and alterations from the described embodiments will occur to those skilled in the art without departure from the spirit and scope of the bearing isolator 10, CDR 40, 80, 80a, 100, 160, 200, captured CDR 200, CDR 200', and/or explosion-proof CDR 202.

The invention claimed is:

1. A current diverter ring comprising:
   a. a body that is substantially ring-shaped;
   b. a main aperture positioned in the center of said main body;
   c. a shaft positioned in said main aperture, wherein said shaft is rotatable with respect to said CDR;
   d. a first radial channel, wherein said first radial channel extends from the radial exterior surface of said body to the radial interior surface of said body;
   e. a first conductive assembly positioned in said first radial channel, wherein a contact portion of said first conductive assembly protrudes from said first radial channel radially inward past said radial interior surface;
   f. a second radial channel, wherein said second radial channel extends from the radial exterior surface of said body to the radial interior surface of said body;
   g. an indicator conductive assembly positioned in said second radial channel, wherein a contact portion of said indicator conductive assembly protrudes from said second radial channel radially inward past said radial interior surface;
   h. an indicator in electrical communication with said indicator conductive assembly, wherein said indicator is configured to alert a user when an electrical resistance to electrical current flow reaches a predetermined threshold in a circuit comprised of said first conductive assembly, said indicator conductive assembly, and said shaft.

2. The CDR according to claim 1 wherein said indicator is further defined as comprising a visual indicator.

3. The CDR according to claim 2 wherein said indicator is further defined as a light that is configured to illuminate when said circuit is open.

4. The CDR according to claim 2 wherein said indicator is further defined as a light that is configured to illuminate when said circuit is closed.

5. The CDR according to claim 1 wherein said circuit further comprises a circuit board, and wherein said indicator is engaged with said circuit board.

6. The CDR according to claim 1 wherein said circuit further comprises a power source, and wherein said power source is in electrical communication with said indicator.

7. The CDR according to claim 6 wherein said circuit further comprises a switch, and wherein said switch is in electrical communication with said indicator.

8. The CDR according to claim 1 wherein said indicator is further defined as comprising an auditory indicator.

9. The CDR according to claim 1 wherein said circuit further comprises a radio frequency identification tag corresponding to said intelligent CDR.

10. The CDR according to claim 1 wherein said circuit further comprises a microprocessor.

11. The CDR according to claim 10 wherein said microprocessor further comprises a communication system.

12. A method for determining electrical contact using a current diverter ring (CDR) comprising:
   a. positioning a CDR adjacent a shaft, wherein said shaft is rotatable with respect to said CDR, and wherein said CDR comprises:
      i. a body that is substantially ring-shaped;
      ii. a main aperture positioned in the center of said main body;
      iii. a shaft positioned in said main aperture, wherein said shaft is rotatable with respect to said CDR;
      iv. a first radial channel, wherein said first radial channel extends from the radial exterior surface of said body to the radial interior surface of said body;
      v. a first conductive assembly positioned in said first radial channel, wherein a contact portion of said first conductive assembly protrudes from said first radial channel radially inward past said radial interior surface;
      vi. a second radial channel, wherein said second radial channel extends from the radial exterior surface of said body to the radial interior surface of said body;
      vii. an indicator conductive assembly positioned in said second radial channel, wherein a contact portion of said indicator conductive assembly protrudes from said second radial channel radially inward past said radial interior surface;
viii. an indicator in electrical communication with said indicator conductive assembly;
b. alerting a user, via said indicator, when an electrical resistance to electrical current flow reaches a predetermined threshold in a circuit comprised of said first conductive assembly, said indicator conductive assembly, and said shaft.

13. The method according to claim 12 wherein said indicator is further defined as comprising a visual indicator.

14. The method according to claim 13 wherein said indicator is further defined as a light that is configured to illuminate when said circuit is open.

15. The method according to claim 13 wherein said indicator is further defined as a light that is configured to illuminate when said circuit is closed.

16. The method according to claim 12 wherein said circuit further comprises a circuit board, and wherein said indicator is engaged with said circuit board.

17. The method according to claim 12 wherein said circuit further comprises a power source, and wherein said power source is in electrical communication with said indicator.

18. The method according to claim 12 wherein said indicator is further defined as comprising an auditory indicator.

19. The method according to claim 12 wherein said circuit further comprises a microprocessor.

20. The method according to claim 19 wherein said microprocessor further comprises a communication system.

* * * * *